(12) United States Patent
Hilbush et al.

(10) Patent No.: US 7,844,481 B2
(45) Date of Patent: Nov. 30, 2010

(54) INTERNET PACKAGE SHIPPING SYSTEMS AND METHODS

(75) Inventors: Mark R. Hilbush, Baltimore, MD (US);
Anthony G. Creasy, Suwanee, GA (US); Kurt L. Stadele, Alpharetta, GA (US); Jim Deveney, New Freedom, PA (US); Jane Sneeringer, Baltimore, MD (US); Charles G. Orf, Stewartstown, PA (US); David Michel, Baltimore, MD (US); Christopher T. Schenken, Alpharetta, GA (US); Phillip G. Lawson, Hewitt, NJ (US); John Yanikov, York, PA (US); Lawrence Wight, Parkton, MD (US); Diane Minahan, Annapolis, MD (US); Steve Yeung, Timonium, MD (US); Thomas Dorris, Frederick, MD (US); Mark Trowbridge, Cumming, GA (US); Robert Gephart, York, PA (US); Diane Lynn T. Rashbaum, Gainesville, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 1740 days.

(21) Appl. No.: 10/832,111

(22) Filed: Apr. 26, 2004

(65) Prior Publication Data

US 2005/0038758 A1   Feb. 17, 2005

Related U.S. Application Data

(63) Continuation of application No. 09/498,805, filed on Feb. 7, 2000, now abandoned.

(60) Provisional application No. 60/119,189, filed on Feb. 8, 1999.

(51) Int. Cl.
*G06F 9/46* (2006.01)

(52) U.S. Cl. .......................................... 705/9

(58) Field of Classification Search ................ 705/1, 705/7, 8, 9, 10, 26, 27, 28, 30, 40, 400, 406, 705/404, 408, 410; 235/375
See application file for complete search history.

(56) References Cited

U.S. PATENT DOCUMENTS 5,047,614 A * 9/1991 Bianco .................. 235/385

(Continued)

FOREIGN PATENT DOCUMENTS

JP 5274597 10/1993

(Continued)

OTHER PUBLICATIONS

Declaration of Jan McCarthy dated Mar. 23, 2004. 3 pages plus appendix with 2 pages.

(Continued)

*Primary Examiner*—Igor Borissov
(74) *Attorney, Agent, or Firm*—Alston + Bird LLP

(57) ABSTRACT

A system and methods for shipping a package (12) from a package sender (16) to an intended recipient (18), utilizing Internet communications (30) to place shipping orders, request on demand package pickup, maintain and utilize pre-stored profile information, view shipping history, track orders, etc. A package sender (16) with an Internet-accessible computer (20) accesses an Internet site and associated shipping system (10) operated by a shipping service provider (14). The package sender (16) enters information required for shipping the package (12), including shipping options and methods for payment. The options and payment for the shipment transaction are validated. If the transaction is validated, printer indicia are communicated to the customer's computer (20), which is enabled to locally print a prepaid label (25) containing special machine-readable (876) as well as human-readable indicia (904). The shipping service provider (14) acquires the package by drop-off, standard pickup or on call pickup, scans the machine readable indicia, verifies other indicia of authenticity, and processes the package (12) in accordance with information encoded on the label.

73 Claims, 51 Drawing Sheets

U.S. PATENT DOCUMENTS 5,122,959 A * 6/1992 Nathanson et al. .......... 701/117
5,922,040 A * 7/1999 Prabhakaran ................ 701/117
6,963,861 B1 * 11/2005 Boucher et al. ............. 705/400

FOREIGN PATENT DOCUMENTS

| JP | 09-259180 A | * | 10/1997 |
| --- | --- | --- | --- |
| JP | 9259180 (A) | | 10/1997 |
| JP | 10063947 (A) | | 3/1998 |
| JP | 10-207944 A | * | 8/1998 |
| JP | 10207944 (A) | | 8/1998 |
| JP | 10240814 | | 9/1998 |
| JP | 10302197 (A) | | 11/1998 |
| WO | WO 96/38800 | | 12/1996 |
| WO | WO 98/57304 | | 12/1998 |

OTHER PUBLICATIONS

*Federal Express Launches Internet Shipping*, FedEx, 2 pages, available at http://web.archive.org/web/19970116091656/www0.fedex.com/pr/archive/Netship3_13 ..., downloaded Feb. 22, 2005.

Internet Archive from December 19, 1996 for www.fedex.com, Way Back Machine, 8 pages, available at http://web.archive.org/web/*/http://www.fedex.com, downloaded Feb. 22, 2005.

Search Report for European Application No. 03018916.1 dated Jun. 2, 2010.

Office Action for Japanese Application No. 2000-597738 dated Jul. 16, 2004.

Office Action for Japanese Application No. 2000-597738 dated Aug. 8, 2005.

* cited by examiner

INTERNET SHIPPING SYSTEM (ISS) ARCHITECTURE

FIG. 3 DISPATCH ARCHITECTURE

PROCESSES & ROUTINES

HOME PAGE ROUTINE

LOG IN ROUTINE

REGISTRATION ROUTINE

MEMBER SERVICES ROUTINE

PAYMENT METHOD ROUTINE

FIG. 12 CHANGE PASSWORD ROUTINE

ADDRESS BOOK ROUTINE

CANCEL MEMBERS ROUTINE

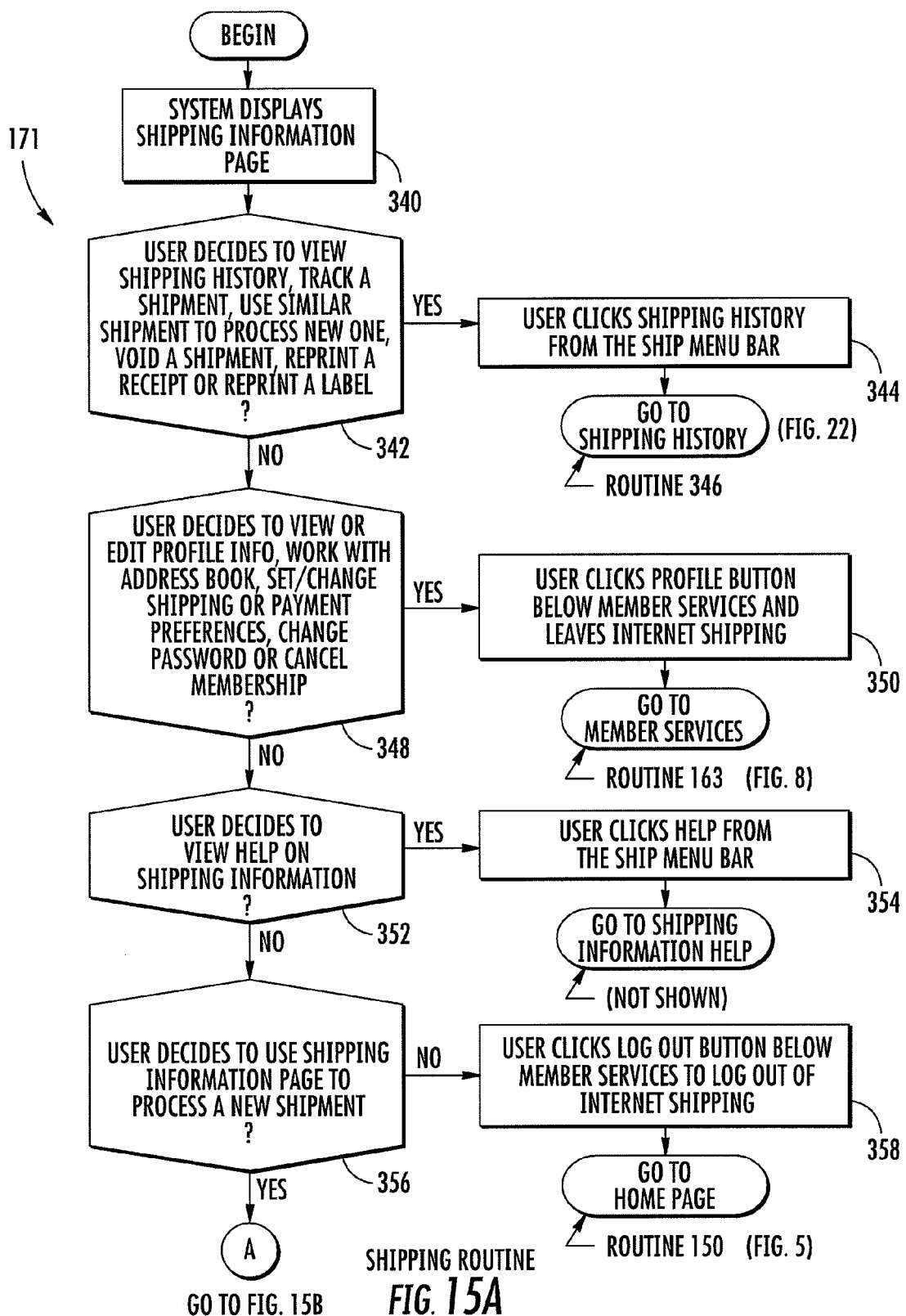
FIG. 15A SHIPPING ROUTINE

SHIPMENT SUMMARY ROUTINE

PACKAGE PICKUP ROUTINE

PAYMENT ROUTINE

PRINT LABELS/RECEIPT ROUTINE

SHIPMENT FINISHED ROUTINE

SHIPPING HISTORY ROUTINE

RATE & VALIDATE ROUTINE

HOME PAGE

LOG IN PAGE

SHIPPING INFORMATION PAGE

PACKAGE SUMMARY

| 1 OF 1 | | | |
|---|---|---|---|
| EDIT | WEIGHT: | LTR | |
| | OVERSIZE: | NO | |
| | DECLARED VALUE | | |
| | AMOUNT: | $500.00 | |
| | | DECLARED VALUE CHARGE: | $1.40 |
| | | SATURDAY DELIVERY CHARGES: | $0.00 |
| | | TOTAL CHARGES: | $7.40 |

NEED IT THERE SOONER?

USE UPS 2nd DAY AIR A.M. LETTER TO GET IT THERE SOONER FOR $0.75 MORE.
USE UPS NEXT DAY AIR SAVER LETTER TO GET IT THERE SOONER FOR $4.25 MORE.

THERE ARE SEVERAL PICKUP AND DROP-OFF METHODS AVAILABLE:

740
- DAILY PICKUP CUSTOMER: YOUR DRIVER WILL PICKUP YOUR SHIPMENT(S) AS USUAL.
- DROP-OFF LOCATOR: LOCATE SELF SERVICE DROP-OFF BOXES OR STAFFED LOCATIONS.
- ON CALL AIR PICKUP: SCHEDULE A PICKUP FOR YOUR URGENT AIR PACKAGES (ADDITIONAL CHARGES APPLY.)

744 — CONTINUE          ADD A PACKAGE — 742

FIG. 27B

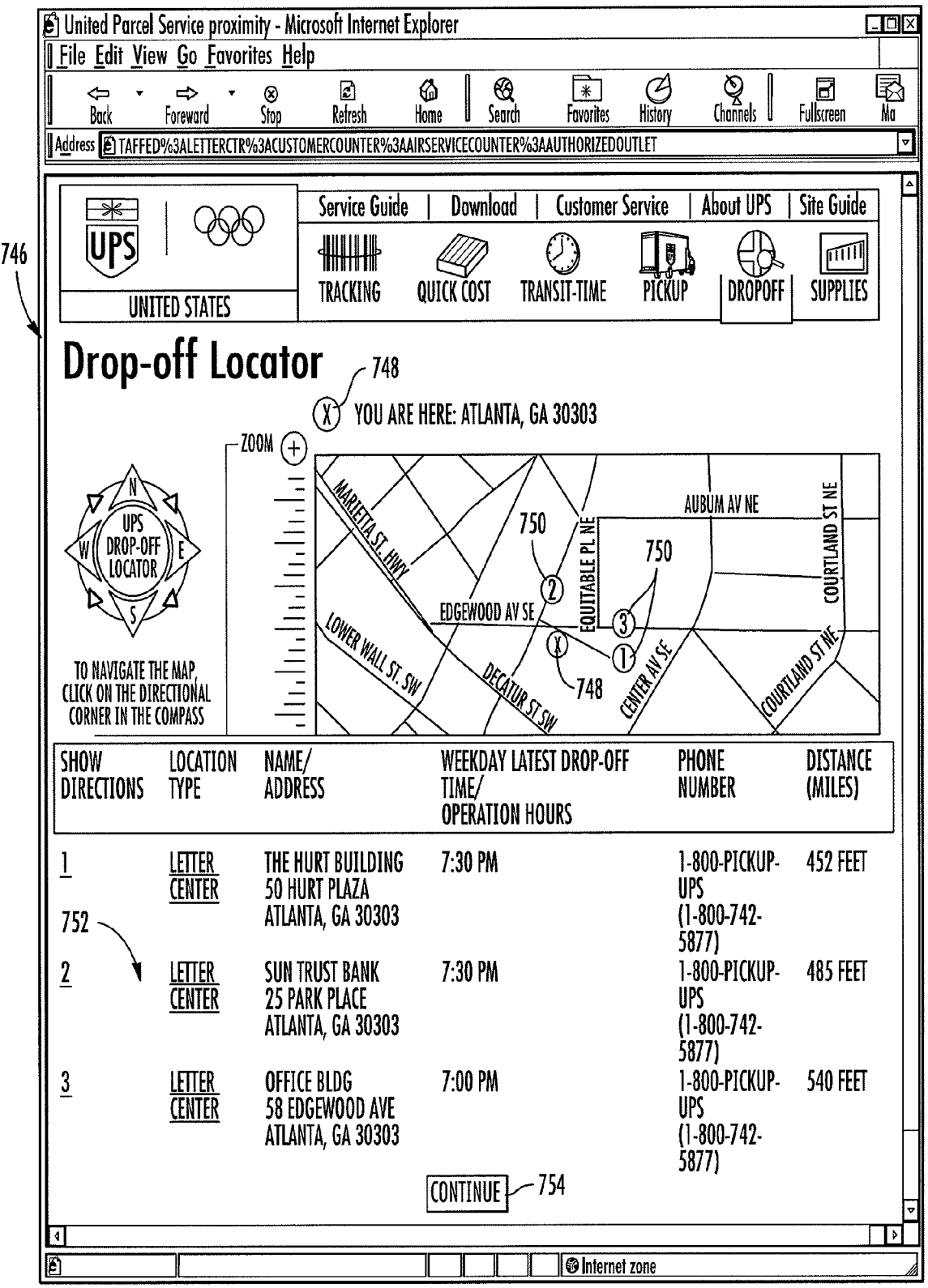
FIG. 28 DROP-OFF LOCATOR PAGE

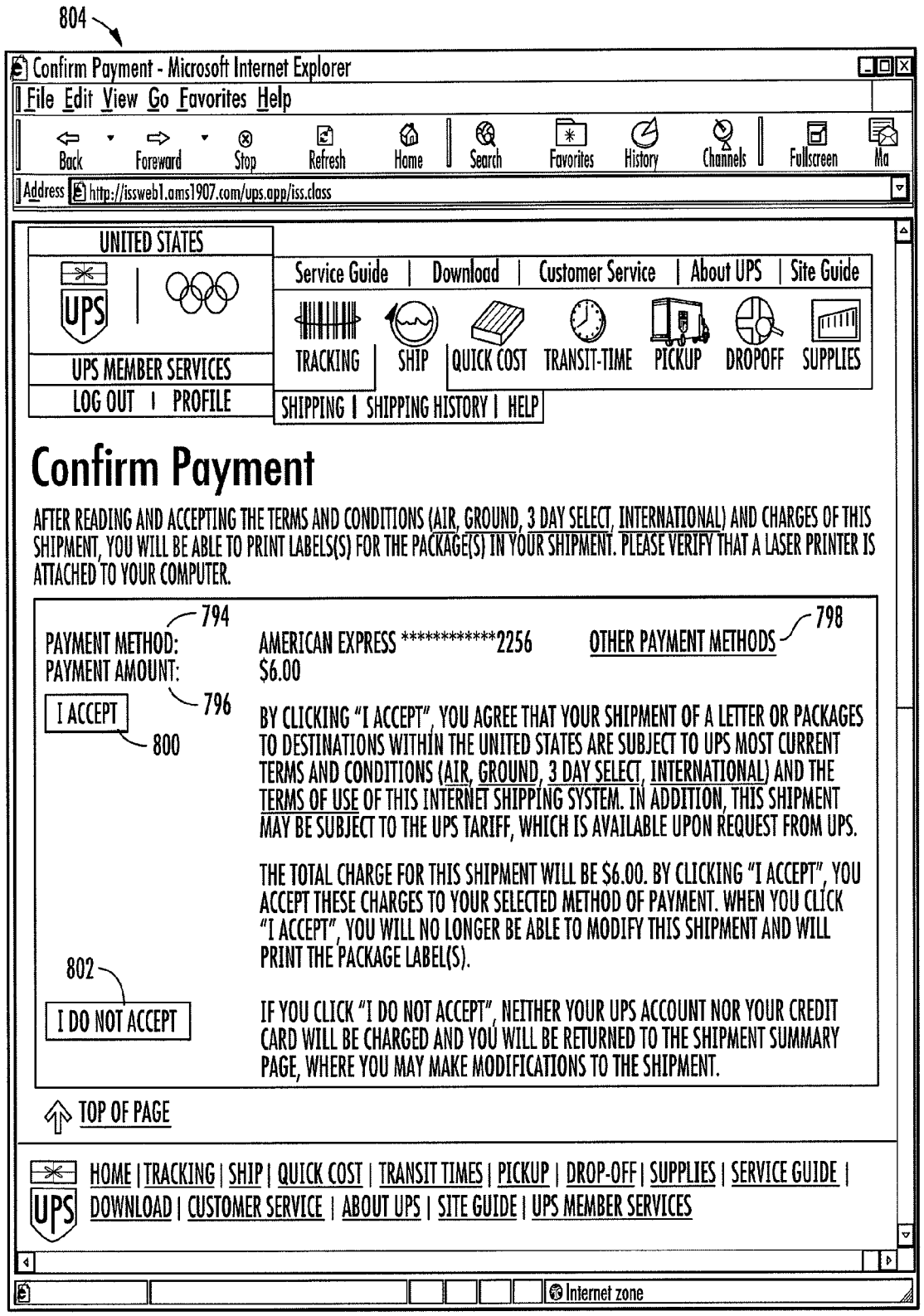
*FIG. 31*   CONFIRM PAYMENT PAGE

806

```
Print Labels and Receipt - Microsoft Internet Explorer                    _ □ ×
File  Edit  View  Go  Favorites  Help
 ⇦ ▾   ⇨ ▾   ⊗     ⇪       ⌂      ⊙       ✱         ◐        ◯         ▢         ✉
Back  Forward  Stop  Refresh  Home  Search  Favorites  History  Channels  Fullscreen  Ma
Address  http://issweb1.ams1907.com/ups.app/iss.class
```

UNITED STATES
UPS | 🔗
UPS MEMBER SERVICES
LOG OUT | PROFILE

Service Guide | Download | Customer Service | About UPS | Site Guide

TRACKING | SHIP | QUICK COST | TRANSIT-TIME | PICKUP | DROPOFF | SUPPLIES

SHIPPING | SHIPPING HISTORY | HELP

Print Labels and Receipt

FOLLOW THESE THREE STEPS TO COMPLETE YOUR SHIPMENT. FOR DETAILED INFORMATION ON PRINTING LABELS AND RECEIPTS, SEE THE PRINTING INSTRUCTIONS. — 810

---

1. VIEW AND PRINT LABELS(S)

TO VIEW AND PRINT THE LABEL(S) FOR YOUR PACKAGE(S), CLICK THE LABEL BUTTON(S).

[ LABEL 1 ] — 812

2. VIEW AND PRINT RECEIPT

PLEASE KEEP A COPY OF THE RECEIPT FOR YOUR RECORDS. TO VIEW AND PRINT THE RECEIPT, CLICK VIEW/PRINT RECEIPT.

[ VIEW/PRINT RECEIPT ] — 814

3. FINISH YOUR SHIPMENT

TO COMPLETE YOUR SHIPMENT, MAKE SURE ALL YOUR LABELS AND RECEIPT PRINTED CORRECTLY. WHEN ALL YOUR LABELS AND RECEIPTS PRINTED SUCCESSFULLY, CLICK FINISH.

[ FINISH ] — 816

---

⇧ TOP OF PAGE

HOME | TRACKING | SHIP | QUICK COST | TRANSIT TIMES | PICKUP | DROP-OFF | SUPPLIES | SERVICE GUIDE |
UPS | DOWNLOAD | CUSTOMER SERVICE | ABOUT UPS | SITE GUIDE | UPS MEMBER SERVICES

Internet zone

*FIG. 32*   PRINT LABELS/RECEIPT PAGE

818

```
Shipment Receipt - Microsoft Internet Explorer                    _ □ ×
File  Edit  View  Go  Favorites  Help
```

INTERNET SHIPPING SYSTEM RECEIPT - KEEP THIS FOR YOUR RECORDS

| ADDRESSES | SHIPMENT DETAILS | | CHARGES | |
|---|---|---|---|---|
| SHIP-TO ADDRESS ADDRESSEE JEY 191 PEACHTREE St. 37th FLOOR ATLANTA, GA 30303 404 818 3700 SHIPMENT ORIGIN ATLANTA, GA 30303 RETURN ADDRESS NEW Co. BILL X SMITH 9 PEACHTREE St. 37th Fl 37th Fl ATLANTA, GA 30303 404 855 3700 ext. 2 | LABEL PRINTED: SERVICE TYPE: BILLABLE Wt.: BILLING OPTION: | 2/5/1999 UPS 2nd DAY AIR LETTER LTR AMERICAN EXPRESS XXXX-XXXX-XXXX-2256 | SERVICE CHARGE: SATURDAY DELIVERY CHARGE: PACKAGE OPTIONS CHARGES: TOTAL: | $6.00 $0.00 $0.00 $6.00 |

PACKAGE DETAILS

| 1 OF 1 | TRACKING NUMBER: PACKAGE TYPE: DIMENSIONS: DECLARED VALUE AMOUNT: WEIGHT: OVERSIZE: PACKAGE REFERENCE 1: PACKAGE REFERENCE 2: | 1ZT007020293820831 UPS LETTER $50.00 LTR No r4565 s778 | DECLARED VALUE CHARGE: ADD'T HANDLING: | $0.00 $0.00 |

Internet zone

RECEIPT PAGE

*FIG. 33*

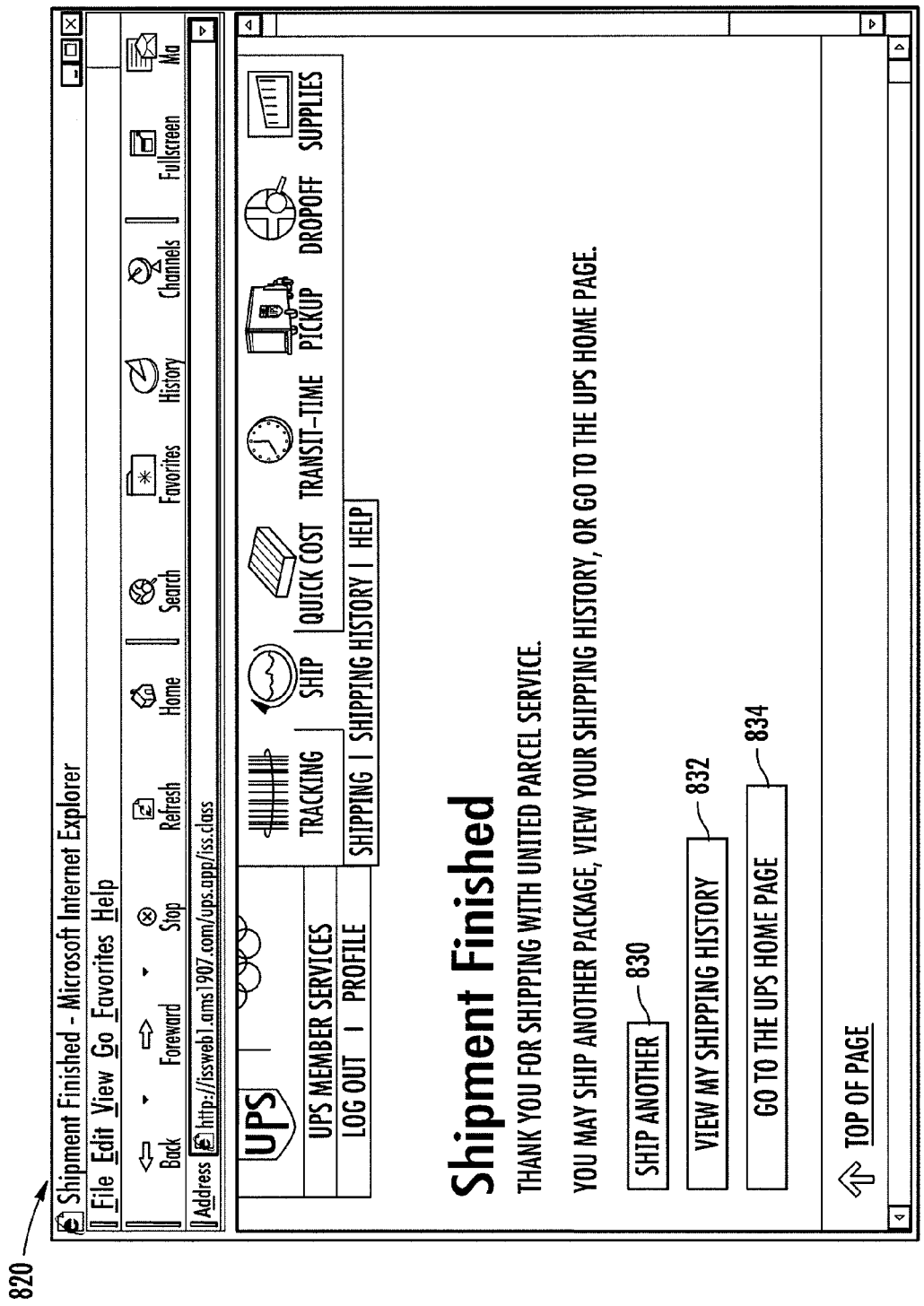
FIG. 34   SHIPMENT FINISHED PAGE

836

Shipping History - Microsoft Internet Explorer

File Edit View Go Favorites Help

Back | Foreward | Stop | Refresh | Home | Search | Favorites | History | Channels | Fullscreen | Ma Address: http://issweb1.ams1907.com/ups.app/iss.class

UNITED STATES
UPS
UPS MEMBER SERVICES
LOG OUT | PROFILE

Service Guide | Download | Customer Service | About UPS | Site Guide

TRACKING | SHIP | QUICK COST | TRANSIT-TIME | PICKUP | DROPOFF | SUPPLIES

SHIPPING | SHIPPING HISTORY | HELP

Shipping History

USE SHIPPING HISTORY TO REVIEW, TRACK AND VOID YOUR PREVIOUS SHIPMENTS. YOU CAN ALSO RE-SHIP USING THE SHIPPING INFORMATION FROM A PREVIOUS SHIPMENT.

SHOW THE LAST: [30 DAYS ▼]—840  [GO]—842

SELECT A SHIPMENT BY CHECKING THE CORRESPONDING RADIO BUTTON IN THE LEFT COLUMN. THEN SELECT THE ACTION YOU WISH TO PERFORM BELOW.

| | SHIPPED: | TRACKING: | | SHIPPED TO: |
|---|---|---|---|---|
| ○ | 02/04/1999 | 1ZT002550190175054 | | JONES AND ASKEW |
| ○ 848 | 01/26/1999 | 1ZT002550190120040 | 846 | UPS TEST |
| ○ | 01/26/1999 | 1ZT002551395075032 | | UPS TEST |

844

SHIPMENT THROUGH 3 DAY SERVICE SELECT, THE LAST 60 DAYS

SHOW THE LAST: [30 DAYS ▼] [GO]

[SHOW DETAIL/RECEIPT]—850  [SHIP AGAIN]—852  [VOID SHIPMENT]—854

⇧ TOP OF PAGE

HOME | TRACKING | SHIP | QUICK COST | TRANSIT TIMES | PICKUP | DROP-OFF | SUPPLIES | SERVICE GUIDE |
DOWNLOAD | CUSTOMER SERVICE | ABOUT UPS | SITE GUIDE | UPS MEMBER SERVICES

Internet zone

*FIG. 35*   SHIPPING HISTORY PAGE

856

Shipment Details - Microsoft Internet Explorer

File Edit View Go Favorites Help

Back | Forward | Stop | Refresh | Home | Search | Favorites | History | Channels | Fullscreen | Ma Address: http://issweb1.ams1907.com/ups.app/iss/class

UNITED STATES
UPS
UPS MEMBER SERVICES
LOG OUT | PROFILE

Service Guide | Download | Customer Service | About UPS | Site Guide

TRACKING | SHIP | QUICK COST | TRANSIT-TIME | PICKUP | DROPOFF | SUPPLIES

SHIPPING | SHIPPING HISTORY | HELP

Shipping Details

THIS PAGE SHOWS THE DETAILS FROM A SINGLE SHIPMENT AND IS A DUPLICATE OF THE SHIPMENT RECEIPT.

[BACK TO SHIPPING HISTORY] — 860  [VIEW RECEIPT] — 858

| ADDRESSES | SHIPMENT DETAILS | | CHARGES | |
|---|---|---|---|---|
| SHIP-TO ADDRESS<br>JONES AND ASKEW<br>JEFF YOUNG<br>191 PEACHTREE<br>STREET<br>37th FLOOR<br>PATENT<br>ATLANTA, GA 30303<br>404 818 3700 | LABEL PRINTED:<br>SERVICE TYPE:<br>EXTENTED AREA:<br>BILLABLE Wt:<br><br>BILLING OPTION: | 2/4/1999<br>UPS NEXT DAY AIR LETTER<br><br>No<br>LTR<br>AMERICAN EXPRESS<br>XXXX-XXXX-XXXX-XXXX<br>1006 | SERVICE CHARGE:<br>SATURDAY DELIVERY CHARGE:<br>PACKAGE OPTIONS CHARGES:<br>TOTAL: | $11.75<br><br>$0.00<br><br>$1.40<br>$13.15 |

SHIPMENT ORIGIN
ATLANTA, GA 30303

RETURN ADDRESS
UPS
KURT STADELE
55 GLENLAKES PKWY
NE
BUILDING 3 LEVEL 4

Internet zone

*FIG. 36A*   SHIPMENT DETAILS PAGE

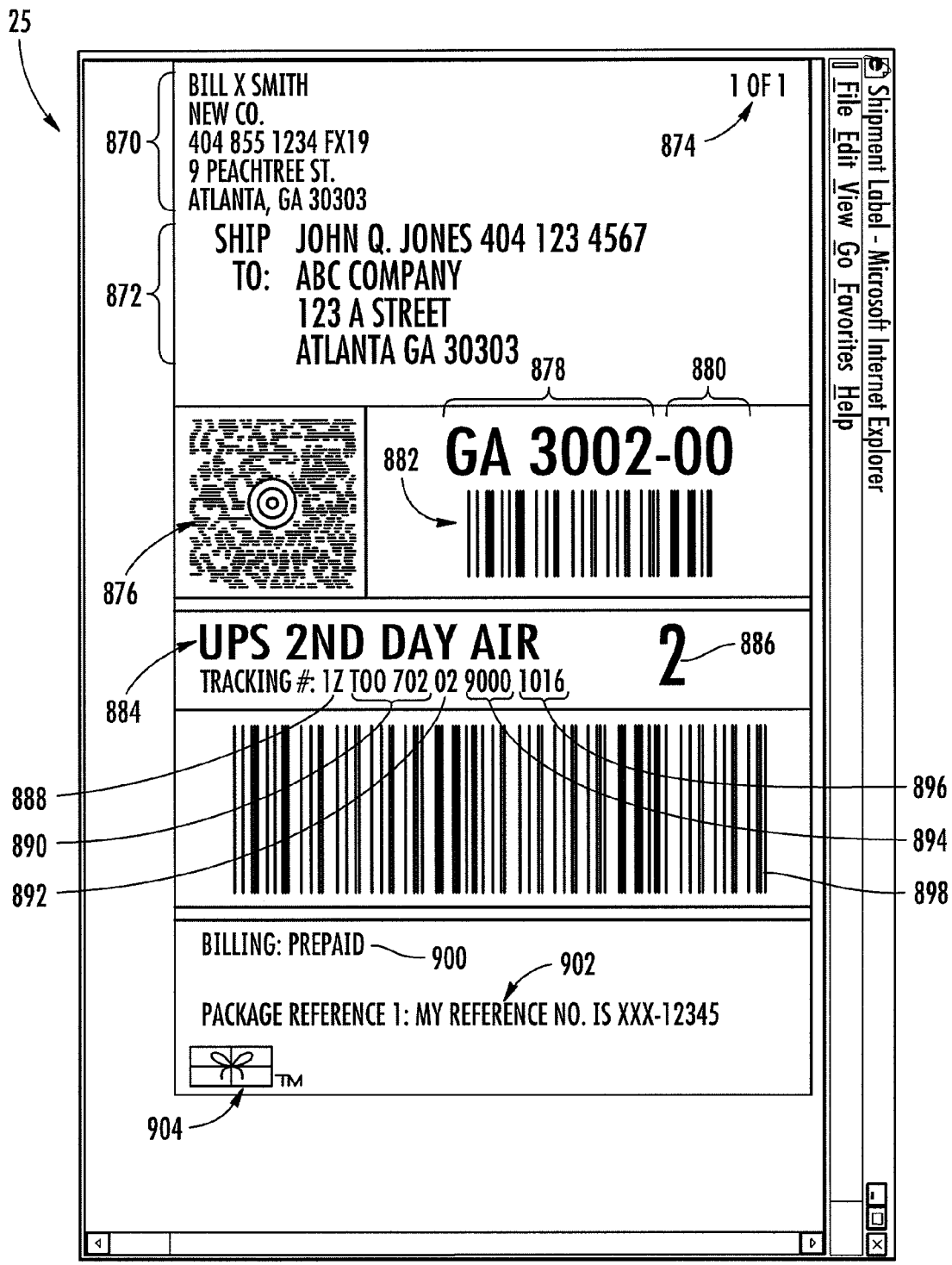
FIG. 37  LABEL DISPLAY PAGE

INTERNET PACKAGE SHIPPING SYSTEMS AND METHODS

CROSS-REFERENCE TO RELATED APPLICATIONS

This application is related to, and is a continuation of, U.S. application Ser. No. 09/498,805 entitled "Internet Package Shipping Systems and Methods" filed Feb. 7, 2000 now abandoned, which is hereby incorporated herein in its entirety by reference and which claims priority to Provisional Application No. 60/119,189 entitled "Internet Shipping System" filed on Feb. 8, 1999.

TECHNICAL FIELD

The present invention relates generally to shipping packages, and more particularly relates to systems and methods that utilize the Internet to facilitate the shipment of packages by a shipping service provider.

BACKGROUND OF THE INVENTION

Successful commerce in goods depends on efficient delivery of items to customers. For bulk shipments to retailers, manufacturers who do not maintain a fleet of trucks often hire independent carriers. As for delivery of products to end users, recent years have witnessed a dramatic growth in the volume of products shipped to end user customers from stores, from mail-order catalog warehouses, and directly from manufacturers. Parcel delivery carriers provide delivery services to end user customers, whether they are individuals or businesses.

This surging shipping business has been fueled by the growth of e-commerce conducted over the Internet. Individuals and businesses find it convenient to order goods using a Web browser, and a multitude of e-commerce sites offering a wide variety of goods have gone on-line. In addition to buying and selling goods and services, more and more firms use the Internet to manage their businesses.

For all of these transactions, a carrier must be engaged to deliver the ordered goods. Historically, this step has been treated as a second transaction, often as complex and time consuming as the original sale of products. Carriers have offered various levels of service, ranging from ground delivery, to overnight delivery, and delivery early the next morning. Customers may visit a store-front drop-off station, drop off a parcel at a kiosk, or arrange for a regular pick-up by the carrier. Telephone ordering of pick-up as well as delivery services has been offered.

Some attempts have been made to streamline the process of arranging for pick-up and delivery. In the case of large volume carriers such as manufacturers or large retailers, carriers have provided personal computers and software to the carrier to allow the carrier to connect to the carrier's computer system for the purpose of submitting orders for delivery services, providing details of the items being shipped, printing shipping labels, accessing tracking data to determine the status of shipments, and obtaining reports of shipping activity. These approaches have required special equipment such as a personal computer, terminal units, or smart telephones, often dedicated to the purpose. Specific application software must be loaded onto each terminal unit or computer. Thus, such solutions cannot easily be made available to large numbers of individuals and small business users.

For the convenience of individuals and small businesses, some Internet sites have provided rate calculators that can be used to determine which carrier charges the best rate for a particular parcel. These sites have not provided the means to actually order the services of a carrier, nor have they dealt with the complexities of on-line payment and transaction security that are an essential part of e-commerce.

Carriers have provided access to tracking information via the Internet. However, these services have not been integrated with a convenient method for ordering and paying for delivery services.

A particular system with additional features, primarily for carriers who have their own predefined set of shipping requirements, is shown in U.S. Pat. Nos. 5,485,369 and 5,631,827. This networked system addresses order processing, order fulfillment, transportation of goods, and tracking. However, this system does not deal with how the carrier is contacted to pick up the goods, and thus does not give the carrier any advance notice of what must be shipped for planning purposes. Nor does this system address the problem of how a carrier employee presented with a parcel bearing a label printed by a customer can determine whether the customer has paid for or committed to pay for the delivery services.

Thus, despite some advances in the field, there remains a need for a single automated solution for any and all of the above-described delivery ordering scenarios, accessible to large and small volume users through equipment already owned by the users. There has been a further need to solve the foregoing problem by utilizing the power and flexibility of the Internet. The solution should provide even to individual or occasional users the convenience and flexibility of the ordering and tracking systems heretofore available only to large carriers connected to carriers via a modem or private network.

SUMMARY OF THE INVENTION

The present invention seeks to provide a network-based automated solution for multiple delivery ordering scenarios, accessible to large and small volume package senders through a computer at their own location, providing convenience, flexibility, and security in ordering shipping services and tracking shipments.

According to the present invention, this object is achieved by providing a shipping system and method accessible by a package sender's computer through a computer network (wired or wireless), such as the Internet. One aspect of the shipping system and method sends shipping label indicia over the network to the package sender's computer for printing a shipping label acceptable to a package shipping service. Another aspect of the shipping system allows the package sender, from the sender's computer, to conveniently arrange for pick up of a package by a shipping service.

Generally described, one aspect of the present invention provides a system and method for processing information associated with a package handled by a shipping service provider in connection with delivery of the package to an intended recipient, comprising: an order-receiving system and method operative to receive a customer-entered order to ship a package from a network accessible computer system and communicate the customer-entered order to a dispatch system; a dispatch system and method responsive to receipt of the customer-entered order for generating a dispatch order for pick up of the package; and a communication system and method for communicating the dispatch order to a selected service person, whereby the selected service person, in response to receipt of the dispatch order, picks up the package for delivery via the shipping service provider to the intended recipient.

In a preferred embodiment, the system and method may include a package information processing component associated with the order-receiving system for processing information entered by the customer via the network accessible computer system and validating the information prior to generating the dispatch order. The order to ship a package may be an on call order for the shipping service provider to pick up the package at a place selected by the customer, or at a drop box, and deliver the package to the intended recipient. The selected service person may have a communications receiving device for receiving the dispatch order. The order-receiving system may be operative to provide predetermined print label indicia to the customer's network accessible computer system for printing a label for affixation to the package, the label including predetermined authenticity indicia. Moreover, the order-receiving system may be operative to provide the print label indicia in response to validation of information input by the customer via the network accessible computer system, and the order-receiving system may be operative to accept information from the label during scanning of the label upon on call pickup or when processed at a drop box. The system may also provide a package shipment status information system operative for receiving status information, such as tracking information, corresponding to the status of shipment of the package and for providing the status information for access by the customer. Preferably, the network is a global computer network such as the Internet, and the order-receiving system and method is operative to provide a shipping information interface via an Internet site, the shipping information interface being accessible by the customer's Internet accessible computer system and including shipment order information fields for customer entry of shipment order information associated with shipment of the package, the shipment order information fields being pre-populated with customer profile information retrieved from a customer profile information database associated with the order-receiving system. The shipping information interface preferably may be operative to allow a customer to access functions of the order-receiving system selected from the group comprising: view shipping history, track a shipment, use similar shipment to process a new shipment, void a shipment, reprint a label, reprint a receipt, view or edit profile information, view or edit an address book, set or change shipping or payment preferences, or change a password. The system and method may further provide an address validation component operative for processing the ship to address field and determining whether an address of a package recipient is a valid address, and further operative for providing an indication of address invalidity in the event that the address of the package recipient is invalid.

The order-receiving system and method may also be operative to provide a shipment summary interface via the Internet site, the shipment summary interface being accessible by the customer's Internet accessible computer system and including editable shipment summary information fields associated with an order to ship a package. The shipment summary interface may be operative to display service options for selection by the customer selected from the group comprising: changing information associated with shipment of the package, adding another package to the shipment, selecting to view a drop-off locator, and selecting service for delivery of the package sooner.

In the preferred embodiment, there may also be provided a payment system and method associated with the order-receiving system for receiving payment information from the customer and processing a customer payment for shipment of the package. The order-receiving system and method preferably is operative to provide a payment interface via the Internet site, the payment interface being accessible by the customer's Internet accessible computer system and including selectable payment options associated with an order to ship a package. The payment options preferably are selected from the group comprising: payment from a customer's existing account with the shipping service provider, payment via credit card on file with the shipping service provider, and payment via other credit card.

The order-receiving system and method preferably also is operative to provide a shipping history interface via the Internet site, the shipping history interface being accessible by the customer's Internet accessible computer system and including shipping history information fields for allowing customer selection of shipping history display options. The shipping history display options include a track shipment option, and the order-receiving system is operative to display shipment tracking information associated with a selected prior order by the customer in response to selection of the track shipment option. The interface allows the customer to conveniently ship again to the same destination.

Generally described, another aspect of the present invention provides a method for shipping a package from a shipping service provider's customer to an intended recipient, comprising the steps of: receiving a customer-entered order to ship a package from an Internet accessible computer system operated by a customer; validating shipping information associated with the customer-entered order; and in response to validating the shipping information, communicating printer indicia to the customer at the Internet accessible computer system such that the customer is enabled to print a label for affixation to the package, the label containing predetermined label shipping information.

Generally described, another aspect of the present invention provides a method for facilitating customer creation of a label for use on a package to be delivered by a shipping service provider from a customer to an intended recipient, comprising the steps of: obtaining shipping information from a customer corresponding to an order to deliver a package via an Internet accessible computer system operated by the customer; validating the shipping information received from the customer; in response to validating the shipping information, communicating print label indicia to the customer at the Internet accessible computer system, the print label indicia including predetermined authenticity indicia, ship to address indicia, and level of service indicia. In a preferred embodiment, the label is printed by a customer using the print label indicia at a printer associated with the Internet accessible computer system, and the authenticity indicia are machine readable. The predetermined authenticity indicia preferably are recognized by an order-receiving system or the shipping service provider as indicative of prepaid shipping, and enable personnel of the shipping service provider to recognize that the label is authentic, the authenticity indicia comprising: a billing prepaid indicator region for containing information indicating that the shipment service provided by the shipping service provider has been prepaid; and a predetermined identifying region for containing identifying indicia associated with the shipping service provider.

The preferred method includes displaying information corresponding to selected regions of the label in an Internet browser computer program window opened when the customer accesses an Internet-accessible computer shipping system operated by the shipping service provider, and the step of: automatically formatting a printer for landscape orientation for the label, which is folded in half after printing to form a complete label, whereby the label is receivable in a standard plastic window for an adhesive plastic label provided by the shipping service provider.

Generally described, another aspect of the present invention provides a label for use with a package for handling by an automated package delivery system operated by a shipping service provider, the label being printable by commonly available printers associated with a personal computer system, comprising: a return address region for containing information corresponding to a return address of a package sender; a ship to address region for containing information corresponding to a destination address of an intended recipient for the package; a machine readable postal code region for containing the postal code of the destination address of the intended recipient for reading by optical scanning equipment operated the shipping service provider; a machine readable tracking number region for containing a tracking number associated with the package in a machine readable format for reading by optical scanning equipment operated by the shipping service provider; and authenticity indicia for enabling personnel of the shipping service provider to recognize that the label is authentic, the authenticity indicia comprising: a billing prepaid indicator region for containing information indicating that the shipment service provided by the shipping service provider has been prepaid; and a predetermined identifying region for containing identifying indicia associated with the shipping service provider. The label may also contain a third machine readable encoded region for containing text of the label and other package information in a form readable by an optical scanning device operated by a person associated with the shipping service provider, a human readable sort code region for containing information relating to identification of a hub and sortation belt of automated packaged handling equipment associated with the shipping service provider, a level of service indicating region for containing information corresponding to a selected level of service provided by the shipping service provider for the package, and a number of packages region for containing information corresponding to the number of packages contained in a shipment of a plurality of packages. The tracking number preferably includes an indicium identifying the number as a tracking number, a customer account number, a level of service indicator corresponding to the level of service indicated in the level of service indicating region, and a predetermined reference number determined by the shipping service provider. The customer account number may include payment indicia corresponding to a type of payment by a customer of the shipping service provider for shipment of the package, the payment indicia corresponding, for example, to a pre-established account of the customer with the shipping service provider, or a credit card payment.

Generally described, another aspect of the present invention provides a method for delivering a package by a shipping service provider from a customer to an intended recipient, comprising the steps of: communicating printer indicia to a customer via an Internet connection for printing a label remotely from the shipping service provider, the printer indicia comprising at least machine readable indicia containing shipping information encoded thereon and authenticity indicia; scanning the machine readable indicia on a label affixed to the package at the point of acquisition of the package to obtain the shipping information encoded on the label; verifying the authenticity of the label at the point of acquisition of the package by reference to the authenticity indicia on the label; and in response to verifying the authenticity of the label, introducing the package into the shipping service provider's package handling systems for delivery of the package.

In alternate preferred embodiments, the step of verifying the authenticity of the label comprises visual inspection of the label for the presence of predetermined identifying indicia associated with the shipping service provider, or processing the machine readable indicia to verify that the label includes the predetermined authenticity indicia. In either case, the method preferably also includes the steps of: obtaining shipping information from the customer corresponding to an order to deliver the package via an Internet accessible computer system operated by the customer; validating the shipping information received from the customer; and in response to validating the shipping information, communicating print label indicia to the customer at the Internet accessible computer system, the print label indicia including the predetermined authenticity indicia. The label may be printed by a customer using the print label indicia at a printer associated with the Internet accessible computer system, and the predetermined authenticity indicia may be recognized by an order-receiving system of the shipping service provider as indicative of prepaid shipping.

Generally described, another aspect of the present invention provides a method for shipping a package from a package sender to an intended recipient via a shipping service provider, the package sender having an Internet-accessible computer system, comprising the steps of: providing an Internet-accessible shipping computer system (ISS) associated with the shipping service provider, the ISS operative for receiving shipping information from a package sender via the package sender's computer system; displaying a data entry form on the package sender's computer system for entry of shipping information by the package sender; receiving shipping information entered by the package sender; transmitting the shipping information from the package sender's computer system to the ISS via the Internet; validating predetermined shipping information; in response to validating the predetermined shipping information, communicating predetermined shipping label information for display on the package sender's computer system and printing of a customized shipping label; and acquiring the package and associated customized shipping label for introduction into the shipping service provider's package handling system, whereby the shipping service provider accepts and handles the package with the customized shipping label associated therewith in the same manner as a package having a preprinted shipping label. The shipping information preferably includes information selected from the group comprising: information relating to characteristics of the package, information corresponding to the package sender, information relating to the intended recipient, information relating to payment for the shipping service, and information relating to a service type. In a preferred embodiment, the package sender provides information for verifying that the package sender is authorized to order service from the shipping service provider. The package sender may also select as a mode of entry of the package into the shipping service package dropoff at a dropoff location, or on demand pickup, in which case the method provides the step of automatically dispatching a package pickup to the package sender to pick up the package in response to a determination that on demand pickup of the package has been requested by the package sender.

Generally described, another aspect of the present invention provides a method for verifying the validity of a shipment of a package from a package sender to an intended recipient via a shipper service provider, comprising the steps of: communicating predetermined printer indicia to the package sender, the printer indicia operative for enabling the printing of a customized label on a printer coupled to a computer system associated with the package sender, the customized label including predetermined machine readable security indicia; prior to processing the package for shipment, reading the machine readable security indicia on the customized label with a reading device associated with the shipping service provider; verifying the machine readable security indicia with a verifying device associated with the shipping service provider; and in response to detection of invalid security indicia with the verifying device, indicating the package as invalid. In a preferred embodiment, the method further comprises the step of, in response to verifying the indicia, delivering the package to the intended recipient in accordance with delivery information on the label. The verifying device may be a DIAD, and the step of verifying may be carried out at the point of acquisition of the package by display of information on the DIAD.

Other goals, features, and advantages of the present invention will become apparent upon reviewing the following detailed description of the preferred embodiments of the invention, when taken in conjunction with the drawings and the appended claims.

BRIEF DESCRIPTION OF THE DRAWINGS

FIG. 28 is an exemplary screen display of a DROP-OFF LOCATOR page or screen as generated by a preferred embodiment of the present invention.

FIG. 31 is an exemplary screen display of a CONFIRM PAYMENT page or screen as generated by a preferred embodiment of the present invention.

FIG. 32 is an exemplary screen display of a PRINT LABELS AND RECEIPT page or screen as generated by a preferred embodiment of the present invention.

FIG. 33 is an exemplary screen display of a RECEIPT page or screen as generated by a preferred embodiment of the present invention.

FIG. 34 is an exemplary screen display of a SHIPMENT FINISHED page or screen as generated by a preferred embodiment of the present invention.

FIG. 35 is an exemplary screen display of a SHIPPING HISTORY page or screen as generated by a preferred embodiment of the present invention.

FIG. 37 is an exemplary LABEL DISPLAY page, with an exemplary shipping label, as generated by a preferred embodiment of the present invention.

DETAILED DESCRIPTION OF THE DISCLOSED EMBODIMENT

Overview

Figure 1:
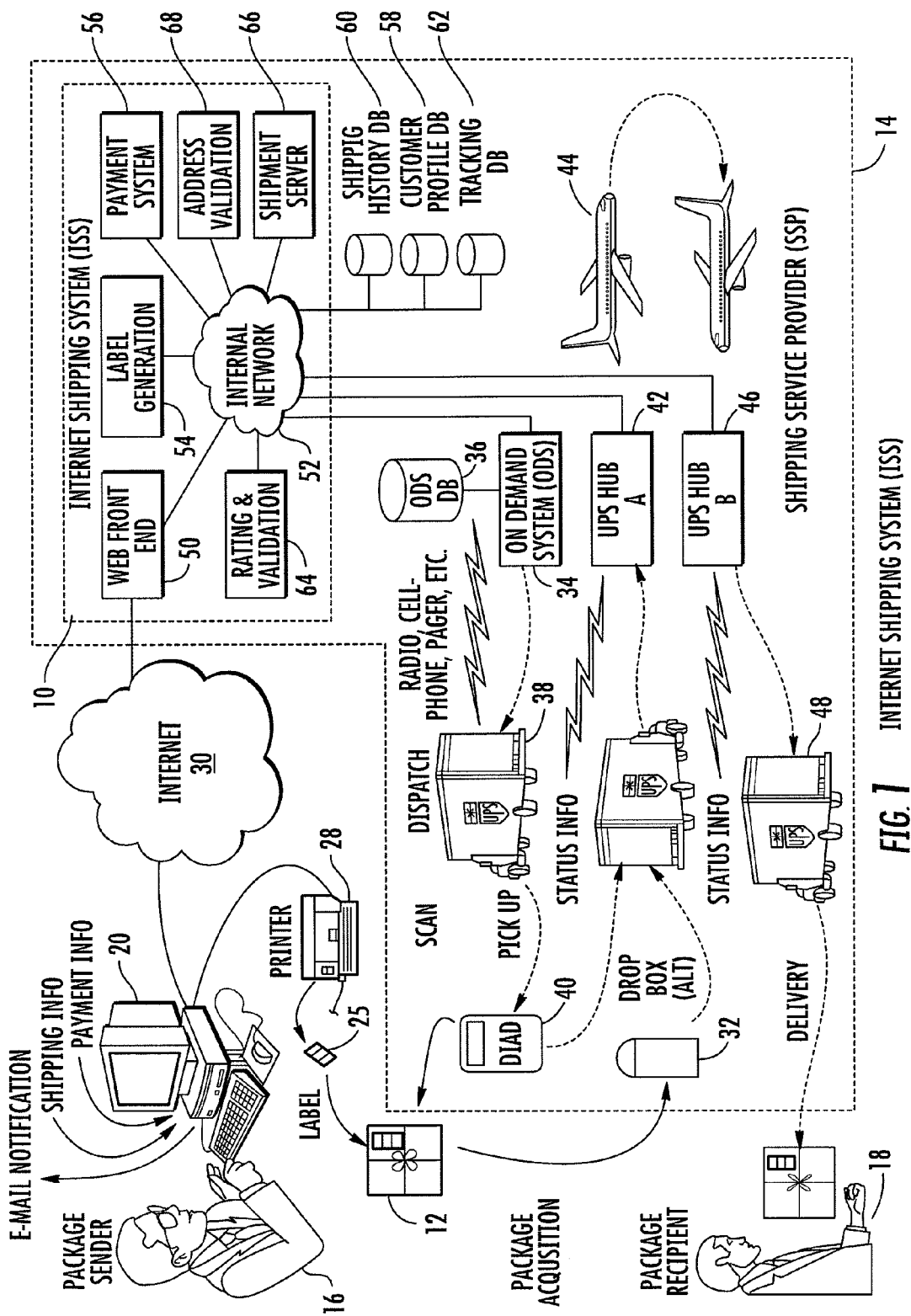
FIG. 1 generally illustrates the shipping of a parcel or package carried out by preferred embodiments of the present invention.

The present invention is directed to data processing systems and methods for use in delivery of parcels or packages from a package sender to a package recipient, delivered by a shipping service provider or carrier. For purposes of the discussion which follows, the terms "carrier" and "shipping service provider" are generally synonymous, and refer to an entity engaged in the delivery of packages. The terms "package sender" and "customer" and "user" of a shipping service provider are also generally synonymous, except that there will be circumstances when a package sender is not the shipping service provider's direct customer, e.g. when an employee of a company ships a package on behalf of the company, the employee may be the package sender while the company may be the customer of the shipping service provider.

Referring now to the drawings, wherein like numerals represent like elements throughout, preferred embodiments of the present invention will now be described. By way of introduction, FIG. 1 pictorially represents the shipping of a parcel or package 12 carried out by a preferred embodiment of the present invention constructed as an Internet shipping system (ISS) 10, operated by a shipping service provider (SSP) 14. The parcel 12 is shipped from a package sender 16 to a package recipient 18, utilizing a network accessible computer or computer-based workstation 20 to communicate with the ISS 10 and provide information required for shipping the package.

In order to communicate with the ISS 10, the package sender 16 employs a computer or computer-based work station 20, to which is connected one or more peripherals that permit interface with the package sender 16. For example, connected to the computer 20 in this embodiment is a video monitor, a pointing device such as a mouse, and a data entry device such as a keyboard. Also connected to the computer is a printer 28. The printer is operative in the usual manner to print a label 25 for affixing to the package 12. These peripherals are connected to the computer 20 in a manner well known to those skilled in the art.

The computer 20 is preferably connected to a global communication network 30 such as the Internet, to which the shipping service provider (SSP) 14 is also connected. Those skilled in the art will recognize and appreciate that the meaning of "communication network" is expansive, including but not limited to a LAN, a geographically dispersed WAN such as an enterprise-wide computer network, a public switched network (PSN) such as a telephone system, a linked cellular system, a wireless data network, or combinations of various computer networking technologies. The illustrated embodiment employs the Internet. It will therefore be understood that when the term "Internet" is used herein, other types of computer and communications networks are also contemplated and considered equivalent.

Although the preferred embodiment is described in connection with a personal computer 20 that is operative with an Internet browser computer program, it should be understood that the invention may be implemented with other types of networked devices, for example but not of limitation, an "Internet Shipping Terminal" (IST), a webphone type device, a web TV device, a label printer, and other types of data processing and printing devices which can be coupled to a computer communication network, wired or wireless.

Generally speaking, a package sender 16 can ship a package 12 from one location to a recipient 18 at a different location by employing the services of a SSP 14 that operates the system 10 and carries out the various methods described herein.

First the package sender 16, interfacing with the computer 20, contacts the SSP 14 through the Internet 30. In response to prompts and queries by the SSP 14, the package sender 16 provides information regarding themselves, the parcel 12 to be delivered, and the recipient 18. In response, the SSP 14 may authorize the package sender 16 to print a shipping label 25 that will be acceptable to the SSP 14 as authorization to process the package 12. The label 25, printed by the package sender's printer 28, is affixed to the package 12 which is then acquired by the SSP 14 for delivery to the recipient 18.

By way of illustration and not limitation, the package 12 is typically tendered to, or acquired by, the SSP by way of one of three methods. The package sender 16 may tender the package 12 to an SSP representative who accepts the package during the normal course of delivery rounds, the package sender 16 who then tenders the package 12 to the location 32 of their choice, or the package sender 12 may send an order requesting the SSP dispatch a representative to the package sender's location at a specified date within a specified time period to pick up the package 12. In the latter two examples, the package sender 16 sends an order to the ISS 10 via the Internet 30 which informs the SSP 14 that a parcel 12 is available for pickup and delivery.

Figure 2:
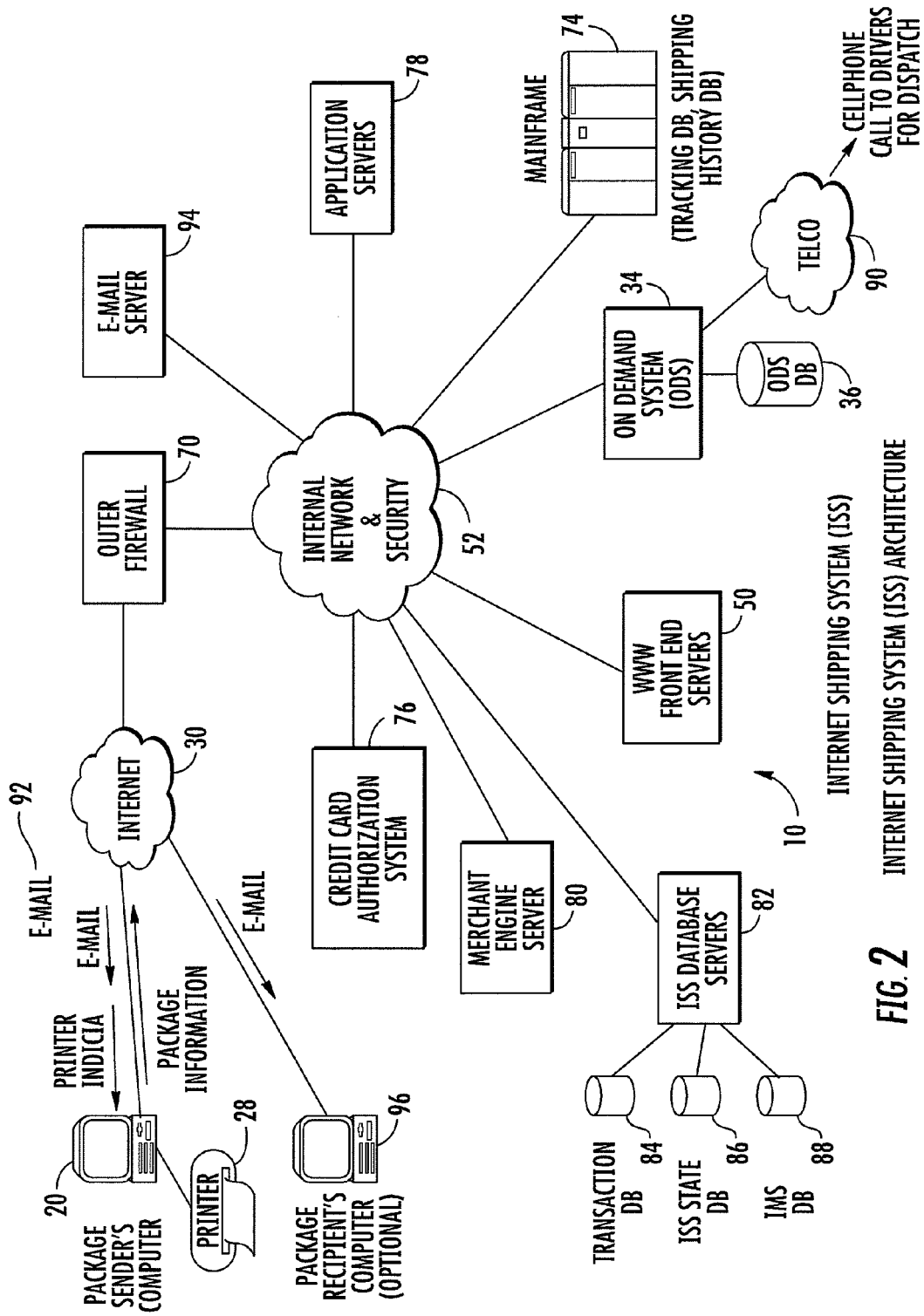
FIG. 2 depicts the system architecture of a preferred embodiment of the present invention.
Figure 3:
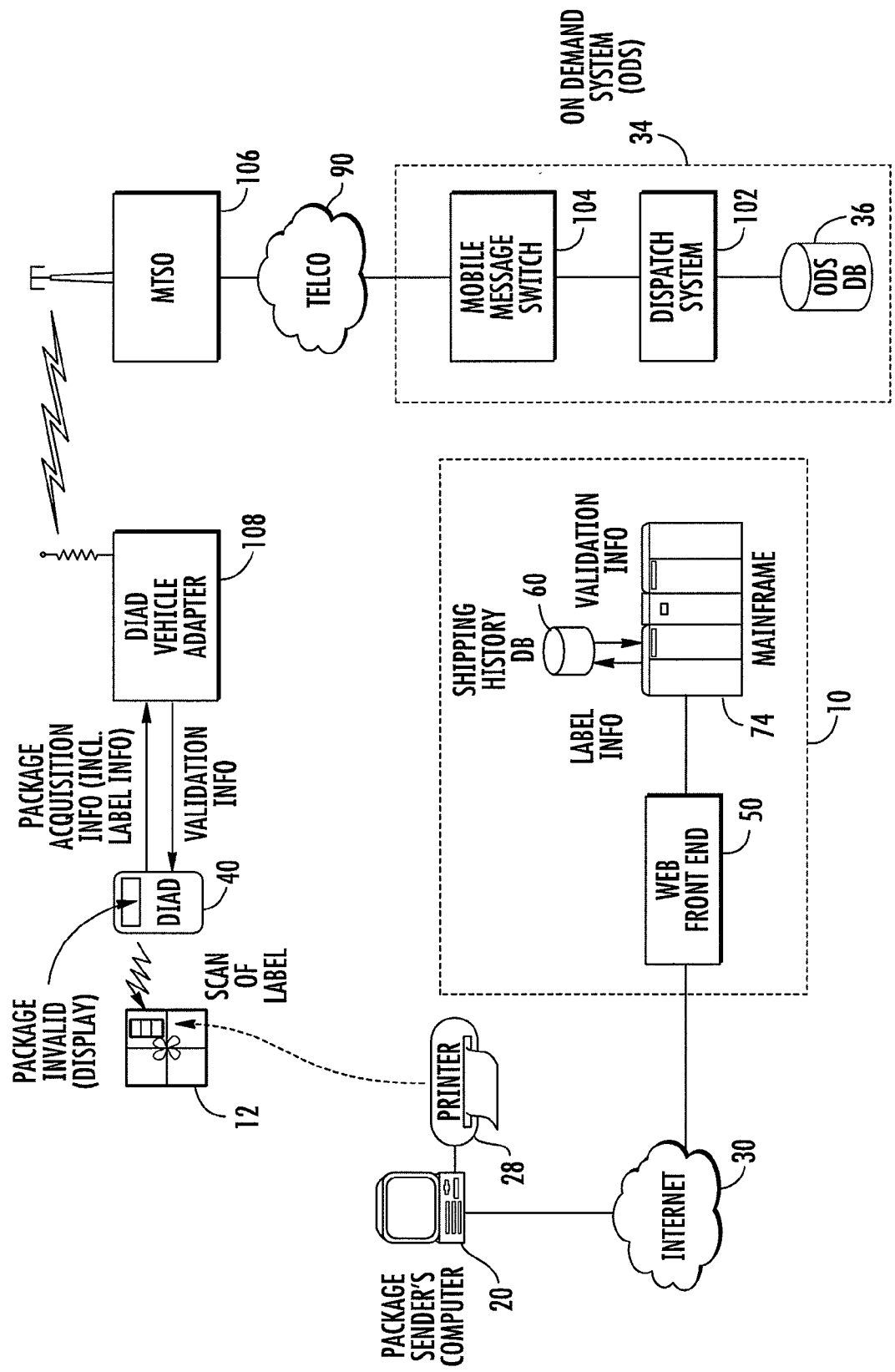
FIG. 3 is a block diagram illustrating aspects of the invention for dispatching the pickup of a package order with an On Demand Services system constructed in accordance with a preferred embodiment of the present invention.

In the case of a request for package pickup as illustrated in FIG. 1, within the ISS 10 the order is relayed to an On-Demand System (ODS) 34. The ODS 34 which is in communication with an ODS database 36, as explained below with reference to FIGS. 2 and 3, is operated to search, identify and dispatch a pickup vehicle 38 to acquire the package 12. In a preferred embodiment the pickup vehicle is a driver and package car or truck. It will be noted that the location of the parcel 12 and the location of the sender 16 may be different. In a preferred embodiment the package sender 16 will direct the SSP 14 to the location of the package 12. Upon acquiring the package 12, the driver employs a delivery information acquisition device (DIAD) 40 to capture data located on the label 25 regarding the package 12, package sender 16, and recipient 18 as necessary to facilitate the delivery.

Other information contained on the label 25, which may be acquired by the DIAD 40 or viewed by a SSP representative, permits the SSP 14 to confirm whether the SSP 14 authorized the printing of the label and therefore the delivery of the package.

Assuming the package 12 with label 25 has been validated for delivery, the SSP takes possession of the package 12 and transports it to an initial sorting hub 42. A sorting hub is well known by those skilled in the art and typically comprises a strategically located facility that receives packages on a local, regional, national, or global level, and directs those packages for transportation to another hub via suitable delivery methods, for example aircraft 44. It will be understood that suitable delivery methods include people, road vehicles, off-road vehicles, planes, ships, trains, or any other method of transportation currently known or to be developed in the future. However, as illustrated in the preferred embodiment, an aircraft 44 typically delivers the parcel 12 to a subsequent sorting hub 46 associated with a distant recipient 18. At the sorting hub 46, the package 12 is sorted and routed to a delivery vehicle 48 dispatched to tender the package 12 to the intended recipient 18.

Still referring to FIG. 1, the ISS 10 provides many functions and processes for carrying out the delivery methods of the present invention. These functions are typically implemented as routines, processes, and database searches within the ISS 10 and systems coupled for communications to the ISS, e.g. a shipping history database 60 or a tracking database 62. In particular, a preferred embodiment provides an Internet World Wide Web (WWW) front end 50 that generates the browser views for display on the package sender's computer 20. The web front end 50 is coupled to an internal network 52 operated by the SSP, which is coupled to other computing functions as described below.

A label generation function 54 is provided for communicating print label indicia to the package sender's computer 20 in response to acceptance of a shipping order from the customer. The label generation function 54 causes the customer's computer 20 to display a customized label image containing certain machine-readable and human-readable information needed for processing and shipping the package. If acceptable by the sender, the sender prints the displayed label 25 at the printer 28.

A payment system 56 provides for processing payment instructions and collecting payment from the customer by charging a valid credit card account, or charging the customer's pre-established SSP account. In another embodiment, payment authorization may be performed by the payment system 56 and actual charging to an account may be performed by a billing system (not shown).

A customer profile database 58 stores information associated with each customer such as their identity, location, default method of payment and preferred shipment delivery type or method.

An address validation function 68 receives address information from the customer and determines whether the address of the intended recipient is valid.

A shipping history database 60 stores information regarding each customer's of prior shipments and makes that information available to the customer upon the customer's request. A record of prior shipments may be maintained for whatever length of time is desirable to the SSP.

A tracking database 62 stores information regarding each customer's current shipment, such as the present location and expected delivery time, and makes that information available upon the customer's request. Tracking is achieved, as well known by those skilled in the art, by scanning and otherwise capturing identification indicia on each package to identify the location of the package and communicate that location to the user upon request.

A rating and validation engine (RAVE) function 64 is operative to process information about the delivery order and determine the shipping rate based on the selected delivery options.

A shipment server 66 receives information regarding an order and communicates package pickup information to the on demand system (ODS) 34. The shipment server also receives status information from the ODS, the vehicles 38, 48, and the hubs 42, 46 for entry into the tracking database 62.

The various functions of the ISS 10 cooperate to provide the functions of receiving a customer order via the Internet 30, processing the order to determine order acceptability, obtaining payment for the level of service requested, transmitting print label information to the customer's computer 20 so that a shipping label 25 may be printed from the printer 28, generating a pickup order for the package, receiving status information from other components within the SSP's system so that the package may be tracked, and creating a shipping history associated with each customer. Further details of these and other functions are provided below.

ISS System Architecture

FIG. 2 illustrates a preferred embodiment of the hardware and network architecture of the ISS 10. A customer desiring to place a delivery order with the SSP 14 accesses the Internet 30 through their computer 20 via their Internet service provider (ISP, not shown). A customer's order is routed through the Internet 30 and one or more outer firewall machines 70 which provide network security in the known manner.

The outer firewalls 70 are connected to an internal network 52 which forms the entrance to the SSP's main Internet web site, e.g., http://www.ups.com. The main Internet web site in the preferred embodiment provides an interface for storage and retrieval of "package level detail" (PLD) information, that is, information concerning specific shipments of specific customers, their status and shipping history.

The shipping server's main Internet web site is generated by a World-Wide Web (WWW) content server and one or more clones for load balancing. Together, the servers and clones comprise the web front end 50 which provides the web pages of the SSP's main web site, and contain plug-ins for running ISS applications and plug-ins for running Internet member services (IMS) applications.

The internal network 52 is connected to a mainframe computer 74, which stores the PLD information associated with the shipment of packages, shipping orders, customer address books, payment method and other information required by the SSP 14 for shipping packages. Other shipment related information such as member profile information may be stored in a different but linked computer, e.g customer profile database 58.

The WWW application servers in the web front end 50 may route data pertaining to shipping orders and delivery to the mainframe computer 74 and retrieve data as required. For example, package specific information, i.e., package level detail (PLD), is uploaded to the mainframe computer 74 for each package 12 processed by the ISS 10. The mainframe computer 74 also stores tracking information that the SSP 14 updates during transportation of the package that allows the SSP 14, user 16, recipient 18, or a third-party to track the location of the package via the Internet. Thus, the mainframe computer 74 provides functions including searching the tracking database 62 and the shipping history database 60 discussed with reference to FIG. 1.

Further, the mainframe computer 74 is responsible for implementing aspects of the ODS 34 such as receiving an order to pick up a package, selecting the appropriate vehicle and/or personnel for picking up the package, and communicating a dispatch order to the selected vehicle and/or personnel to pick up the package. Aspects of the ODS system 34 required for communicating information such as the pickup orders to the appropriate personnel and the returning status information regarding picked up packages, are provided via a data link between a dispatch system 102 (FIG. 3) and the ISS 10.

With continued reference to FIG. 2, the internal network 52 connects the ISS 10 to a credit card processing company's pre-authorization system 76. This connection permits the SSP 14 to validate a customer's credit card and receive payment for the delivery of a package 12.

The internal network 52 also connects ISS application servers 78 to the Internet for provision of the web front end 50. The application servers 78 each provide various ISS applications, profile manager for account maintenance, and a credit card "store-front" to enable customers to pay for shipping services with a credit card. Those skilled in the art will understand that various computing functions provided in the disclosed system may be allocated between WWW front end servers 50 and application servers 78, in a manner as desired for performance, security, scaling, etc.

A merchant engine server 80 and one or more load balancing clones are provided for credit card validation. These servers 80 provide a credit card engine for obtaining credit card authorization while the mainframe 74 performs settlement for customer payments received via credit card. Billing information processed from PLD information in the mainframes 74 can be transmitted to customers or to credit card settlement functions.

The internal network 52 also connects primary and secondary ISS database servers 82 which provide database management and access to a credit card transaction database 84, the state database 86, and a customer profile database 88, called the "Internet member services" database (IMS). The IMS or customer profile database 88 stores customer-specific information including the user name and password, preferred billing methods, preferred shipping methods, and preferred access methods. In accordance with the invention, information stored in the customer profile database 88 is retrieved in response to customer log in and used to populate data fields of various screens for user convenience and ease of use.

As explained in more detail with reference to FIG. 3, the internal network 52 is connected to the ODS 34 which, in turn, is connected to a communication means such as the telephone company (telco) 90 and a cellular telephone network (not shown). Via this connection, the ODS dispatches pickup and delivery vehicles.

Still referring to FIG. 2, the preferred system includes an e-mail server 94 for transmitting and receiving e-mail messages. In a preferred embodiment, and as will be understood by those skilled in the art, an e-mail message 92 may be sent through the e-mail server 94 to the package sender's computer 20 to confirm the sender's order or for other communication purposes, or to a recipient's computer 96 that a package is forthcoming. Further, and alternatively, an e-mail message 92 may be sent to any combination of sender, recipient, or third-party regarding the status of the package at any point along the delivery process including final delivery. Thus, the notion of e-mail notification to various parties of various aspects of package shipment, for example, order acceptance, package pickup, package en route, package delivery expected date and/or time, package delivery confirmation, package delivery type, package contents, etc., is considered within the scope of the present invention.

From the foregoing it will be appreciated that there has been described a system architecture for implementing an Internet-based package shipping system, with various functions for receiving orders to ship packages, arranging for payment of package shipping, arranging for dispatch of vehicles and/or personnel for package pickup, and tracking the progress of a shipment all while providing an easy-to-use and navigate Internet-accessible interface for the customer.

ODS System Architecture

FIG. 3 is a block diagram which generally illustrates the communication flow of a shipment order within the ODS 34 constructed in accordance with the preferred embodiment of the present invention. The sender, in communication with the web front end 50 via the Internet 30, sends a message from their computer 20 requesting pickup service for a certain day and time. The ODS request is made and if successful the payment method is verified and PLD information is uploaded. The ISS 10, after it has collected and validated all the necessary payment, address, and package characteristics for processing the shipment, checks that the requested order date and time is available by searching a database on the mainframe 74. Upon completion of the validation processes, which includes a search of the shipping history database 60 to verify whether the particular shipping label has already been used, the authorization is sent to the sender's computer 20 to print a label on the sender's printer 28 while the order is forwarded to a dispatch system 102 forming a part of the ODS 34.

The dispatch system 102 is a system coupled to the ODS database 36 and to other databases (not shown) that store information about the location and dispatchability of persons and/or vehicles for package pickup and/or delivery. By reference to these databases, the dispatch system, upon receipt of a dispatch order, logs the order into the ODS database 36 and determines which person and/or vehicle is available to pick up the package within the date, time, and location parameters provided in the pickup order.

At the dispatch system 102, the order is processed, queued, and after a person and/or vehicle is selected for pickup, directed to a mobile message switch (MMS) 104, also a part of the ODS 34. The MMS is operative for transmitting the dispatch order to a selected person and/or vehicle via a communication means, such as radio, an e-mail message delivery system, a cellular telephone system, a pager system, a wireless personal communication system (PCS), an ARDIS network, Bluetooth devices, slotted ALOHA, or other proprietary or non-proprietary data communications system. Those skilled in the art will understand and appreciate that the term "communication means" is expansive and the examples provided are by way of illustration and not limitation. The communication means illustrated and other equivalent message delivery methods may be employed to communicate a dispatch order to a selected person and/or vehicle for package pickup.

In the illustrated embodiment, the order is sent from the MMS 104 through a telephone connection to the telephone company (telco) 90 to a mobile telephone switching office (MTSO) 106. From the MTSO 106 the order is communicated via a cellular telephone link to a DIAD vehicle adapter (DVA) 108 associated with a vehicle that has been selected by the dispatch system to pick up the package. The DVA 108 is a communication device located within each SSP vehicle, and interfaces between a DIAD 40 and the communication means for linking to the SSP 14. As will be understood by those skilled in the art, a DIAD is a Delivery Information Acquisition Device operative to scan and acquire information from machine-readable regions of the package label, receive entry of information by SSP representatives, receive and capture a package recipient's signature, and display information to the SSP representatives, among other things.

Upon dispatch, the SSP's vehicle (e.g. vehicle 38 in FIG. 1) arrives at the package's location during the date and time range specified in the order. The SSP's representative begins processing the package(s) using the DIAD 40 to acquire data via input devices such as an associated keyboard, barcode scanner, and a signature capture device. Upon capturing the data related to the package, the DIAD 40 is redocked with the DVA 108. The information contained in the DIAD is then communicated to the SSP's data center via the associated communication means.

In accordance with the invention, the DIAD captures package acquisition information including label information, which is used to validate the package. In particular, the SSP may wish to ensure that the particular label has not been duplicated and fraudulently used on another package. The disclosed label, described in detail below, includes predetermined machine readable indicia, implemented as a barcode region, that serves as a unique indicia (e.g. the 1Z tracking number) which can be used to ensure that only a single instance of the label is accepted into the SSP's system. Accordingly, the package acquisition information and label information is communicated upstream from the DIAD, the DIAD vehicle adapter, through the ODS system, and to the mainframe 74 in the ISS 10. At the mainframe 74, the label information, for example the 1Z number which is a unique number, is used to index into a database, for example the shipping history database 60, to ensure that there are no multiple instances of the number in the database. If so, there is a possibility of fraud; if not, the package is validated. The results of the database lookup are transmitted back downstream to the DIAD 40, where a "package invalid" message may be displayed on the DLAD display to indicate the package as invalid. In this case, the SSP personnel may decline to accept the package. Of course, in the event that the package is validated, for example by verifying that the 1Z number remains unique in the system, a similar "package valid" message may be communicated downstream to the DIAD to signal the SSP personnel to proceed with acquisition of the package.

From the foregoing, those skilled in the art will understand that there has been described a system and method for verifying the validity of a shipment of a package from a package sender to an intended recipient which first involves communicating predetermined printer indicia to the package sender, the printer indicia operative for enabling the printing of a customized label on a printer coupled to a computer system associated with the package sender. The label includes predetermined machine readable security indicia, for example the bar coded 1Z number, to be described below in connection with the label. Prior to processing the package for shipment, the machine readable security indicia on the customized label is read with a reading device associated with the shipping service provider, for example the DIAD. The machine readable security indicia is verified by transmitting the machine readable indicia to the ISS 10 and databases associated therewith, and determining whether the indicia is valid, for example whether the 1Z number is duplicated in the system. In response to detection of invalid security indicia with the verifying device, the package is indicated as invalid, for example by communicating a "package invalid" message downstream for display on the DIAD.

Internet Shipping System Methods

Overview

Figure 4:
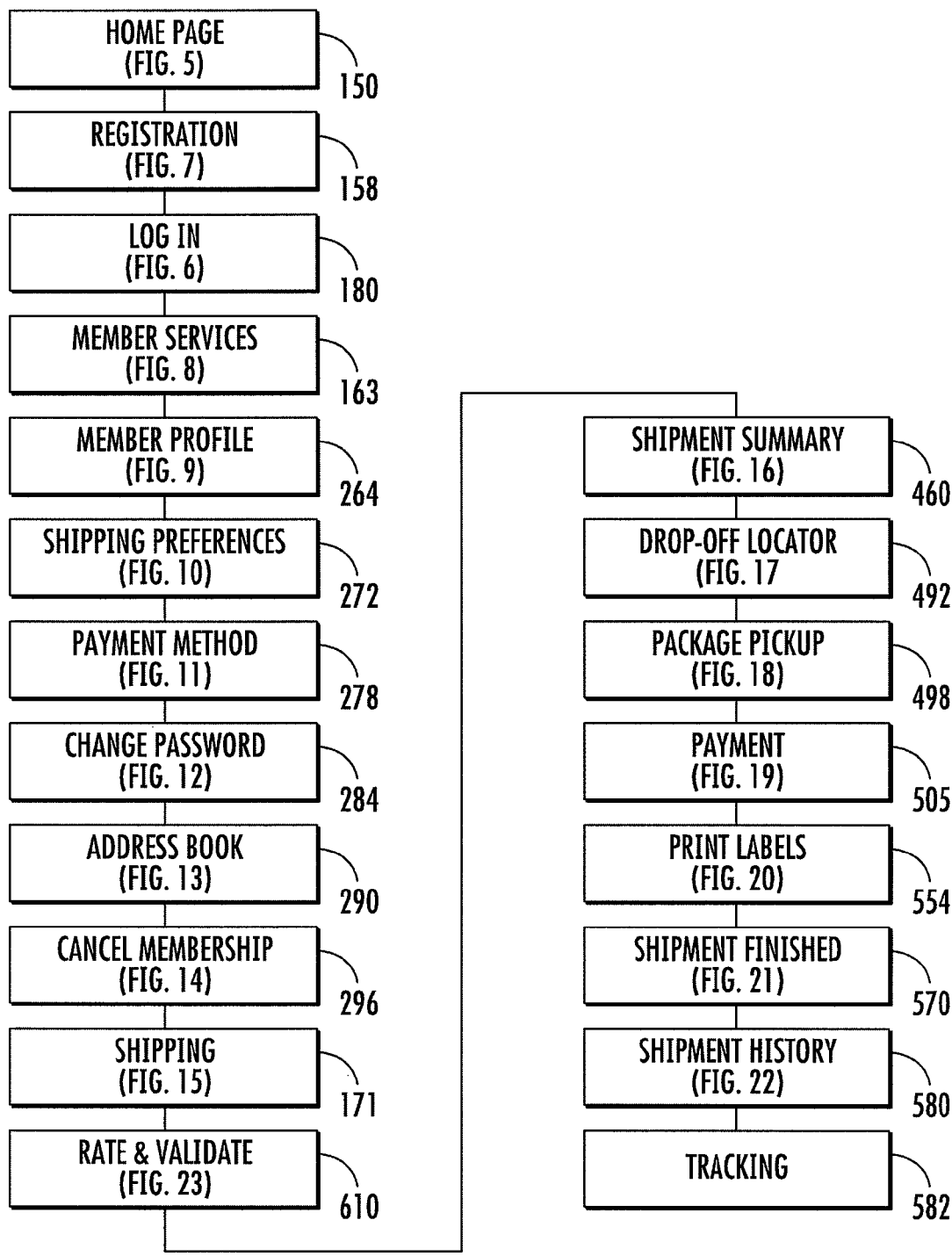
FIG. 4 illustrates various Internet shipping system functions, processes, and routines of preferred embodiments of the present invention.

With the foregoing description in mind, turn now to FIG. 4 for a discussion of the various computer-implemented processes for carrying out the methods of the preferred embodiments of the present invention. Although the preferred embodiments are generally described with reference to an Internet accessible personal computer (PC) operated by a customer or package sender and a Internet web site operated by a SSP, those skilled in the art will recognize that the present invention can also be implemented in conjunction with other program modules for other types of computers.

Furthermore, those skilled in the art will recognize that the present invention is preferably implemented in a distributed or networked computing environment such as the Internet. In a distributed or networked computing environment like the Internet, program modules may be physically located in different local and remote memory storage devices. Execution of the program modules may occur locally in a stand-alone manner or remotely in a client/server manner. By way of illustration and not limitation, distributed computing environments include local area networks (LAN) of an office, enterprise-wide area networks (WAN), and the global Internet (wired or wireless connections). Accordingly, it will be understood that the terms computer, operating system, and application program include all types of computers and the program modules designed to be implemented by the computers.

The discussion of methods which follows is represented largely in terms of processes and symbolic representations of operations by conventional computer components, including a central processing unit (CPU), memory storage devices for the CPU, connected display devices, and input devices. Furthermore, these processes and operations may utilize conventional computer components in a heterogeneous distributed computing environment, including remote file servers, remote computer servers, and remote memory storage devices. Each of these conventional distributed computing components is accessible by the CPU via a communication network.

The processes and operations performed by the computer include the manipulation of signals by a CPU, or remote server such as an Internet web site, and the maintenance of these signals within data structures reside in one or more of the local or remote memory storage devices. Such data structures impose a physical organization upon the collection of data stored within a memory storage device and represent specific electrical or magnetic elements. These symbolic representations are the means used by those skilled in the art of computer programming and computer construction to most effectively convey teachings and discoveries to others skilled in the art.

For the purposes of this discussion, a process is understood to include a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, bytes, words, values, elements, symbols, characters, terms, numbers, points, records, objects, images, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, positioning, placing, and altering which are often associated with manual operations performed by a human operator. The operations described herein include machine operations performed in conjunction with various input provided by a human operator or user that interacts with the computer.

In addition, it will be understood that the programs, processes, routines and methods described herein are not related or limited to any particular computer or apparatus, nor are they related or limited to any particular communication network architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

With the foregoing in mind, FIG. 4 illustrates various functions, processes, or routines carried out by preferred embodiments of the present invention which the package sender 16 or the ISS 10 executes in order for the SSP 14 to deliver a package 12. FIG. 4 also illustrates these functions in a typical order of execution. The functions or processes in this figure are carried out in the disclosed embodiment of the present invention by software executing on the ISS 10, in conjunction with a browser computer program executing on a package sender's computer 20, when each are connected to the Internet 30 and in communication with each other. It will be understood that the processes and methods presented here may be arranged differently. In other words, some processes and methods may be deleted, repeated or blended to form similar processes and methods.

Home page 150 includes the process by which the SSP's Internet home page is generated and displayed to a user or customer. From the home page the user may initiate the shipping process or other related process. A HOME PAGE routine is described below in greater detail with reference to FIG. 5.

Registration 158 includes the process by which a customer establishes an Internet Services Account (ISA) with the SSP. The ISA, which includes but is not limited to an Internet Services Account Profile (ISAP), shipping preferences, and certain default information, is included in a preferred embodiment to access and use the ISS 10. In this description, terms such as "package sender", "customer", "user", and "owner" designate the party interfacing with the ISS to ship a package. Registration is described below in greater detail with reference to FIG. 7.

Upon registration, a customer chooses a user ID and password. This means of identification allows the customer's preferences for payment, shipment methods, address book, etc. to be retrieved from the mainframe 74 (FIG. 2) and utilized for a package shipment when the customer logs into the ISS 10.

Log in 180 includes the process by which a customer may be identified and authenticated before they receive access to their ISA and are permitted to conduct shipping transactions. Log-in is described below with reference to FIG. 6.

Member services 163 includes the process by which a user or customer obtains access to his or her ISA for maintenance of information stored in the account, including the password, address book, shipping preferences, payment methods, etc. Member services is described below with reference to FIG. 8.

Member profile 264 includes the process by which a user or customer views and changes their member profile. Member profile is described below with reference to FIG. 9.

Shipping preferences 272 includes the process by which a user or customer views and changes his or her shipping preferences. Shipping preferences is described in below with reference to FIG. 10.

Payment method 278 includes the process by which a user or customer sets up a preferred or default payment method. Payment method is described in greater detail below with regard to FIG. 11.

Change password 284 includes the process by which a user or customer changes his or her password for obtaining access to member services and related account administration functions. Change password is described below with reference to FIG. 12.

Address book 290 includes the process by which a user or customer adds or changes an entry in his or her address book of intended recipients. Address book is described below with reference to FIG. 13.

Cancel membership 296 includes the process by which a user or customer cancels his or her ISA. Cancel membership is described below with reference to FIG. 14.

Shipping 171 includes the process by which a user or customer ships a package using the Internet-accessible functions. Shipping is described detail below with reference to FIG. 15.

The shipping process occurs after a valid login. Here, the service options or accessories are selected, the billing/payment method is selected, and PLD information is routed to the mainframe computer 74 (FIG. 2). For the purpose of this description the term "accessories" generally refers to optionals added to standard shipping including but not limited to declared value, signature requirements, E-mail notification, and special handling instructions.

Rate and validate 610 includes the process by which the ISS receives and processes information from the relevant database to validate shipping addresses and calculate payment for the selected package type and shipping service. Rate and Validate is described below with reference to FIG. 23.

Shipment summary 460 includes the process by which a user or customer views and/or edits information about a shipment about to be ordered and is informed as to the cost of the shipping service. Shipment summary is described below with reference to FIG. 16.

Drop-off locator 492 includes the process by which a user or customer obtains information about possible drop-off locations for depositing of a package with the SSP. Drop-off locator is described below with reference to FIG. 17.

Package pickup 498 includes the process by which a user or customer can elect pickup of a package by the SSP. Package pickup is described below with reference to FIG. 18.

Payment 505 includes the process by which a user or customer pays for the shipping service. Payment is described in greater detail below with reference to FIG. 19.

Print labels 554 includes the process by which a user or customer prints a shipping label 25 on the user's printer 28 (FIG. 1), using print indicia provided by the ISS. Print labels is described below with reference to FIG. 20.

Shipment finished 570 includes the process by which a user or customer finishes an order for shipping a package with the ISS. Shipment finished is described below with reference to FIG. 21.

Shipment history 580 includes the process by which a user or customer retrieves and views information about prior shipments, including status information. Shipment history is described below with to FIG. 22.

Tracking 582 includes the process by which the sender 16, the recipient 18, the SSP 14, or a third party may track the location or progress of a package 12. In a manner familiar to those skilled in the art, package identification information is captured at various locations within the SSP's structure. This information is used to identify the last known location of the specific package at any given time. Each time this information is captured it is transmitted to the tracking database 62 located on the mainframe 74.

Although not described separately, it should be understood that the tracking process 582 is operative to retrieve information from a tracking database 62 (FIG. 1). The tracking database is implemented as a database maintained within the mainframe computer 74 utilized by the shipping service provider, which makes PLD information available to the ISS 10 so that customers may access and view tracking information about their package shipments. The tracking process generates display screens somewhat similar to those of FIG. 35 and FIG. 36, except that the information is specific to a particular package and its status and/or location within the SSP's system.

Prior to describing the various processes and routines involved with shipping a package, it will be understood that a user or customer must first register with the SSP and establish an ISA. Registration is described below in connection with FIG. 7. A non-registered user registers with the SSP by generally providing identification, payment method, addressee information and shipping preferences. Thereafter, a registered user can immediately ship a package with the SSP as described in detail below. Until the user cancels their membership, they can ship with the SSP after logging in.

A customer is able to modify all user entered data maintained in their ISAP. The ISS 10 will revalidate any modification made to an ISAP data element that requires validation during registration. During the registration process, confidential data such as credit card numbers preferably do not appear on the interface screen in a readable form. User provided registration data elements are preferably transmitted from the user's computer system to the system 10 via a secure communication protocol. In addition, the user interface preferably makes it clear to the user that their data is transmitted to the SSP in an encrypted form to ensure privacy.

Registration data elements include, but are not limited to, user ID, password, credit card information, user's name, user's address, user's telephone number, and user's e-mail address. Data elements that require validation include city, state and postal code, credit card account name, credit card number and credit card expiration date. A user's password and credit card number is preferably not stored in any database in their native, human-readable form.

The ISS preferably validates and transmits credit card data to a credit card authorization system 76 (FIG. 2). The major functions of the authorization system include blocking, authorizing, and billing credit card accounts. Credit card blocking includes reserving a dollar amount on a credit card for a soon-to-be-posted credit card bill. Authorizing includes validating that the credit card information provided is accurate. Billing includes the actual transaction that occurs after the transaction has been approved by the user and released.

In a preferred embodiment, the ISS validates the ISA account information from data entered on the package processing screen or from the registration screens. Validation requires that complete account information is entered. If the data entered is not validated by the ISS, the erroneous data may be identified to the user for correction. The user may have multiple attempts to correct the data prior to canceling the transaction.

If the ISA does not allow Internet transactions, then a message should be displayed which reveals the ISA is not authorized for Internet shipping. It will be understood that the ISA could be enabled and or disabled by either the owner or the SSP. If the account has been disabled, then the ISS preferably alerts the user that a change was made to the account and that it is no longer Internet-authorized.

Third party and freight collect transactions are governed by existing business rules that are subject to change. The ISS preferably follows the currently existing rules and does not perform any third party or freight collection validation against an internal shipping service provider database. It will be understood that a change to the database may permit a previously prohibited transaction.

HOME PAGE Routine

Figure 5:
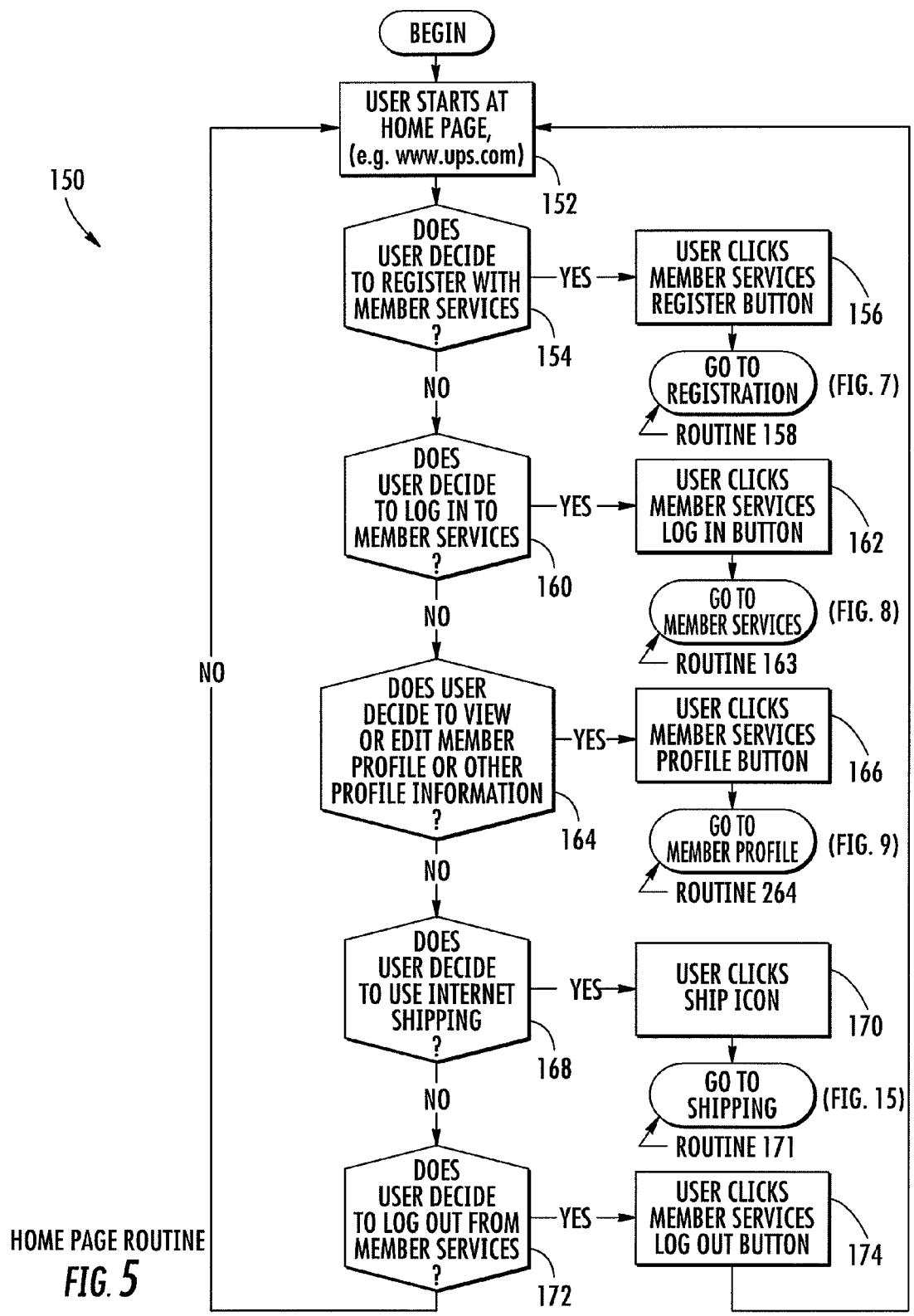
FIG. 5 is a flow chart of a HOME PAGE routine employed in a preferred embodiment of the present invention.

Turn now to FIG. 5, for a discussion of the manner in which a customer obtains access to the SSP's web site, typically by accessing an Internet-accessible HOME page and navigating to appropriate pages for registering as a customer, logging in to the ISS to ship a package, or logging into, or maintaining the customer's Internet Services Account Profile (ISAP). FIG. 5 illustrates a routine 150 operative to display the SSP's Internet WWW HOME page 630 (FIG. 24) and await user input to register, log in as a member to ship a package, or log in as a member to maintain the ISAP.

Figure 24:
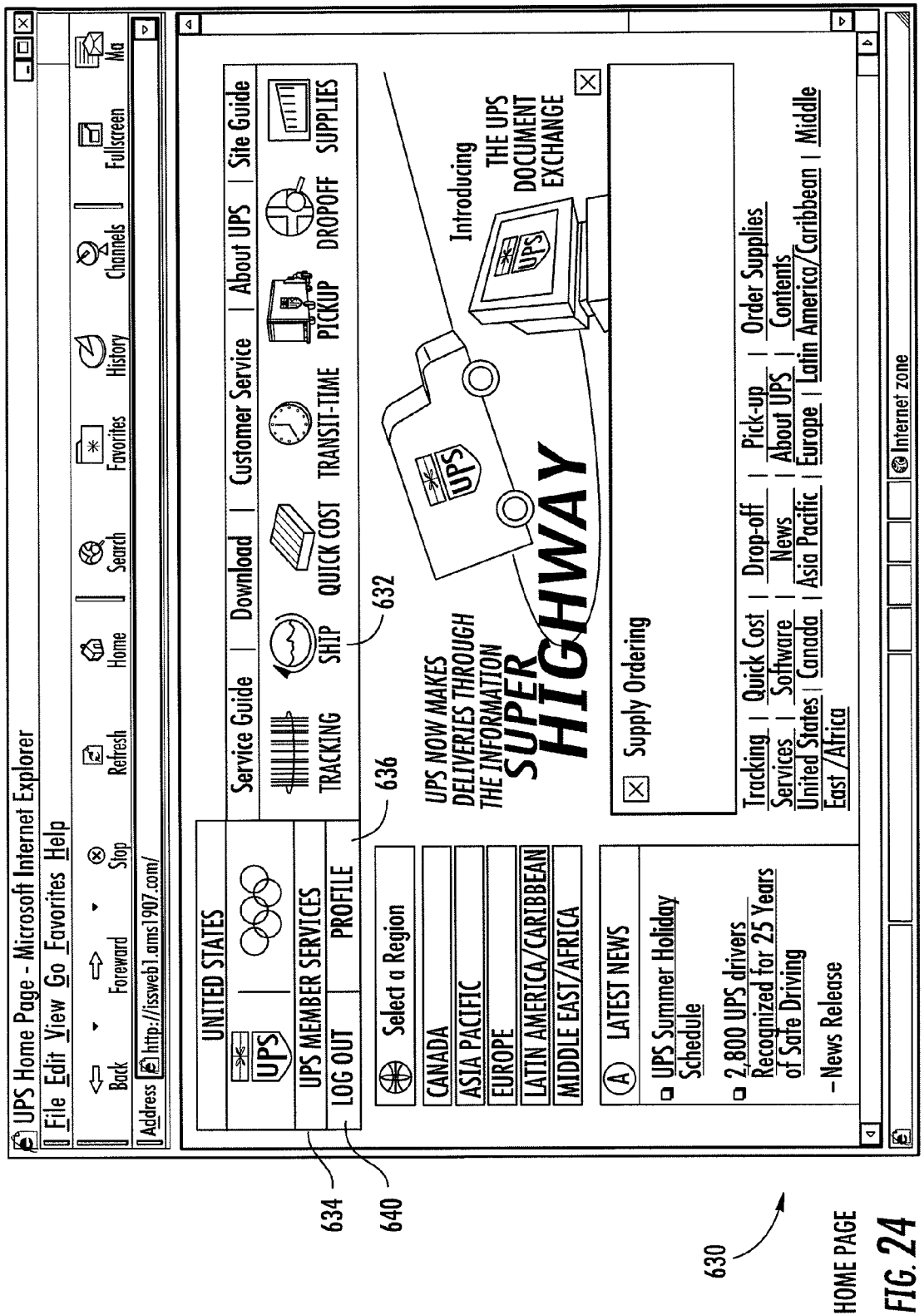
FIG. 24 is an exemplary screen display of a HOME page or screen as generated by a preferred embodiment of the present invention.

Starting at step 152, the user typically accesses the SSP's web site by entering the URL of the site (http://www.ups.com in the disclosed embodiment) in the URL entry area of the browser software, causing display of the SSP's HOME page 630 such as shown FIG. 24. The system then awaits user input of selecting buttons.

At decision 154, the system tests to determine whether the user has decided to register as a customer, which would be an expected response for an unregistered prospective customer. If affirmative, the routine 150 branches to step 156 in response to the user selecting on a MEMBER SERVICES button (e.g. 634 in FIG. 24), and the routine branches to the REGISTRATION routine 158, described below with reference to FIG. 7. Otherwise, the routine 150 proceeds to decision 160.

At decision 160, the system tests to determine whether a previously-registered user has decided to log in to member services, for example, when the customer wishes to access and maintain their ISAP to change shipping preferences or payment method, etc. Log in is the process by which a registered user accesses the ISS to ship a package, and permits the user to access the ISS without the need to re-enter profile information. The routine 150 branches to step 162 in response to the user selecting on the MEMBER SERVICES button 634 (FIG. 24), and the routine branches to the MEMBER SERVICES routine 163, described below in connection with FIG. 8 and presents the user with a LOG IN screen FIG. 24. Otherwise, the routine 150 proceeds to decision 164.

At decision 164, the system tests to determine whether a previously-logged in user has decided to view or edit their member profile ISAP or other profile information. If so, the routine 150 branches to step 166 in response to the user selecting the PROFILE button 636 (FIG. 24), and the routine branches to the MEMBER PROFILE routine 264, described below in connection with FIG. 9. Otherwise, the routine 150 proceeds to decision 168.

At decision 168, the system tests to determine whether the user has decided to ship a package. If so, the routine 150 branches to step 170 in response to the user selecting on the SHIP button 632 (FIG. 24), and the routine branches to the SHIPPING routine 171, described below in connection with FIG. 15. Otherwise, the routine 150 proceeds to decision 172.

At decision 172 the system tests to determine whether the user has decided to log out from member services. If so, the routine 150 branches to step 174 in response to the user selecting on the LOG OUT button 640 (FIG. 24). The user is logged out of the member services area and the routine 150 returns to step 152 to await further user input.

LOG IN Routine

Figure 25:
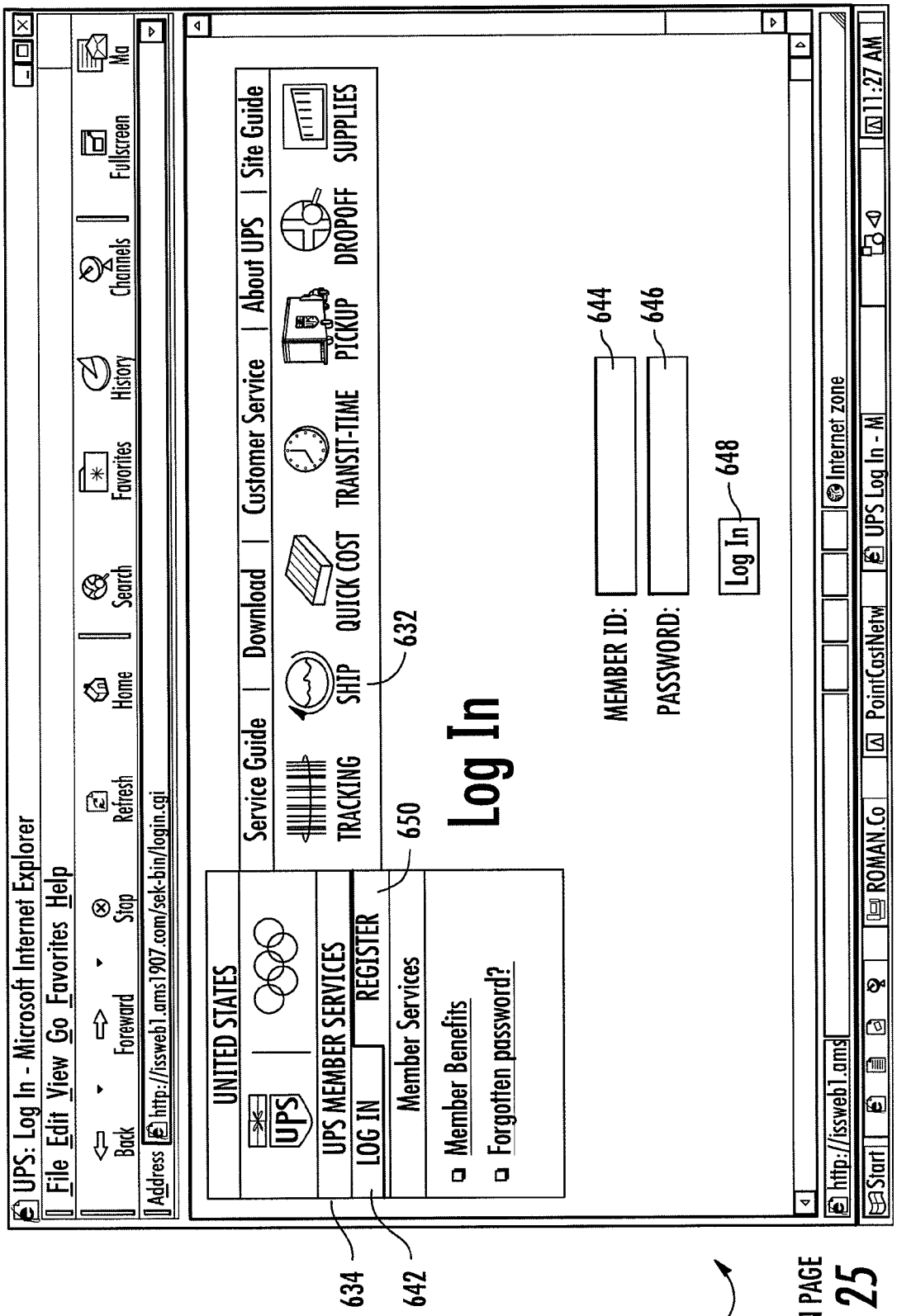
FIG. 25 is an exemplary screen display of a LOG IN page or screen as generated by a preferred embodiment of the present invention.

From the HOME page, in response to selecting either the SHIP icon 632 or the LOG IN button 642 from MEMBER SERVICES the ISS 10 is operative to execute a LOGIN routine 180 (FIG. 6) and display LOG IN page or screen 182 as illustrated in FIG. 25. The LOG IN routine 180 is operative to receive a registered user's ID and password and allow access to the ISS for shipping packages and retrieving status information, and to direct a new user to a REGISTRATION page if the user has not yet registered.

Figure 6:
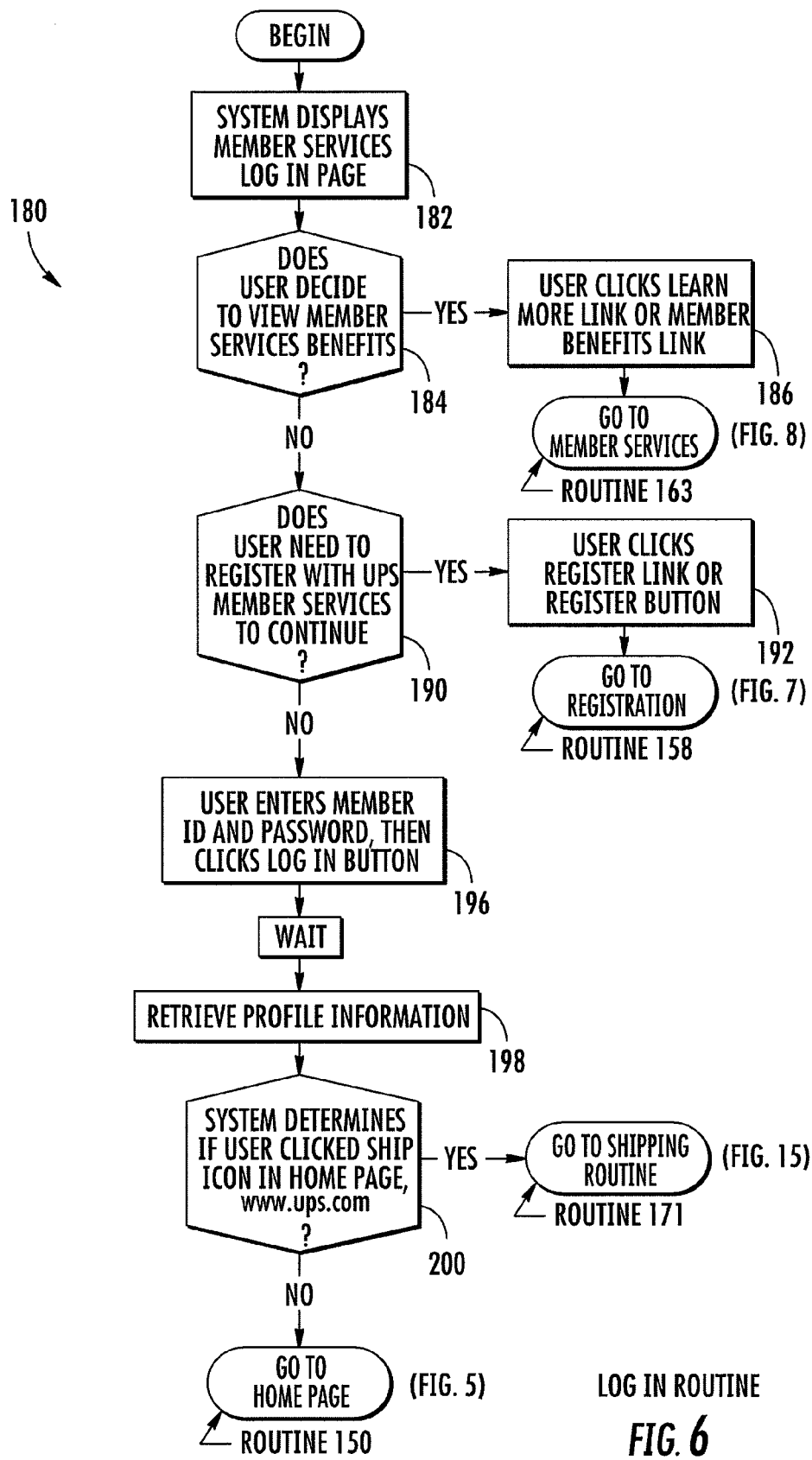
FIG. 6 is a flow chart of a LOG IN routine employed in a preferred embodiment of the present invention.

Turning now to FIG. 6, there is illustrated a preferred LOGIN routine 180 which starts at step 182 by displaying a LOGIN page, such as that shown in FIG. 25, and then awaits user input. The LOGIN page includes data entry fields for user entry of a member ID 644 and password 646. A pre-registered customer or member user can log in by entering a valid member ID at ID field 644, and a valid password at PASSWORD field 646. Thereafter, the user selects the LOG IN button 648.

However, if the user has not yet registered, other steps are required. From step 182, step 184 tests whether the user has elected to view member services or benefits, and if so, branches to step 186 to ascertain if the user has selected a button or link (not shown) to learn more about the SSP's or a link to access information about member benefits. If affirmative, the routine branches to the member services routine 163 (FIG. 8), described in detail below.

If at step 184 the user has not decided to view member services, then at decision 190 the system tests whether the user has elected to register as a customer or member. If so, the user selects a register link (not shown) or REGISTER button such as button 650 (FIG. 25), and, branches to step 192. From step 192, the routine branches to a REGISTRATION routine 158 (FIG. 7), described in detail below.

If at decision 190 the user does not need or elect to register, the routine proceeds to step 196 to receive user input of member ID and password in the respective fields, and await selecting of the LOG IN button 648. In response to selecting the LOG IN button 648, at step 198 the system retrieves the users ID and password for validation. At decision 200 the system determines if the user arrived at the LOG IN screen 182 by selecting the SHIP icon 632 from the SSP's home page. If so, the ISS directs the user to the SHIPPING routine 171 described below with regard to FIG. 15. If not, the system directs the user to the ISS HOME PAGE routine 150 described above with reference to FIG. 5.

As one skilled in the art understands, which page a user returns to is a design choice.

Where an non-registered user has inadvertently found their way to the LOG IN screen 182, the ISS provides the opportunity to register by selecting a REGISTER button 650 (FIG. 25). Selecting this button will direct the user to the REGISTRATION routine 158 described below with reference to FIG. 7.

If the ISS determines the user did select the SHIP icon 632 from the SSP's home page, the ISS authenticates a user's access to their ISA. Once authenticated, the ISS permits a user to perform any of these shipping related functions described herein. In a preferred embodiment customers are not required to re-access the ISS if they change URLs or perform other unrelated shipping tasks within a predefined time period.

From the LOGIN page 182 the user may view the Member Services benefits by selecting the MEMBER SERVICES button 634. In response the ISS will direct the user to the MEMBER SERVICES routine 163 described below with reference to FIG. 8.

REGISTRATION Routine

Figure 7A:
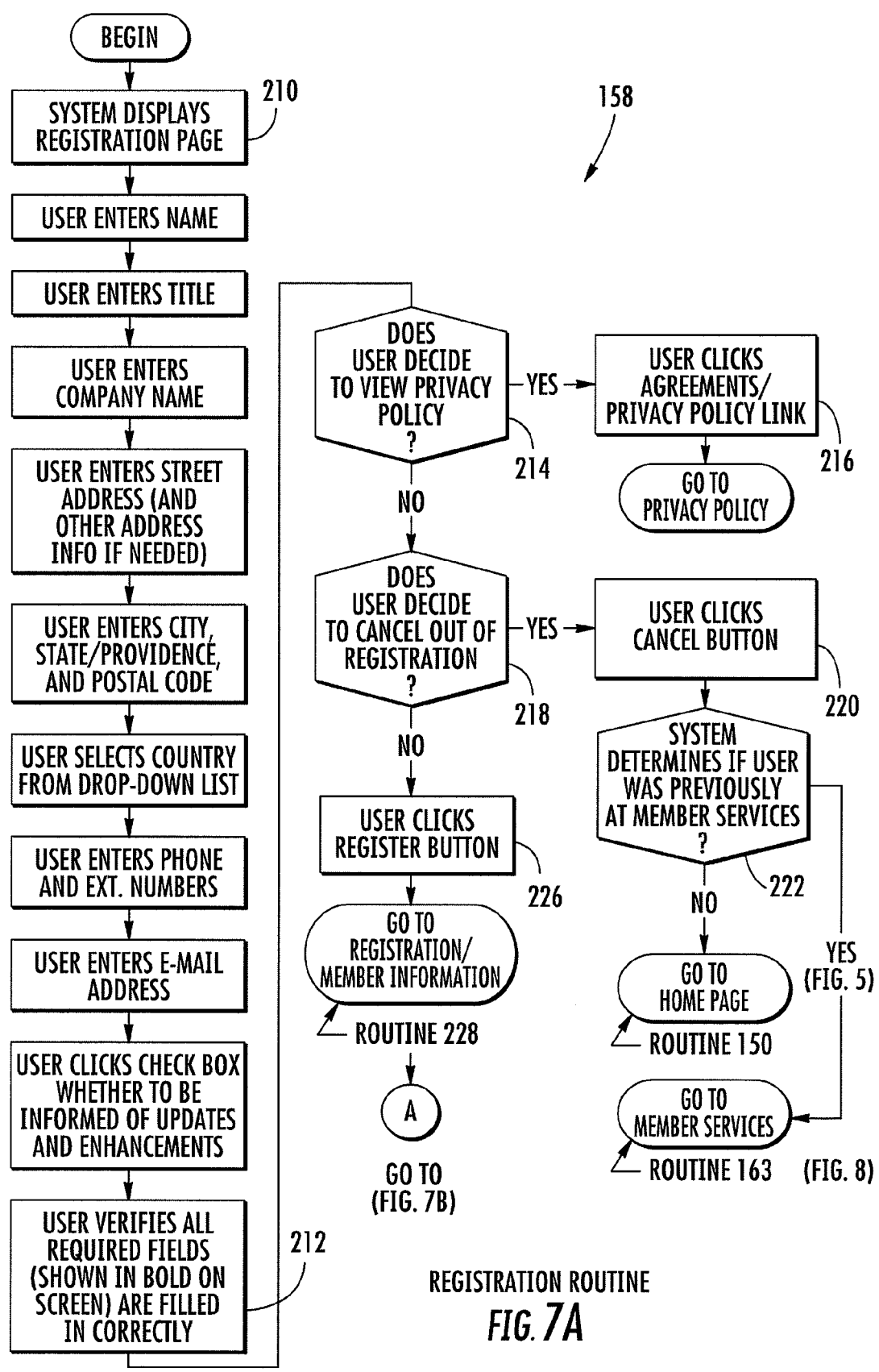
FIG. 7, consisting of FIGS. 7A and 7B, is a flow chart of a REGISTRATION routine employed in a preferred embodiment of the present invention.
Figure 7B:
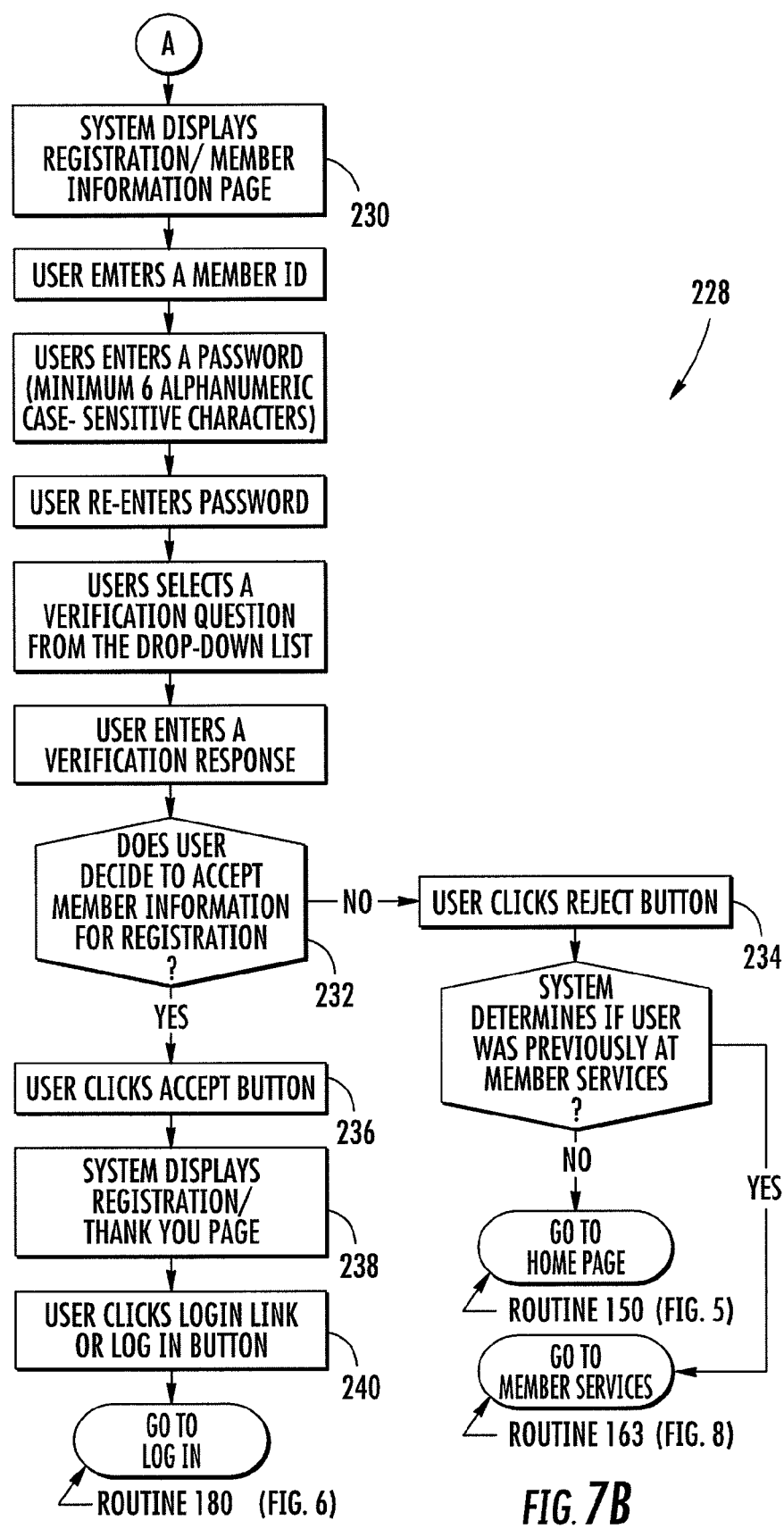

Turn now to FIG. 7 for a discussion of a routine 158 of a preferred embodiment for member registration. Registration is the process that each non-registered user initiates to establish an Internet Services Account Profile (ISAP). In a preferred embodiment, a customer establishes an ISAP before being allowed to ship a package. Pertinent data such as location, shipping preferences, and default billing information is entered by the non-registered user to create the ISAP.

In response to invoking the REGISTRATION routine 158, the system displays a REGISTRATION screen or page (not shown) at step 210. Although not shown in the figures, the REGISTRATION screen prompts the registering user to respond to certain queries by providing information such as, but not limited to, the user's name, their title and company name if applicable, their address including city, state/province and postal code, and the country of origin. Further, the registering user provides telephone numbers, an e-mail address, and may choose whether to be informed of updates and enhancements to the ISS. It will be understood that such information may be input through a data entry device in communication with the computer 20 or selected from pull-down screens.

After the registering user provides the information requested, at step 212 they verify that all required fields are correctly filled-in. At decision step 214, the registering user can decide whether to view a privacy policy (or other agreements) by selecting an AGREEMENTS button (not shown) at step 216. In response, the system will display the information about the user agreement and privacy policy for the registering user to view.

At decision step 218, the registering user can decide whether to cancel or proceed with registration. If at decision 218 the user decides to cancel out of registration, they select the CANCEL button (not shown) at step 220. In response, the ISS determines if this party was previously registered. If this user was not previously registered, at step 222 the user is returned to the HOME PAGE routine 150 and display of the SSP's home page. If the ISS determines the person was previously registered, the ISS branches to routine 163 and displays the SSP's MEMBER SERVICES screen described below in detail with reference to FIG. 8.

If at decision 218 the user chooses to continue the registration process, the user selects a REGISTER button (not shown) at step 226 to access a REGISTRATION/MEMBER INFORMATION screen (not shown), and the process branches to routine 228 to establish a member ID and password, and receive the user's acceptance of registration. At step 230, the system displays a REGISTRATION/MEMBER INFORMATION screen (not shown). Although not shown, the REGISTRATION/MEMBER INFORMATION screen initially prompts a user to enter an ID and a password, to reenter the password, to select a verification question from a drop-down list, and finally to enter a verification response.

After registration is complete and when the user returns to conduct a transaction, the user will only be prompted to enter the member ID and password on a LOG IN screen such as shown at 182 in FIG. 25.

Still referring to FIG. 7 at step 232 the user decides whether to accept the provided information for registration. If the user decides to reject any of the input information, or declines to register, the user selects a REJECT button (not shown) on the screen at step 234. In response, the system determines if the registering user was previously registered at MEMBER SERVICES. If this user was not previously registered, the ISS returns the user back to the HOME PAGE routine 150 (FIG. 5) and display of the SSP's home page (FIG. 24). If the ISS determines that this user was previously registered, the system directs them to a member services routine 163 and display of a MEMBER SERVICES screen described below with reference to FIG. 8. If the registering user chooses to continue the registration process, the user activates an ACCEPT button (not shown) on the screen at step 236. In response, the system displays a REGISTRATION/THANKYOU screen (not illustrated) at step 238.

Although not shown, the REGISTRATION/THANKYOU screen includes a LOG IN button which the user may select at step 240 in order to login to the ISS. In response, the system displays the MEMBER SERVICES LOG IN screen described with reference to FIG. 25 and executes the LOGIN routine 180 (FIG. 6).

Upon completion of the registration process described in connection with FIG. 7, the registered user will have established an ISAP and be enabled to ship packages through the SSP in accordance with other processes described herein.

MEMBER SERVICES Routine

Figure 8A:
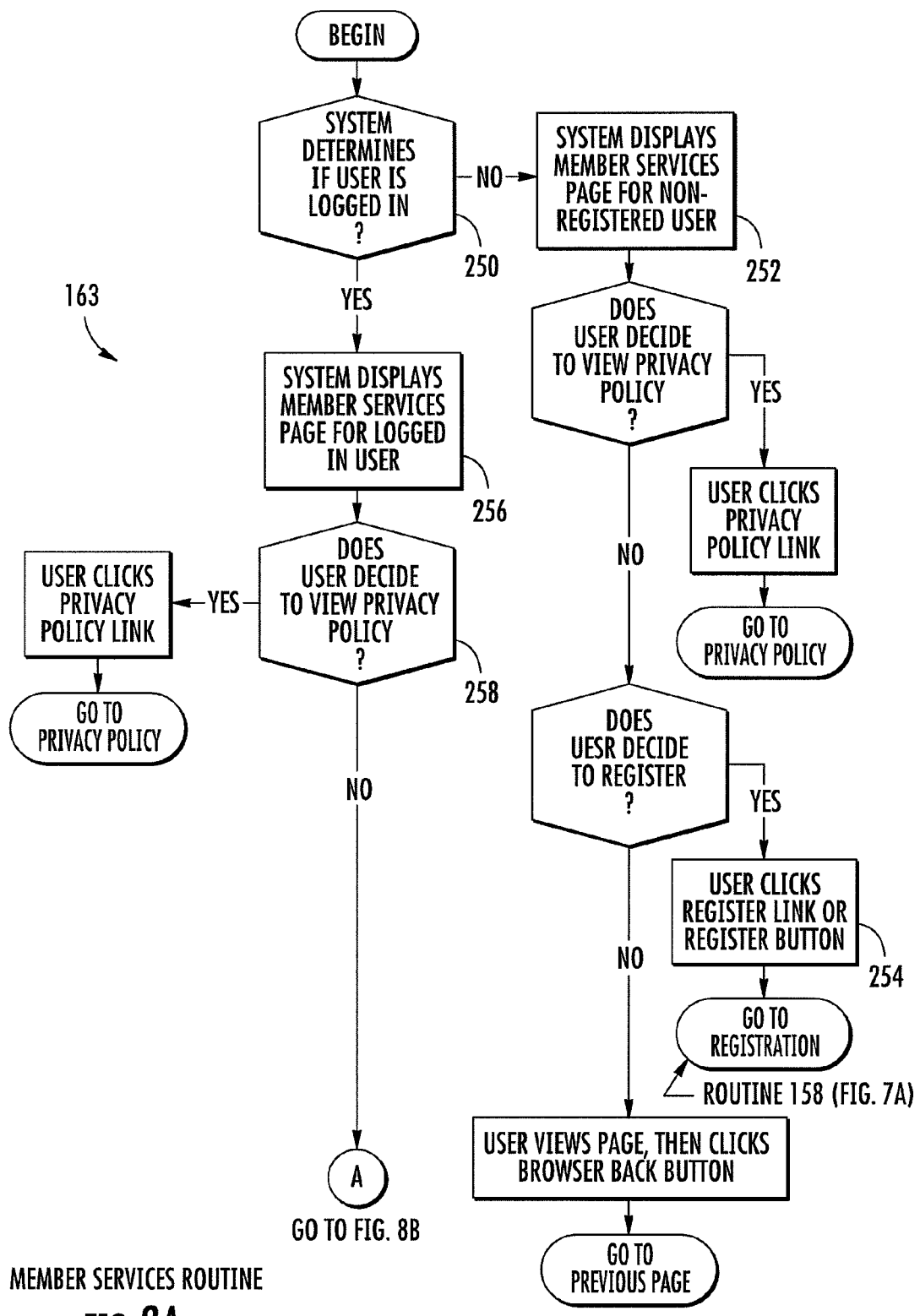
FIG. 8, consisting of FIGS. 8A and 8B, is a flow chart of a MEMBER SERVICES routine employed in a preferred embodiment of the present invention.

Turn now to FIG. 8 for a discussion of the MEMBER SERVICES routine 163. If during the registration process (FIG. 7) the system determines the registering user was previously at MEMBER SERVICES and has already registered, the ISS will direct the user to a MEMBER SERVICES screen (not shown). At step 250, the ISS determines if the registering user is already logged in. Finding that they are not, the ISS branches to step 252 where it displays a MEMBER SERVICES screen for non-registered users (not shown). As explained above with regard to the registration process, a registering user may choose to view a privacy policy or other agreements prior to deciding to register. If the user decides to register, they select on a third REGISTER button (not shown) at step 254 and are directed to the REGISTRATION routine 158 described above with reference to FIG. 7. If a non-registered user declines to register they can return to the previous page by selecting the browser BACK button located on the browser tool bar.

Referring back to step 250, if during the registration process the system determines the registering user is already logged in, the system directs the user to a MEMBER SERVICES screen (not shown) for logged in users at step 256. At step 258, the already registered user may elect to view a privacy policy or other agreements in the manner described, or be directed to other member service functions.

In the event that the user decides not to view the agreements or privacy policy, the routine 163 continues to a sequence of steps 260, 268, 274, 280, 286, 292 where the system responds to the user's selecting of buttons on the MEMBER SERVICES page (not shown) for viewing the member profile, viewing the shipping preferences, viewing the payment method, changing the password, working with the address book, and canceling membership, respectively. The system responds to a button select by branching to and executing an appropriate routine for the indicated function, as will be described in greater detail below.

Figure 8B:
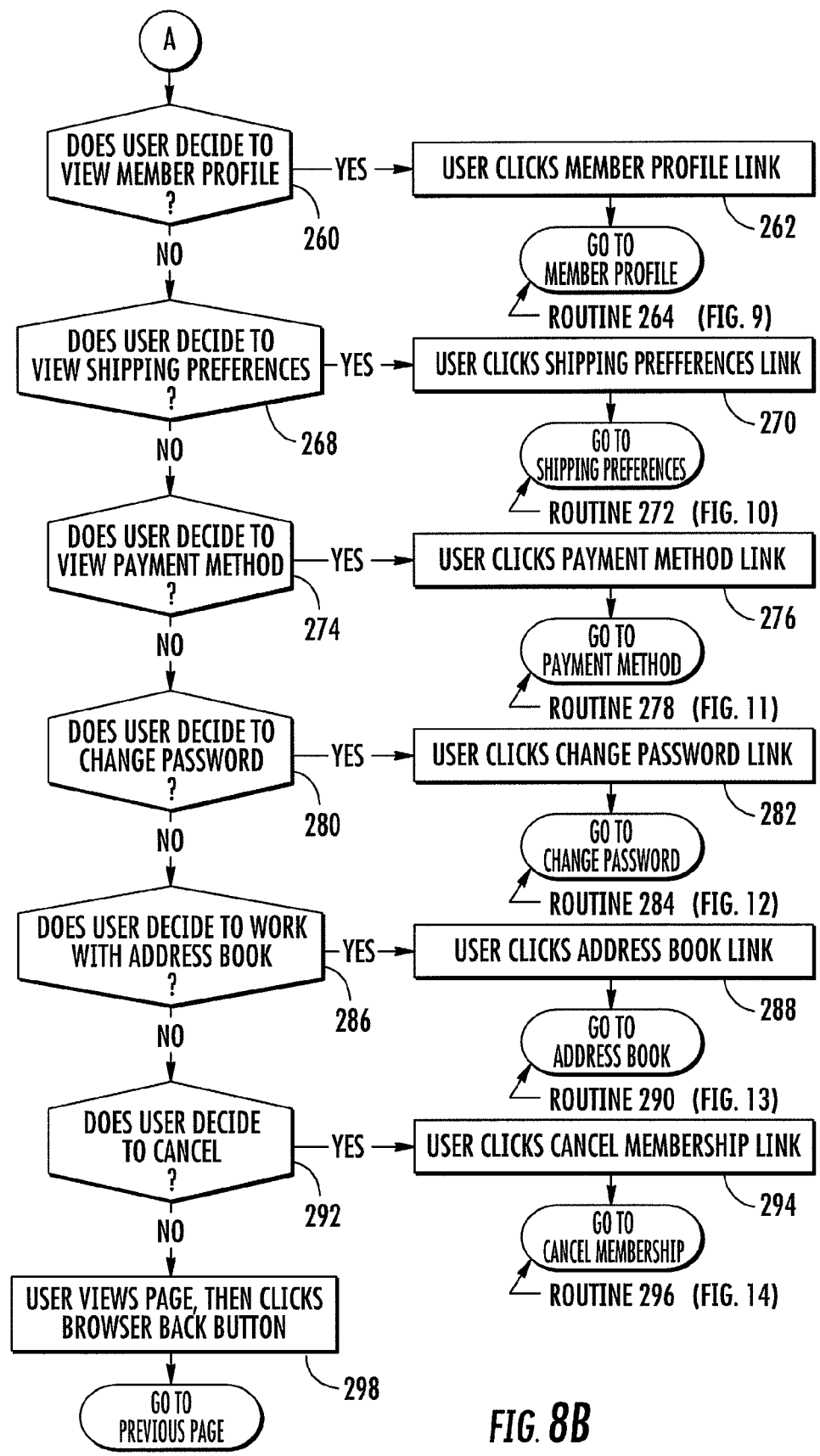

Referring now to FIG. 8B, to view his or her MEMBER PROFILE, the system tests at step 260 whether the user selected a MEMBER PROFILE button (not shown) and if affirmative, at step 262 the user is directed to a MEMBER PROFILE routine 264 best described with reference to FIG. 9.

To view the SHIPPING PREFERENCES, the system tests at step 268 whether the user selected a SHIPPING PREFERENCES button (not shown) and if they did, at step 270 the user is directed to a SHIPPING PREFERENCES routine 272 best described with reference to FIG. 10.

To view and set up a payment method, the system tests at step 274 whether the user selected a PAYMENT METHOD button (not shown) and if they did, at step 276 the user is directed to a PAYMENT METHOD routine 278 best described with reference to FIG. 11.

To change a password, the system tests at step 280 whether the user selected a CHANGE PASSWORD button (not shown) and if they did, at step 282 the user is directed to a CHANGE PASSWORD routine 284 best described with reference to FIG. 12.

To work with the ADDRESS BOOK, the system tests at step 286 whether the user selected an ADDRESS BOOK button (not shown) and if they did, at step 288 the user is directed to an ADDRESS BOOK routine 290 best described with reference to FIG. 13.

To cancel the membership, the system tests at step 292 whether the user selected a CANCEL MEMBERSHIP button (not shown) and if so, at step 294 the user is directed to a CANCEL MEMBERSHIP routine 296 best described with reference to FIG. 14.

In the event that the user did not select any of the various member services buttons described above, but instead selects the browser's back button at step 298, the system displays a previous page in the known manner.

MEMBER PROFILE Routine

Figure 9:
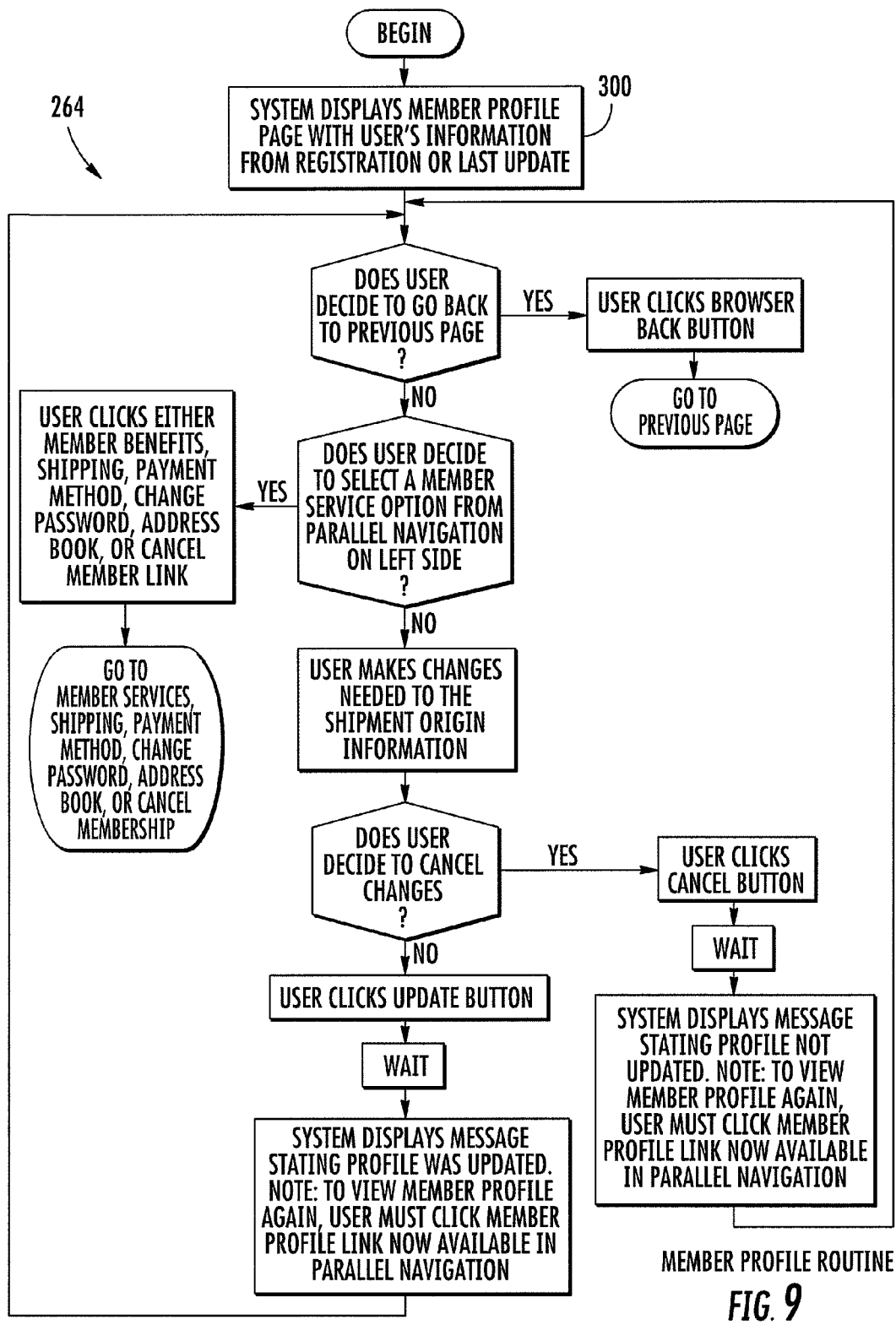
FIG. 9 is a flow chart of a MEMBER PROFILE routine employed in a preferred embodiment of the present invention.

Referring now to FIG. 9, in response to selecting the MEMBER PROFILE button (not shown) from either the HOME PAGE or MEMBER SERVICES screen, the ISS 10 executes routine 264 to provide for member services and editing of the user's Internet Service Account. Starting at step 300, the system displays a MEMBER PROFILE page or screen (not shown), including the user's information from registration or the last update, and awaits the user's input.

The remainder of the steps shown in FIG. 9 are self-explanatory and will not be discussed further herein, except as follows: the steps of the routine 264 are operative to receive the user's input and determine whether the user has decided to return to a previous page, select certain other member options displayed in a parallel navigation menu on the MEMBER SERVICES screen, make changes to the shipment origin information, cancel the changes, or update the changes. After making changes the user may cancel by selecting a CANCEL button (not shown), or the user may confirm the changes by selecting an UPDATE button (not shown). Either decision returns the user to the step 300 to receive further user input.

It will be understood that information entered by the member is stored in the customer profile database 58, and used to determined customer preferences for payment method (e.g., which credit card of plural types, customer account number), shipping method, method of accessing the shipping service provider (e.g. pick up at a predetermined day of week and time at certain place, vs. drop off), package type, etc. The member profile screen, although not shown, preferably includes data fields for receiving customer input of these and other customer preferences, which are stored in the customer profile database in association with information identifying the particular customer (e.g. name and password). In particular, and in accordance with the invention, information entered in the SHIPPING PREFERENCES routine, PAYMENT METHOD routine, and ADDRESS BOOK routine described below are stored in this database.

SHIPPING PREFERENCES Routine

Figure 10:
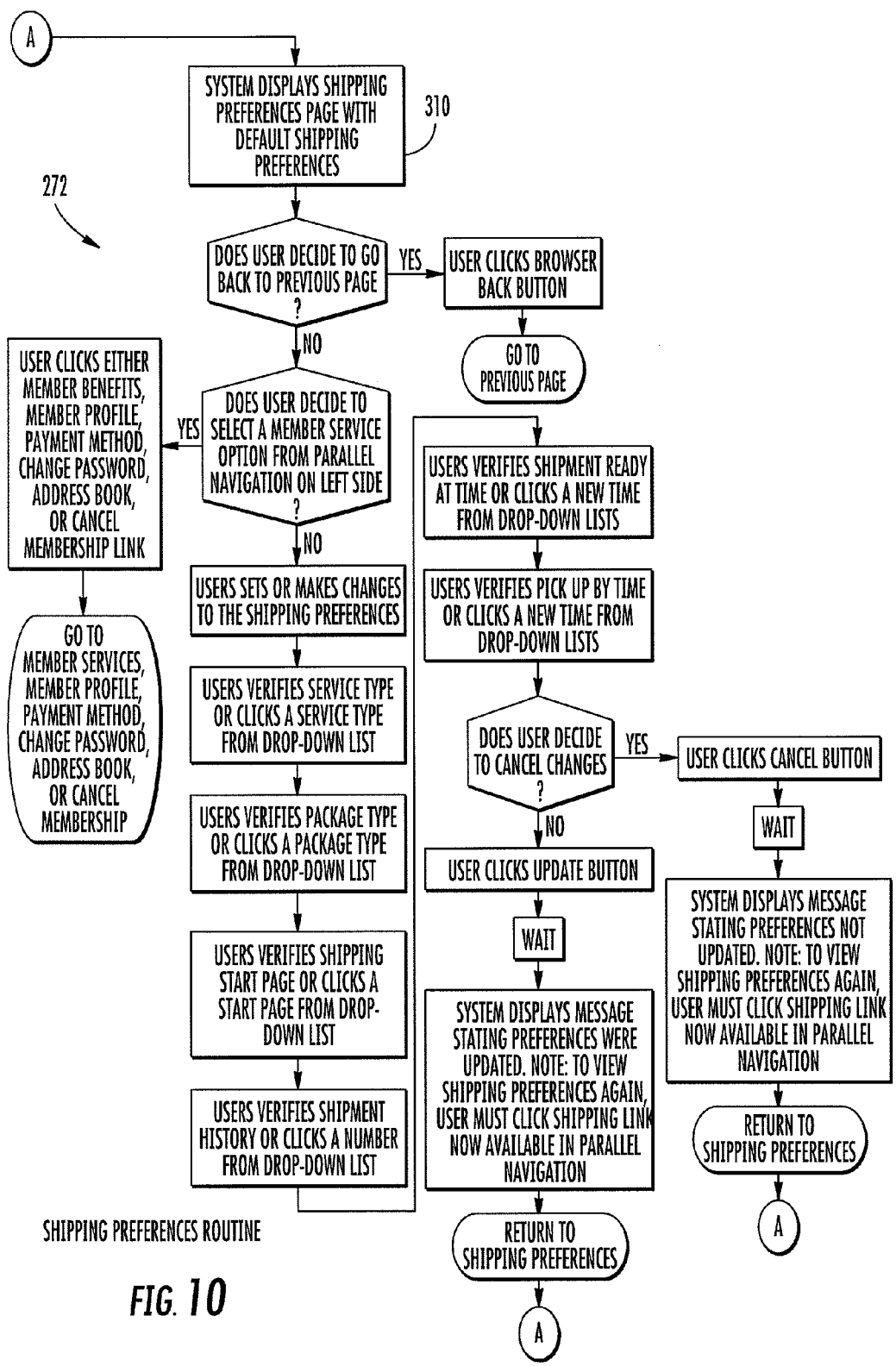
FIG. 10 is a flow chart of a SHIPPING PREFERENCES routine employed in a preferred embodiment of the present invention.

Referring now to FIG. 10, in response to selecting the SHIPPING PREFERENCES button (not shown) from either the HOME PAGE or MEMBER SERVICES screen, the ISS 10 executes routine 272 to provide for selection and/or editing of the user's shipping preferences, for example, service type, package type, pick up times, and other parameters related to shipping of packages. Starting at step 310, the system displays a SHIPPING PREFERENCES page (not shown) that includes a set of default shipping preferences, and awaits the user's input.

The remainder of the steps shown in FIG. 10 are self-explanatory and will not be discussed further herein, except as follows: the steps of routine 272 are operative to receive the user's input and determine whether the user has decided to return to a previous page, select certain other member options displayed in a parallel navigation menu on the MEMBER SERVICES screen, set or make changes to the shipping preferences, set and/or verify service type from a drop-down list, set and/or verify package type from a drop-down list, set and/or verify a SHIPPING START page from a drop-down list, verify shipment history, set and/or verify a shipment ready time or set a new time, set and/or verify a pick up time, cancel changes, or update the changes. After making changes to the Shipping Preferences the user may cancel by selecting the CANCEL button (not shown), or the user may confirm by selecting the UPDATE button (not shown). Either decision returns the user to the step 310 via connection A to receive further user input.

PAYMENT METHOD Routine

Figure 11:
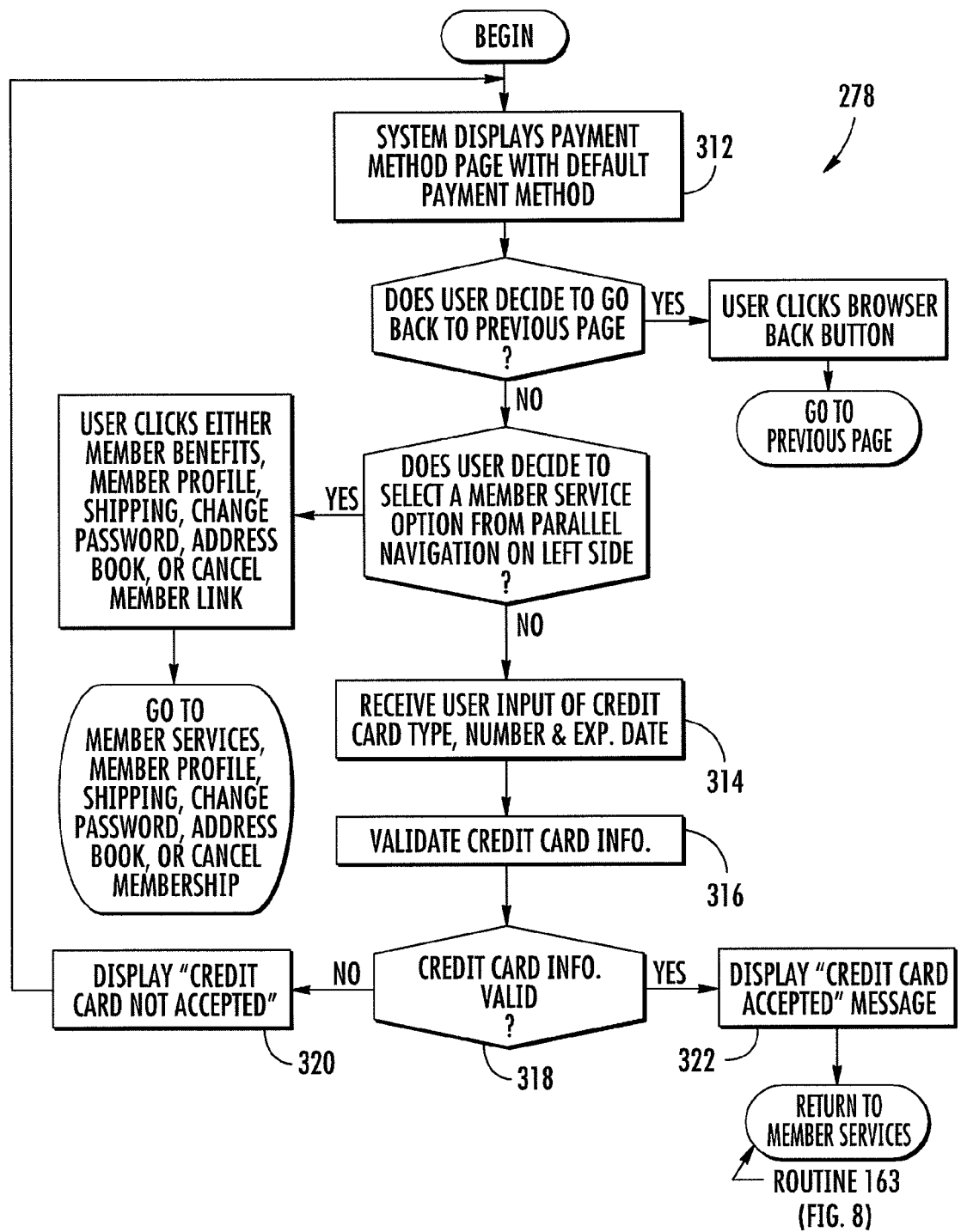
FIG. 11 is a flow chart of a PAYMENT METHOD routine employed in a preferred embodiment of the present invention.

Referring now to FIG. 11, in response to selecting the PAYMENT METHOD button (not shown) from either the HOME PAGE or MEMBER SERVICES screen, the ISS 10 executes routine 278 to provide for user selection of a method for payment of the shipping services. Starting at step 312, the system displays a PAYMENT METHOD page or screen (not shown) with default payment information selected, typically payment via a credit card, and awaits the user's input. Many of the steps shown in FIG. 11 are self-explanatory and will not be discussed further herein, except as follows: the steps of the routine 278 are operative to receive the user's input and determine whether the user has decided to return to a previous page, select certain other member options displayed in a parallel navigation menu on the MEMBER SERVICES screen, and receive and verify the user's input and confirmation of a credit card type, credit card number, and expiration date. And while FIG. 11 illustrates payment by credit card, a SSP account or other acceptable form of payment may be referenced.

At step 314 the system receives user input of a credit card type, a credit card number, and expiration date. At step 316, the ISS utilizes its connection to the credit card authorization system 76 (FIG. 2) to verify the credit card number and expiration date, and determine whether the user has available credit.

If at decision 318 the credit card authorization system indicates that the provided credit card is invalid or has insufficient credit, the routine branches to step 320 and displays a message that the credit card was not accepted. The routine then returns the user to step 312 where the user enters another credit card or exit may from the routine.

If at decision 318 the credit card authorization system indicates that the provided credit card is acceptable, the routine branches to step 322, where a message "card accepted" is displayed, and the routine exits by returning to the MEMBER SERVICES routine 163 (FIG. 8).

CHANGE PASSWORD Routine

Figure 12:
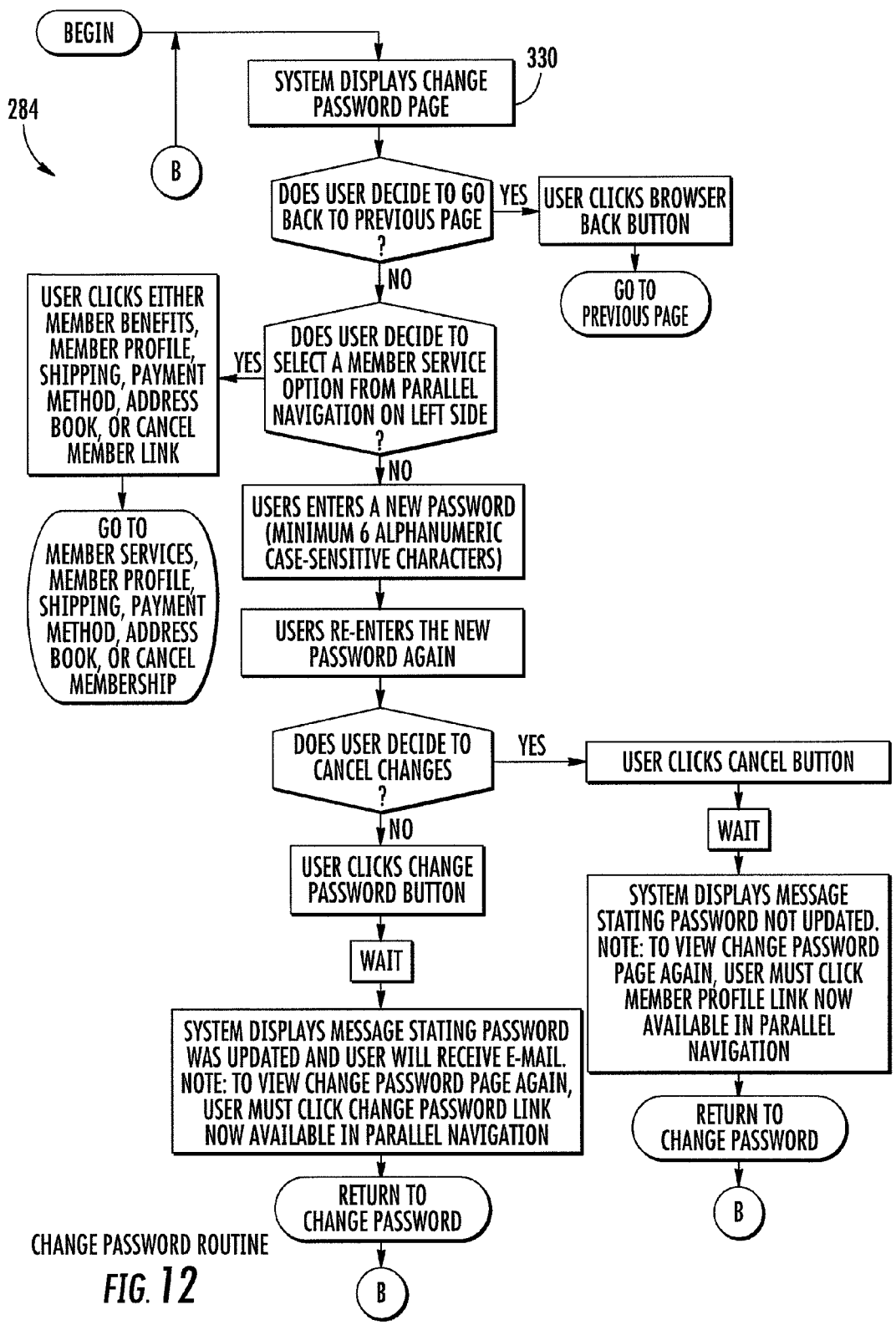
FIG. 12 is a flow chart of a CHANGE PASSWORD routine employed in a preferred embodiment of the present invention.

Referring now to FIG. 12, in response to selecting the CHANGE PASSWORD button (not shown) from either the HOME PAGE or MEMBER SERVICES screen, the ISS 10 executes routine 284 to allow the user to change his or her password for obtaining access to their member profile (ISAP) and/or account (ISA). Starting at step 330, the system displays a change password page (not shown) and awaits the user's input. The remainder of the steps shown in FIG. 12 are self-explanatory and will not be discussed further herein, except as follows: the steps of routine 284 are operative to receive the user's input and determine whether the user has decided to return to a previous page, select certain other member options displayed in a parallel navigation menu on the MEMBER SERVICES screen, or enter and re-enter a new password for verification.

After changing the password, the user may cancel by selecting the CANCEL button (not shown), or the user may confirm by selecting the UPDATE button (not shown). Where the user has changed the password, the disclosed system displays a message stating that the password was updated and that the user will receive an e-mail confirming that the password was changed. Either decision returns the user to the step 330 via connection B to receive further user input.

ADDRESS BOOK Routine

Figure 13:
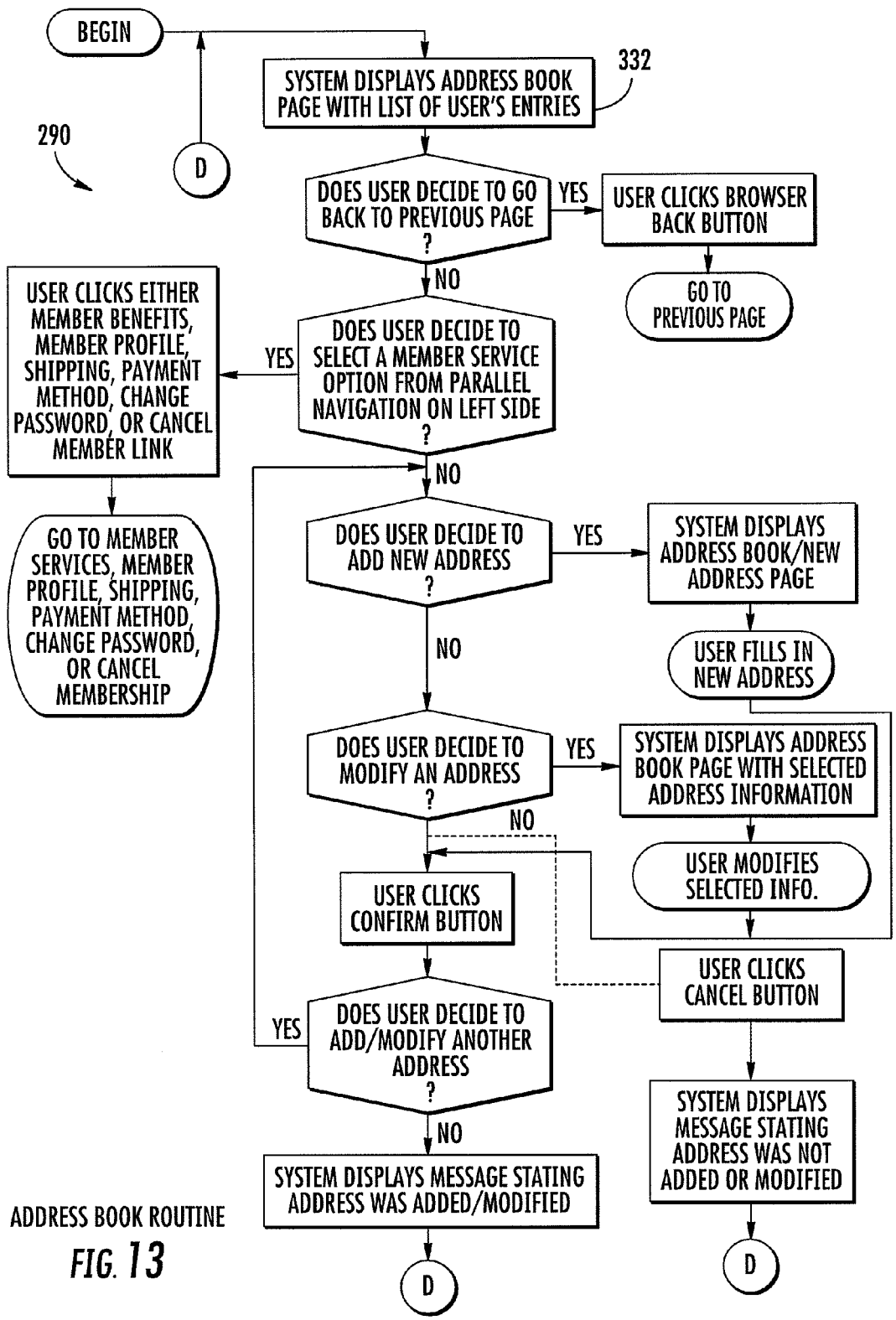
FIG. 13 is a flow chart of an ADDRESS BOOK routine employed in a preferred embodiment of the present invention.

Referring now to FIG. 13, in response to selecting the ADDRESS BOOK button (not shown) from either the HOME PAGE or MEMBER SERVICES screen, the ISS 10 executes routine 290 to allow the user to view and/or change prestored addresses of intended recipients in an address book stored in the system on behalf of the user. Starting at step 332 the system displays an ADDRESS BOOK page (not shown), containing a list of the user's entries in his or her address book, and awaits the user's input. The remainder of the steps shown in FIG. 13 are self-explanatory and will not be discussed further herein, except as follows: the steps of routine 290 are operative to receive the user's input and determine whether the user has decided to return to a previous page, select certain other member options displayed in a parallel navigation menu on the MEMBER SERVICES screen, add a new address to the address book, or change an existing address in the address book or delete an existing address in the address book. Some of the information the user may change includes but is not limited to names, titles, company names, addresses, including state/province, country, and zip code.

After adding or changing an address, the user may cancel by selecting the CANCEL button (not shown), or the user may confirm by selecting the UPDATE button (not shown). Either decision returns the user to the step 332 via connection D to receive further user input.

CANCEL MEMBERSHIP Routine

Figure 14:
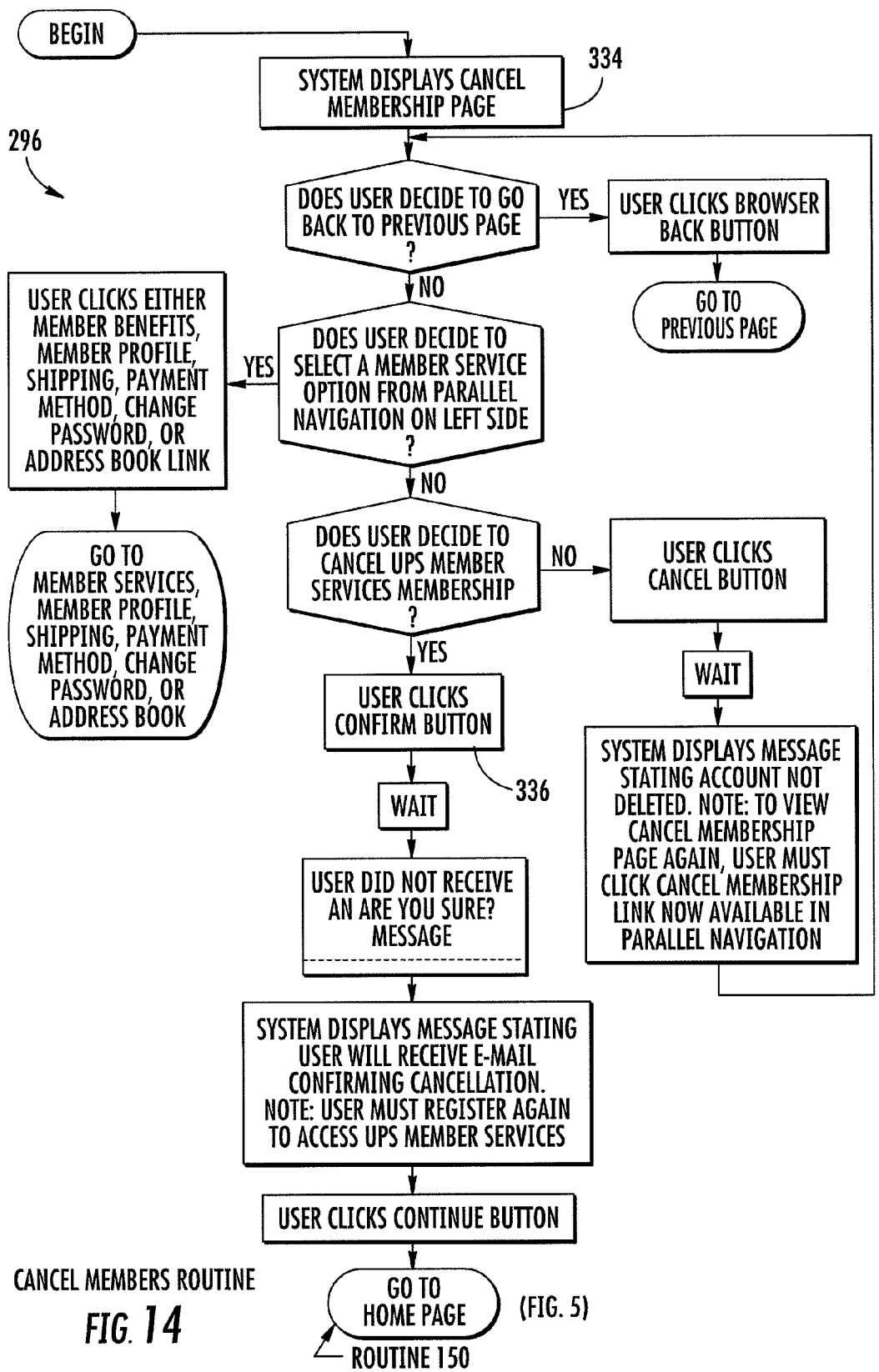
FIG. 14 is a flow chart of a CANCEL MEMBERSHIP routine employed in a preferred embodiment of the present invention.

Referring now to FIG. 14, in response to selecting the CANCEL MEMBERSHIP button (not shown) from either the HOME PAGE or MEMBER SERVICES screen, the ISS 10 executes routine 296 to allow the user to cancel his or her membership. Starting at step 334 the system displays a CANCEL MEMBERSHIP page or screen (not shown), and awaits user input. The remainder of the steps shown in FIG. 14 are self-explanatory and will not be discussed further herein, except as follows: the steps of routine 296 are operative to receive the user's input and determine whether the user has decided to return to a previous page, select certain other member options displayed in a parallel navigation menu on the MEMBER SERVICES screen, or cancel membership.

After selecting the option to cancel membership, the user may "cancel the cancel" operation by selecting the CANCEL button (not shown), or the user may confirm the cancel operation by selecting the UPDATE button (not shown). A decision to cancel the operation returns the user to the step 334 to receive further user input. A decision to confirm the cancel operation, on the other hand, results in deletion of the user's registration information, which is preferably confirmed with an "are you sure?" message before the deletion is committed to the database. For the user who selects the CONFIRM button at step 336, the system displays a message stating the user will receive an e-mail confirming cancellation. Thereafter, selecting a CONTINUE button (not shown) returns the user to the service provider's home page (FIG. 24) and execution of HOME PAGE routine 150 (FIG. 5). Further access to the ISS will require re-registration by the customer.

Assuming that a customer has duly registered and established an Internet Services Account (ISA) with the SSP 10, the customer can proceed to ship a package. Routines carried out in the preferred embodiment of the present invention for package shipping will be discussed next. It is assumed that a user has logged in via a log in process such as process 180 described in connection with FIG. 6, prior to being permitted to ship a package.

SHIPPING Routine

Turn now to FIG. 15 for a discussion of the shipping process 171 and the manner in which a registered and logged in user ships a package in accordance with the methods of the present invention. It will be recalled from the discussion above in connection with FIG. 6 that, in response to selecting the LOG IN button 648 shown in FIG. 25, the system 10 executes the shipping process 171.

Figure 26A:
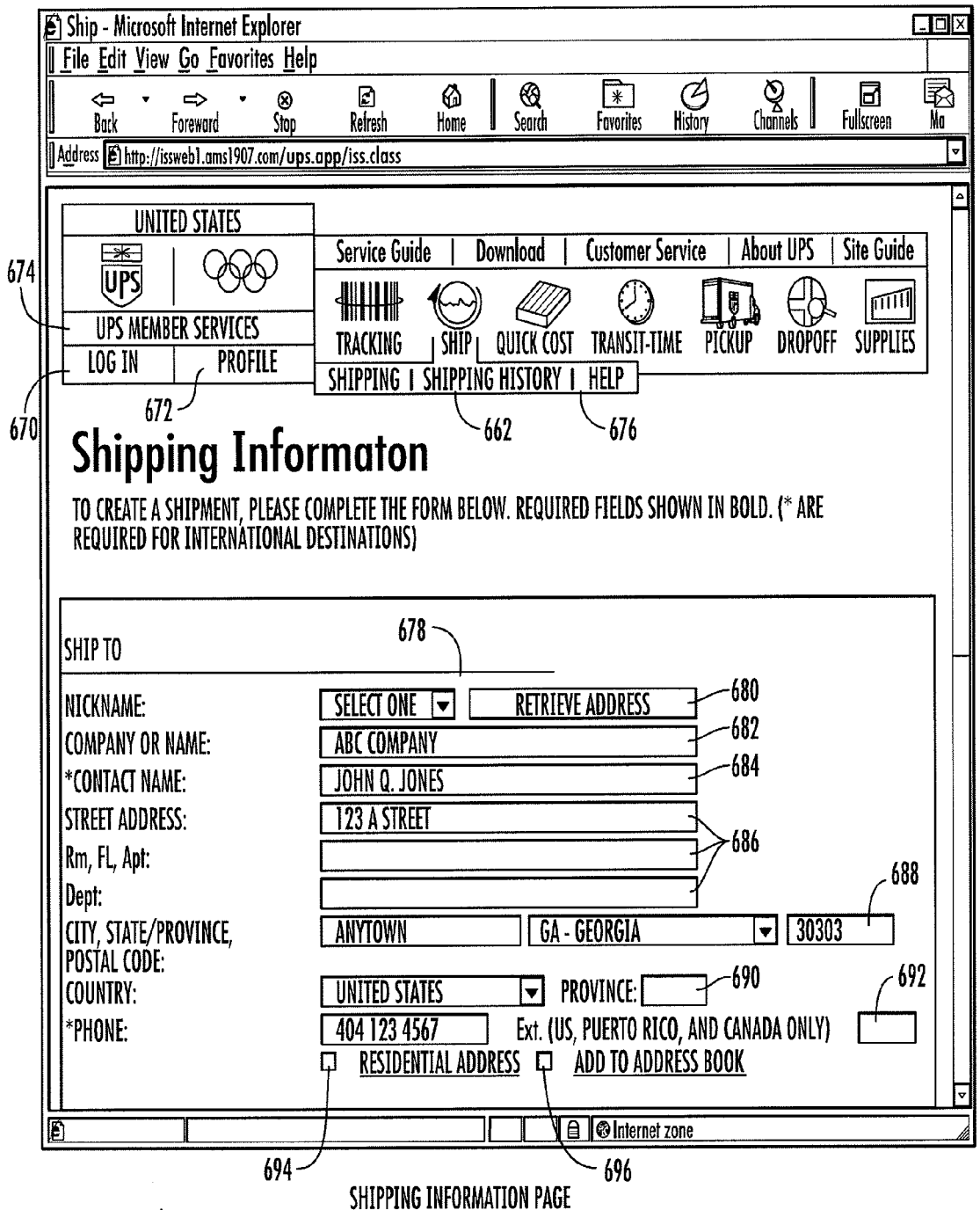
FIG. 26, consisting of FIGS. 26A-26C, is an exemplary screen display of a SHIPPING INFORMATION page or screen as generated by a preferred embodiment of the present invention.
Figure 26B:
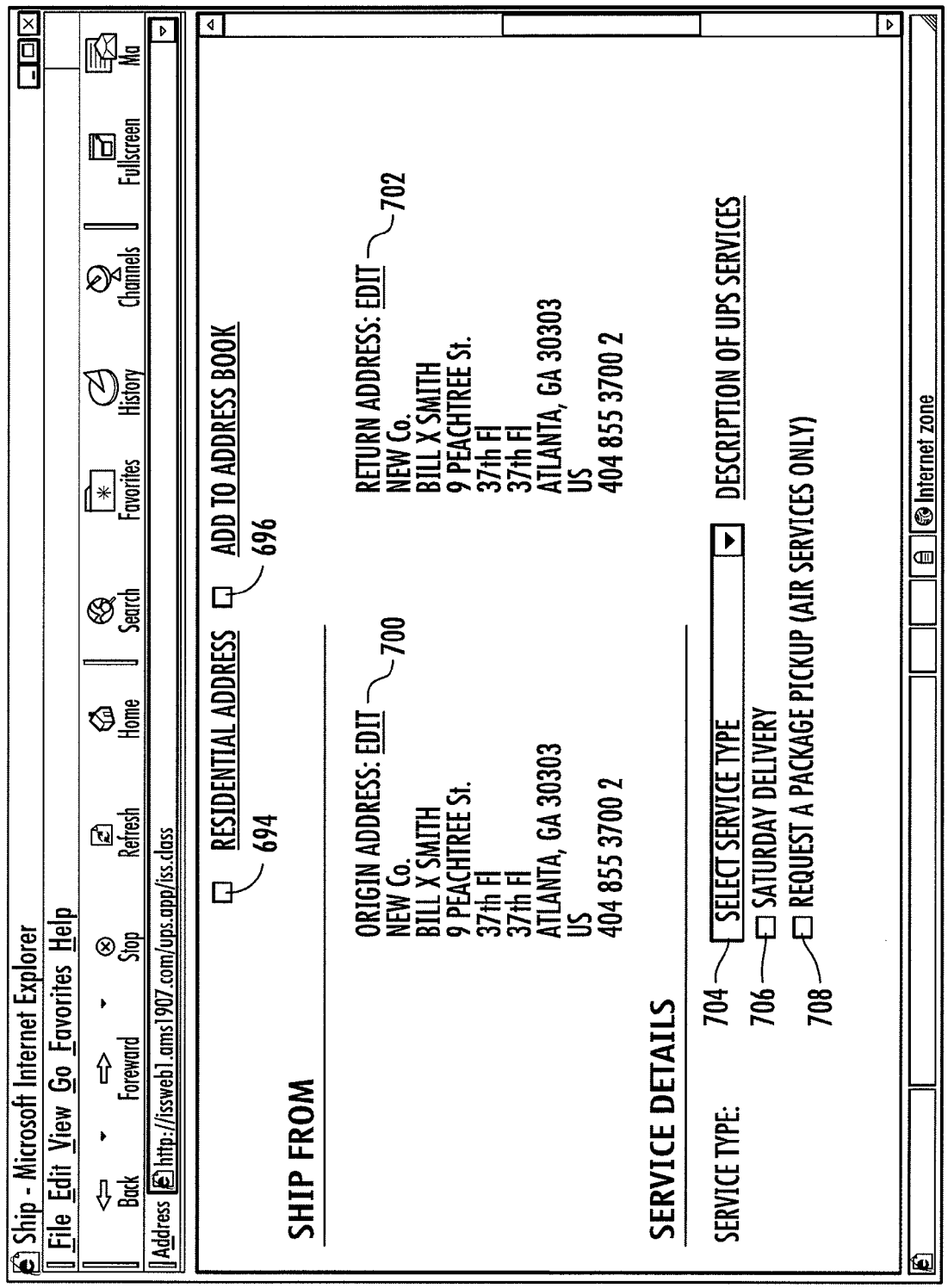
Figure 26C:
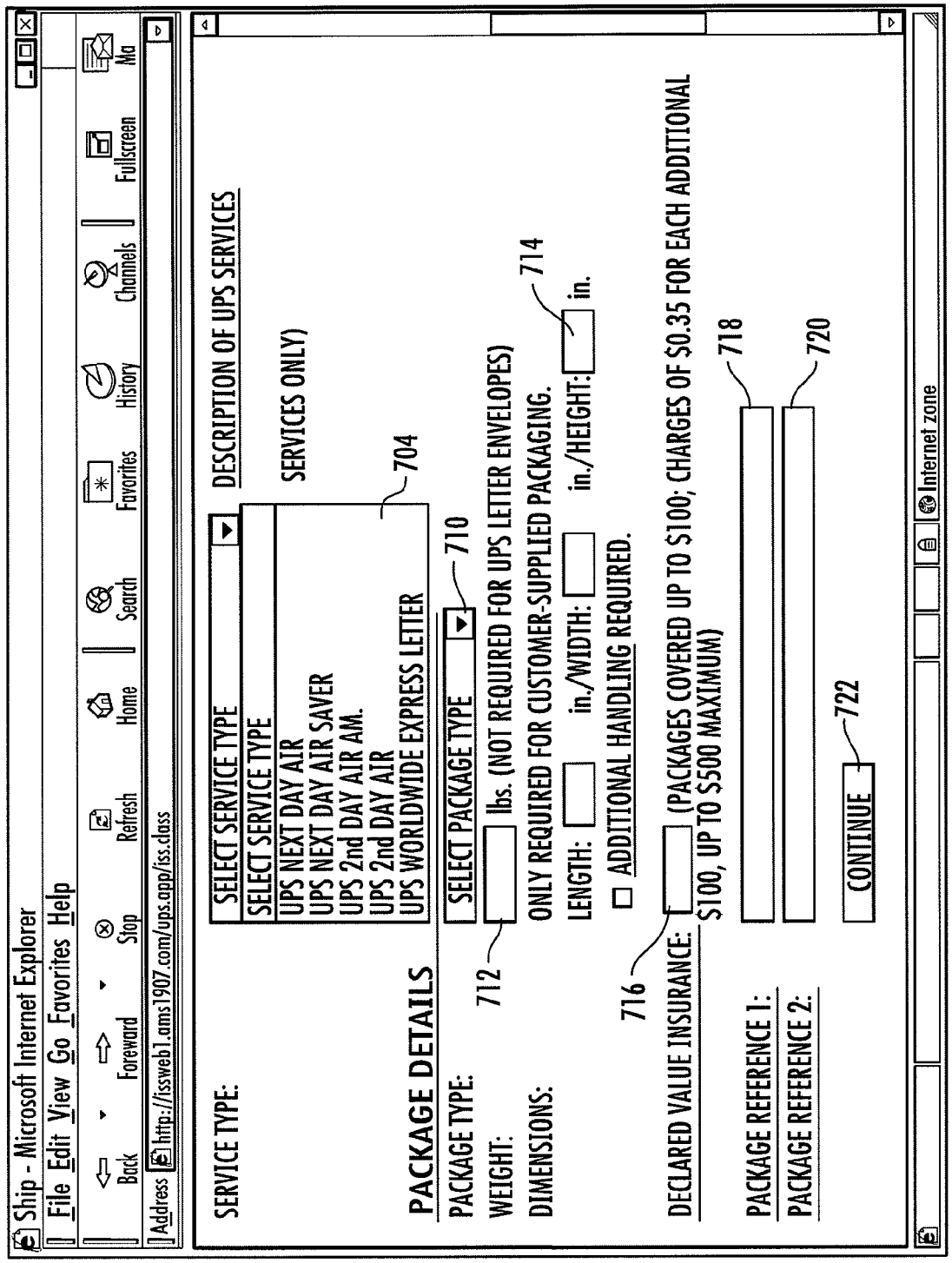

Starting with FIG. 15A at step 340, the system 10 displays a SHIPPING INFORMATION page or screen 660, best shown in FIG. 26 and awaits user input. From the SHIPPING INFORMATION screen 660 the user begins the shipping process. Various control buttons are available to the user on the screen 660, including a LOG OUT button 670 to allow the user to leave a shipping session, a PROFILE button 672 to allow the user to access their prestored member profile, and a MEMBER SERVICES button 674 to allow the user to access member service.

At decision 342 the system tests whether the user has decided to view the shipping history, track a shipment, use a similar shipment to process a new one, void a shipment, reprint a receipt, or reprint a label. Appropriate processes for viewing shipping history, tracking, reprinting receipts or labels, etc. are invoked from the SHIPPING HISTORY page. By selecting the SHIPPING HISTORY button 662, the routine branches to step 344 where it will display a SHIPPING HISTORY screen as shown and described in connection with FIG. 35. If the user does not elect to view the shipping history, the process 171 proceeds to decision 348.

At decision 348 the system tests whether the user has elected to view or edit their profile information, work with the address book, set or change shipping or payment preferences, change a password, or cancel their membership by selecting the PROFILE button 672. In response the ISS will branch to step 350 and the MEMBER SERVICES routine 163, described in connection with FIG. 8. The customer/member thus leaves the shipping function and attends to account management functions. If the user does not elect to leave the shipping process the process 171 proceeds to decision 352.

At decision 352 the system tests whether the user has elected to view the help function on shipping information, for example when the user needs further information about the shipping process or the SSP's policies and procedures of the shipping service provider. If the user selects a HELP button 676 from the SHIP menu bar, the process branches to step 354 and the system displays appropriate shipping information help, which is not described further herein but is well known to those skilled in the art. If the user does not elect to view shipping information help, the process 171 proceeds to decision 356.

Like the shipping history and help tabs described above, those skilled in the art are aware that it is merely a design choice whether to add preference tabs (not shown), support tabs (not shown) or other tabs related to the functionality of the website or the shipping of packages through the SSP.

At decision 356 the system tests whether the user has decided to log out of Internet shipping. If they did, the process 171 branches to step 358 and the user is returned to the SSP's HOME PAGE routine 150 (FIG. 5) which displays the home page (FIG. 24).

Figure 15B:
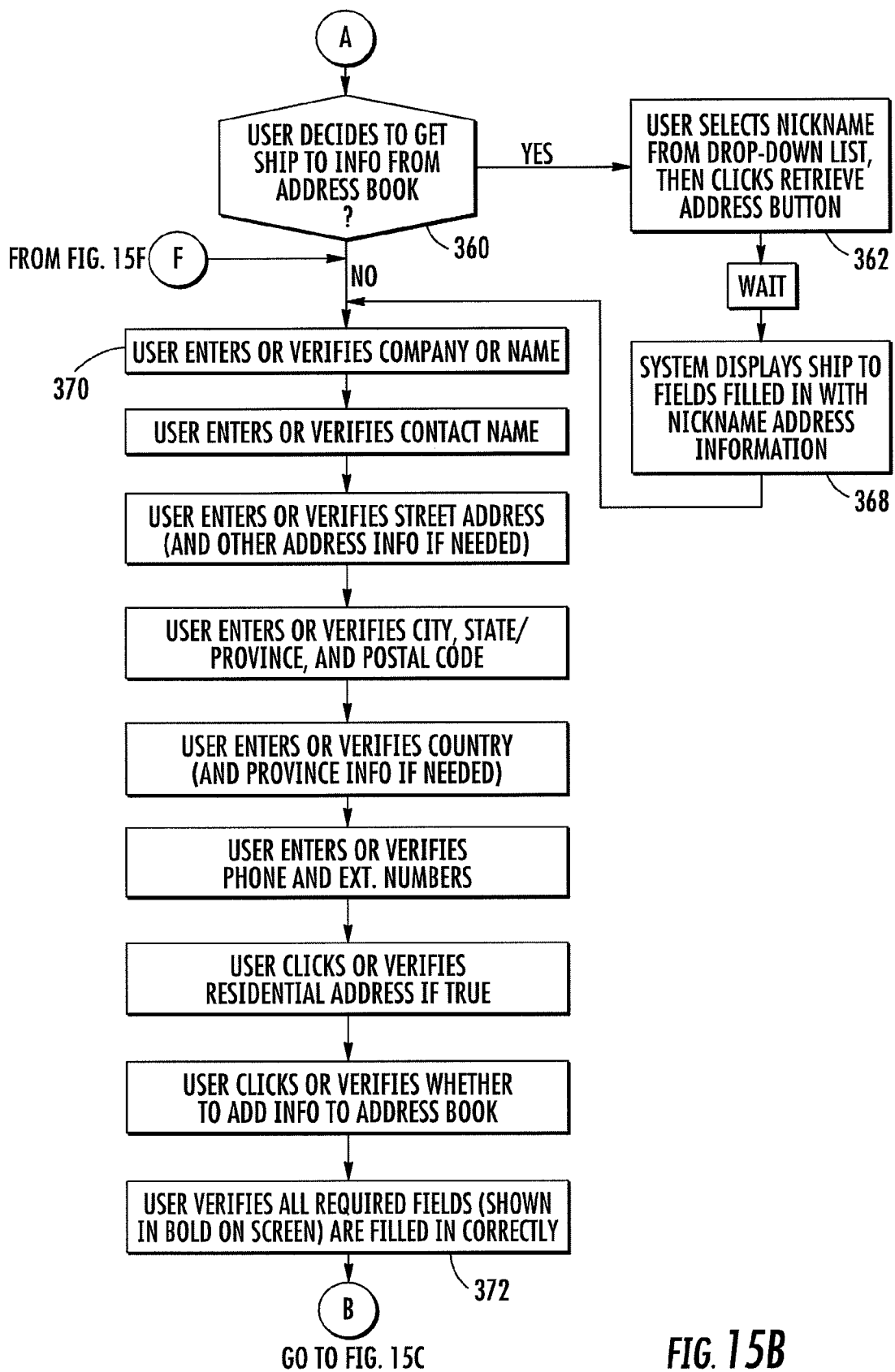
FIG. 15, consisting of FIGS. 15A-15F, is a flow chart of a SHIPPING routine employed in a preferred embodiment of the present invention.
Figure 15C:
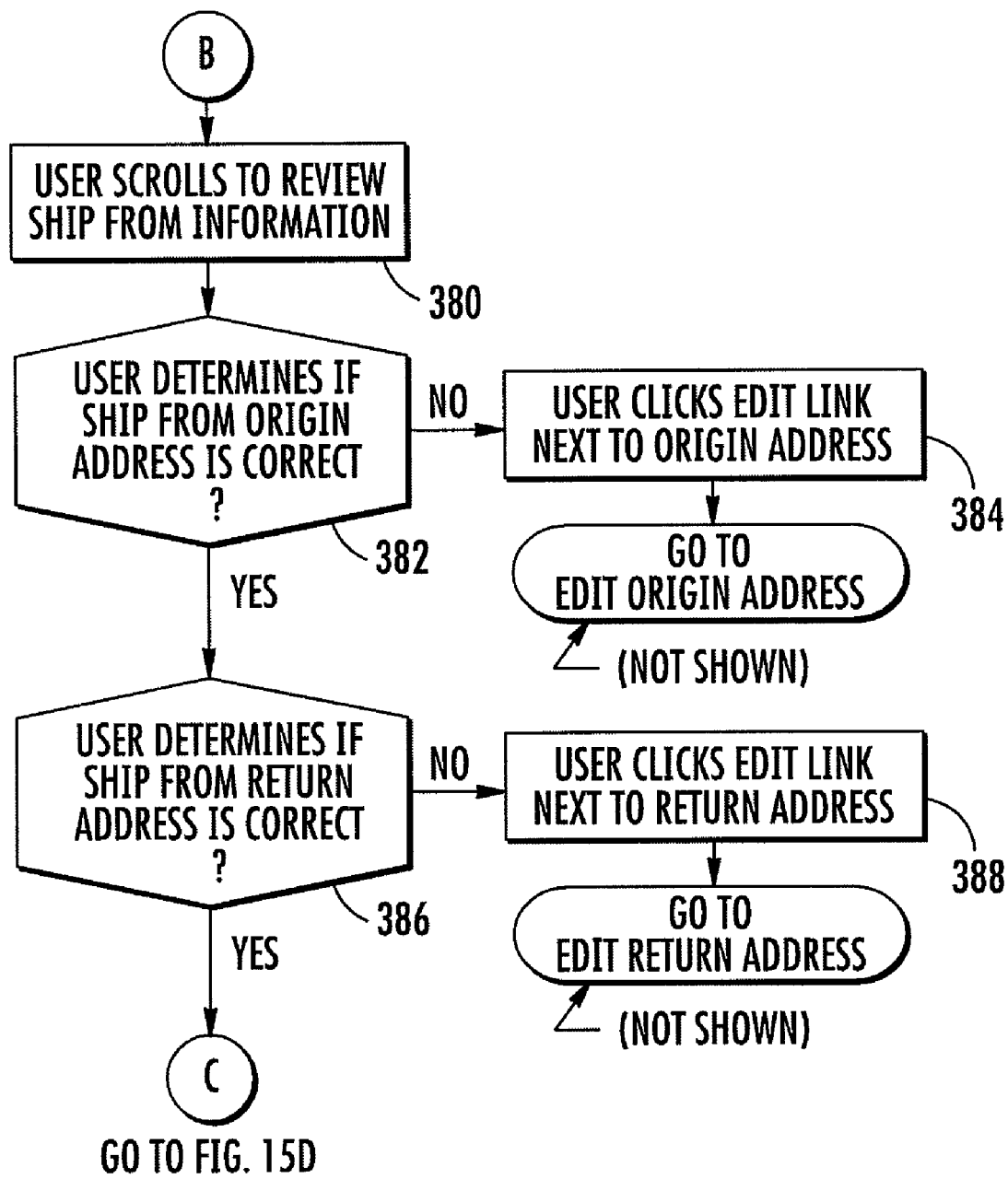

At decision 356, if the user decides to proceed with processing a new shipment, the routine 171 proceeds to decision 360 illustrated in FIG. 15B. There the system tests whether the user has decided to get "ship to" information, such as the name and address of an intended recipient, from the user's address book. Referring in this regard to FIG. 26, this can be effected by the user selecting a relevant recipient from a nickname dropdown list "select one" 678 and selecting a RETRIEVE ADDRESS button 680. In response, at step 368 the system fills in or populates the SHIP TO information fields in FIG. 26 with address information from the selected recipient, and the process branches to step 370.

Step 370 may also be reached if at decision 360 the user does not elect to obtain "ship to" information from the nickname list. At step 370 and a series of subsequent steps, the user then verifies (or in the event the shipping information is direct entry, the user enters) various items of information in a series of "ship to" information fields on the SHIPPING INFORMATION page 660. In a preferred embodiment, these fields include a company or name field 682, a contact name field 684, street address fields 686, the city, state/province and postal code fields 688, and a country and/or province field 690. The user also enters or verifies telephone and extension numbers in a field 692. The user selects that this is residential information if applicable at checkbox 694, and the user selects whether to add the information to his or her address book at checkbox 696.

After completing the entry of the "ship to" information, at step 372 the system verifies that the required fields, those critical to successful delivery and shown in bold in FIG. 26, are filled in correctly. If not, the user is notified by display of an appropriate error message. Upon verification that all required fields are filled in correctly, the system branches to step 380, illustrated in FIG. 15C where the user verifies "ship from" information.

At step 380 the user scrolls the SHIPPING INFORMATION page 660 to review the SHIP FROM information fields, e.g. Origin Address and Return Address. At decision 382, the user determines if the Origin Address is correct. If any information in the origin address needs to be edited, the user selects the EDIT button 700 associated with the origin address at step 384. In response the system directs the user to an EDIT ORIGIN ADDRESS screen (not shown) where the user can make the necessary changes. If no edits are required, the process proceeds to decision 386.

At decision 386, the user determines if the Return Address is correct. If any information in the Return Address needs to be edited, the user selects a second EDIT button 702 associated with the Return Address at step 388. In response the system directs the user to an EDIT RETURN ADDRESS screen (not shown) where the user can make the necessary changes. The user then selects on UPDATE button (not shown) which amends the address information according to the user's edits.

In a manner well known to those skilled in the art, the system displays EDIT ORIGIN ADDRESS and EDIT RETURN ADDRESS screens that permit the user to make any changes necessary to the sender's origin address and return addresses. It will be appreciated that these addresses can be the same, or can be different, for example if the user employs an Internet browser from a remote location unaffiliated with his or her regular place of business (Origin Address) to ship a package. This situation may to occur when a travelling businessperson designates a hotel as a Return Address during a business trip if they wish the package returned to the hotel rather than their usual place of business.

Figure 15D:
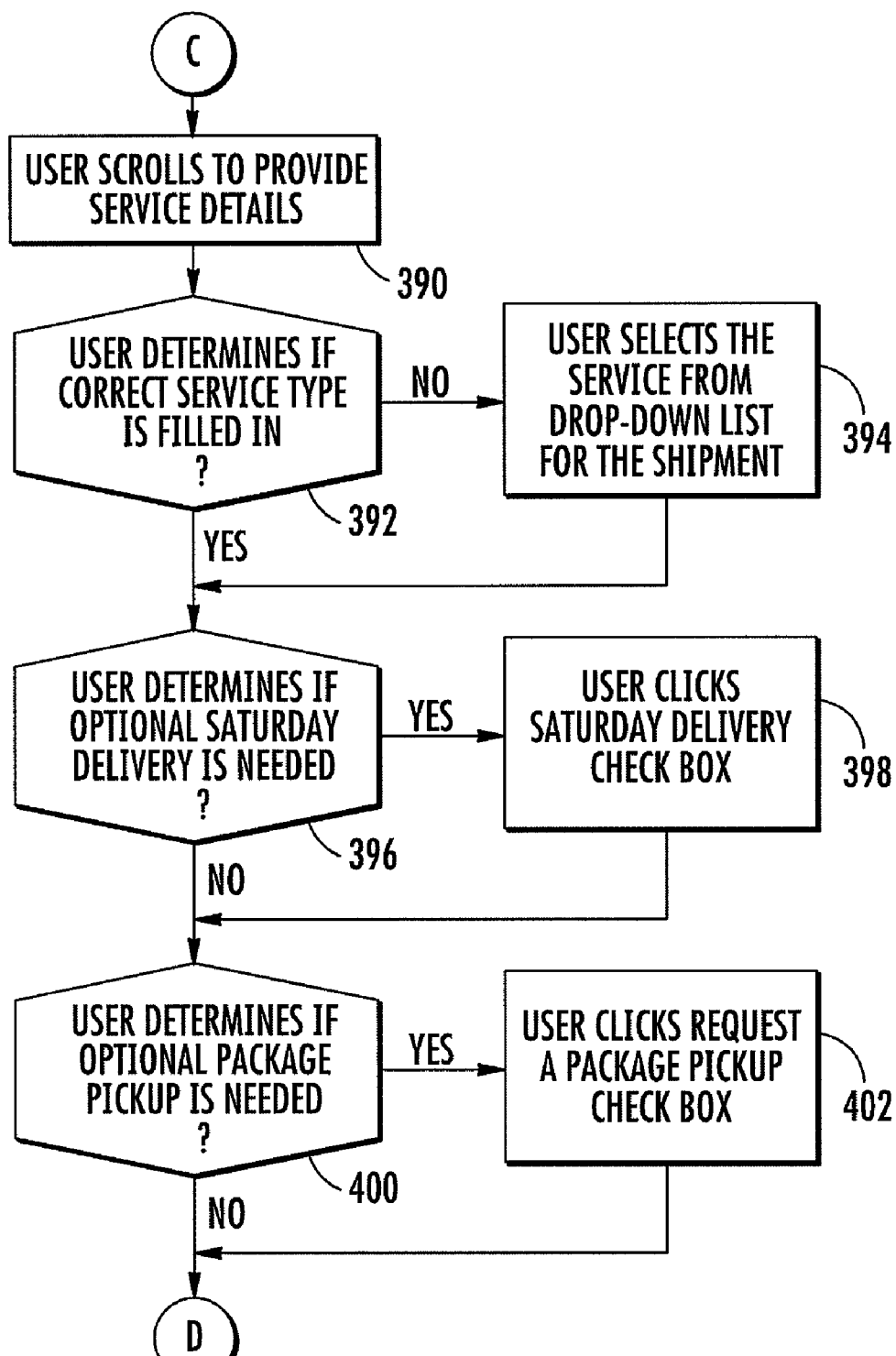
Figure 15E:
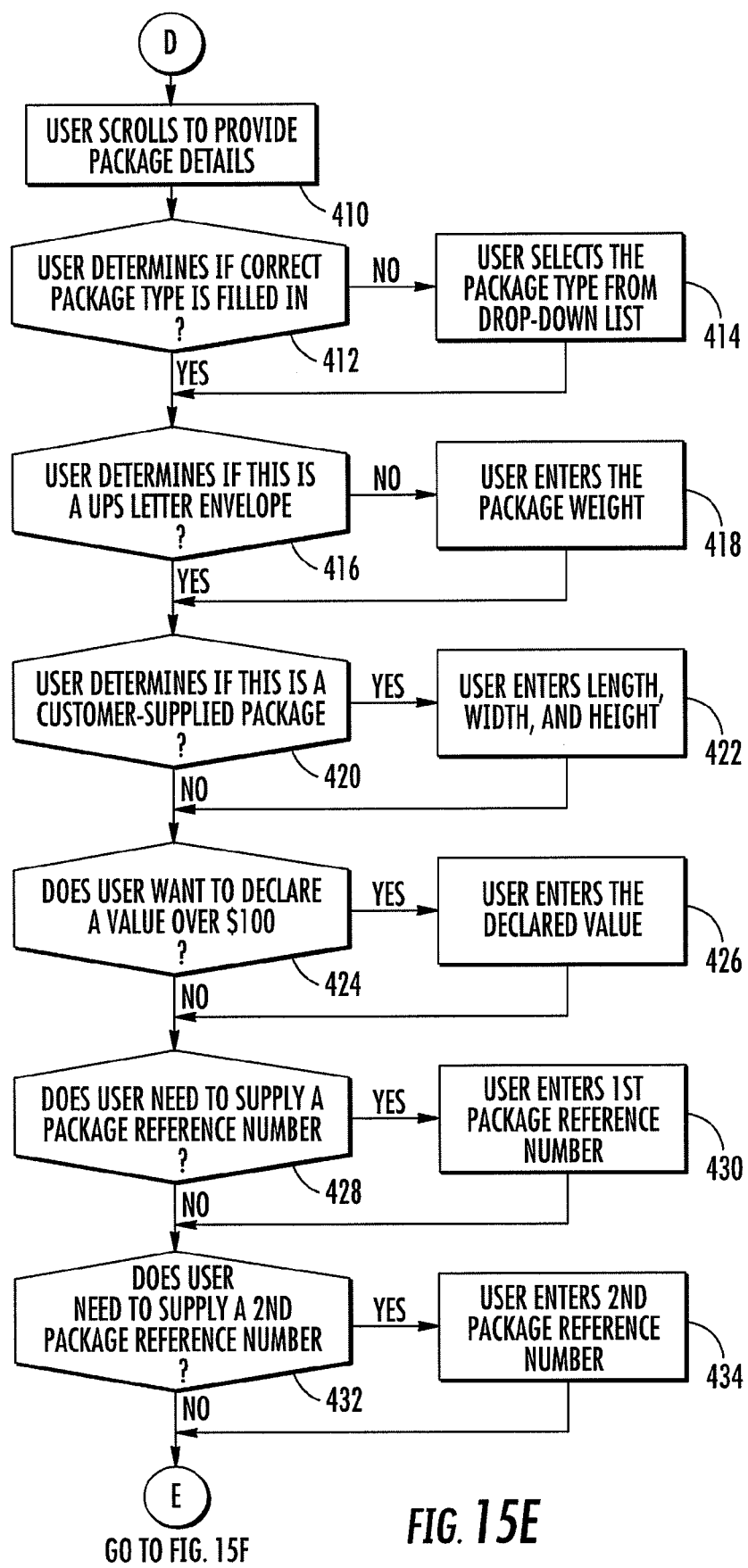

After verifying and/or editing the Origin Address and Return Address, the process 171 proceeds to step 390 as shown in FIG. 15D. At step 390, the user scrolls the SHIPPING INFORMATION page 660 if necessary and selects appropriate shipping service details for the present shipment. The user determines if a correct service type is filled in at decision 392, and if not the routine branches to step 394, where the user selects the appropriate service types from a dropdown list 704 in FIG. 26. As shown in FIG. 26, some illustrative service types may include Next Day Air, Next Day Air Saver, 2d Day Air A.M., 2d Day Air, Worldwide Express Letter, and the like. After receipt of the selected service type from the user, the process branches to decision 396.

At decision 396, the system tests whether the user has selected a special package shipping option, for example, Saturday delivery. If Saturday delivery is desired, the user can select a Saturday Delivery checkbox 706 (FIG. 26) at step 398.

At some point in the process, a customer must choose an access method for tendering the package to the SSP. Valid access methods include tender to an SSP representative tender "over the counter" at a place of business operated by the SSP or an agent of the SSP, tender to an unmanned drop-off location, or request On-Demand Service (ODS), also referred to as On Call Air Pickup.

At decision 400, the system tests whether the user has selected the package pickup option. If package pick-up is desired the user can select a REQUEST PACKAGE PICKUP checkbox 708 at step 402. After all special options are selected, the routine 171 proceeds to step 410 illustrated in FIG. 15E.

At step 410 the user may scroll if necessary to review package details, also shown in FIG. 26, for example package type, weight, dimensions, insurance, reference number, etc. At decision 412, the system tests whether the user has filled in or selected an appropriate package type. At step 414, the user selects a package type which accurately describes the present shipment from a dropdown list 710 in FIG. 26.

At decision 416, the system tests whether the user has determined if the package is a letter or whether a package weight should be provided. If the present shipment is not a letter envelope, at step 418 the user enters the package weight in the data field 712 illustrated in FIG. 26.

At decision 420 the system tests whether the package is a customer-supplied package, and if it is requires entry of package dimensions. At step 422 the user enters the length, width and height in the relevant data windows 714 illustrated in FIG. 26.

At decision 424, the system tests whether the user wishes to declare a package value in excess of a predetermined amount, e.g. $100. At step 426, if the user wants to declare value over a predetermined minimum, the user enters the declared value of the shipment in data field 716 illustrated in FIG. 26.

At decisions 428 and 432, the system tests whether the user wishes to supply a package reference number. At steps 430 and 434, if the user wants to supply one or more package reference numbers or other text, the user may supply package reference numeral or text for association with the package and future reference in package reference data fields 718, 720 respectively, illustrated in FIG. 26.

It will be understood by those skilled in the art, that the embodiments described regarding national delivery and that international deliveries may require additional steps or data fields to accommodate the requirements of international delivery.

Figure 15F:
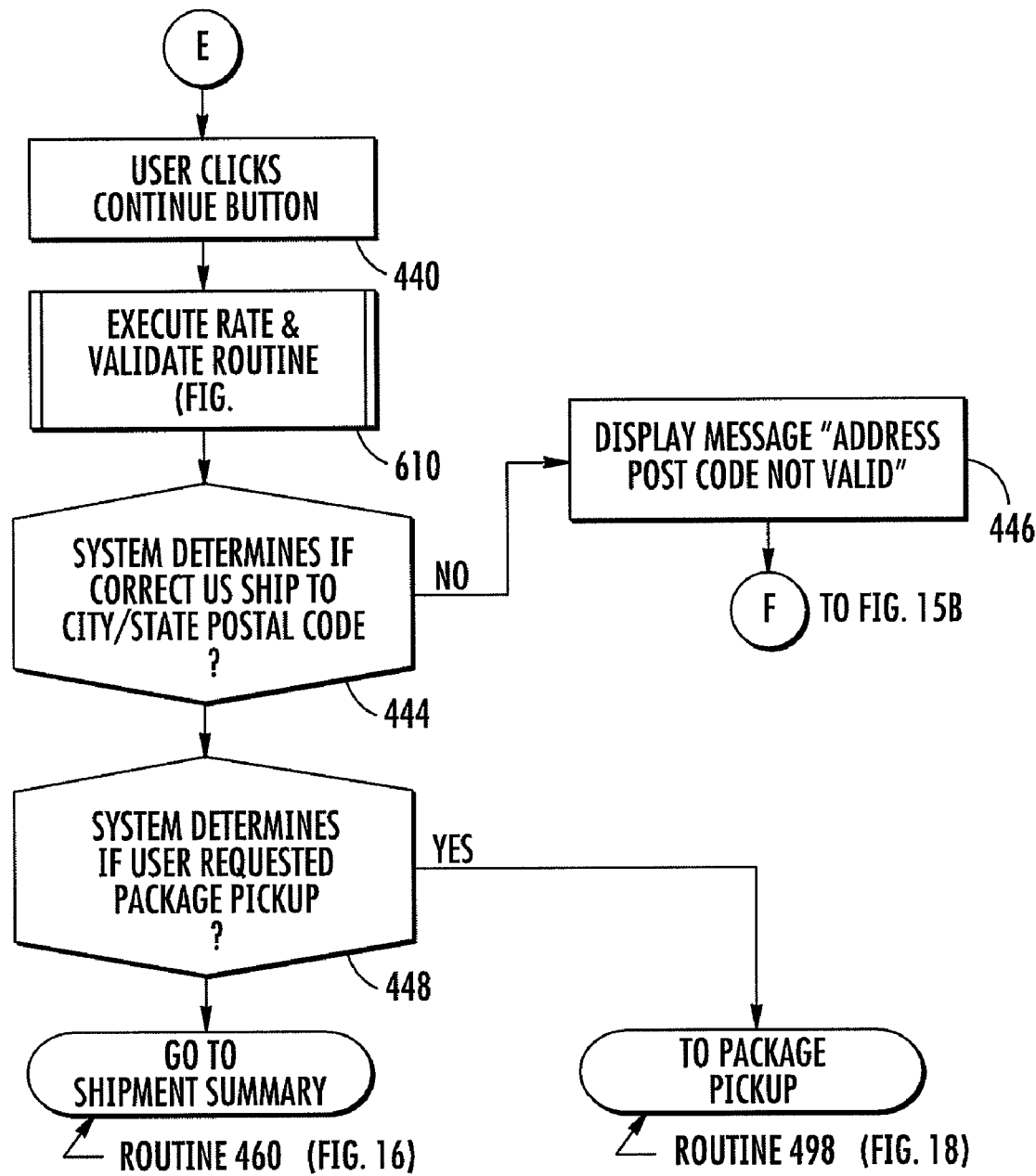

After these steps, the SHIPPING routine 171 proceeds to step 440 illustrated in FIG. 15F. The user proceeds with the package shipping process by selecting the CONTINUE button 722 on the SHIPPING INFORMATION page 660. In response, the system is operative to validate whether the correct Ship To and Ship From postal codes were entered, by reference to a prestored database of valid postal codes, and to calculate the appropriate charge for the shipping service. In the disclosed embodiment, the validation is effected by a RATE AND VALIDATE routine 610, which is described in connection with FIG. 23. The routine 610 returns with information indicating that the postal code is valid and delivery can be effected by the shipping service provider, as well as the monetary charges for shipping the package that is to be charged to the customer's account or credit card. It will be understood by those skilled in the art that city/state or similar information may be used to rate the shipping costs.

At decision 444, the system tests to determine whether the rate and validate routine 610 has indicated an error. If there are any errors or omitted information, the system displays an error message "Postal Code Not Valid" at step 446 and directs the user back to step 370.

If at decision 444 the postal code has been validated by the system, the process proceeds to decision 448. At this step, the system tests whether the user has requested package pickup. It will be recalled from the discussion above that package pickup can be indicated for a package by the user's selection of the REQUEST PACKAGE PICKUP check box 708 illustrated in FIG. 26. If affirmative, the system directs the user to an ON CALL AIR PICKUP page or screen shown in FIG. 29, and the process branches to a PACKAGE PICKUP routine 498, as described in connection with FIG. 18.

Figure 27A:
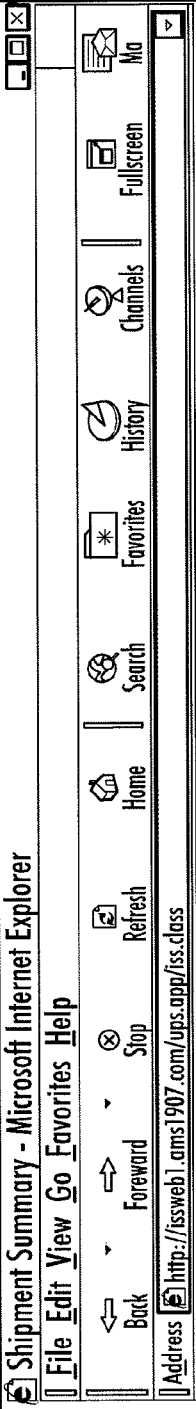
FIG. 27, consisting of FIGS. 27A and 27B, is an exemplary screen display of a SHIPMENT SUMMARY page or screen as generated by a preferred embodiment of the present invention.

If at decision 448 the system determines the user has not requested package pickup, the routine branches to a SHIPMENT SUMMARY routine 460, where the user can view a summary of the information about the shipment on a SHIPMENT SUMMARY screen as illustrated in FIG. 27, take other actions, and continue the package shipment process. The SHIPMENT SUMMARY routine 460 is described with reference to FIG. 16.

SHIPMENT SUMMARY Routine

Figure 16A:
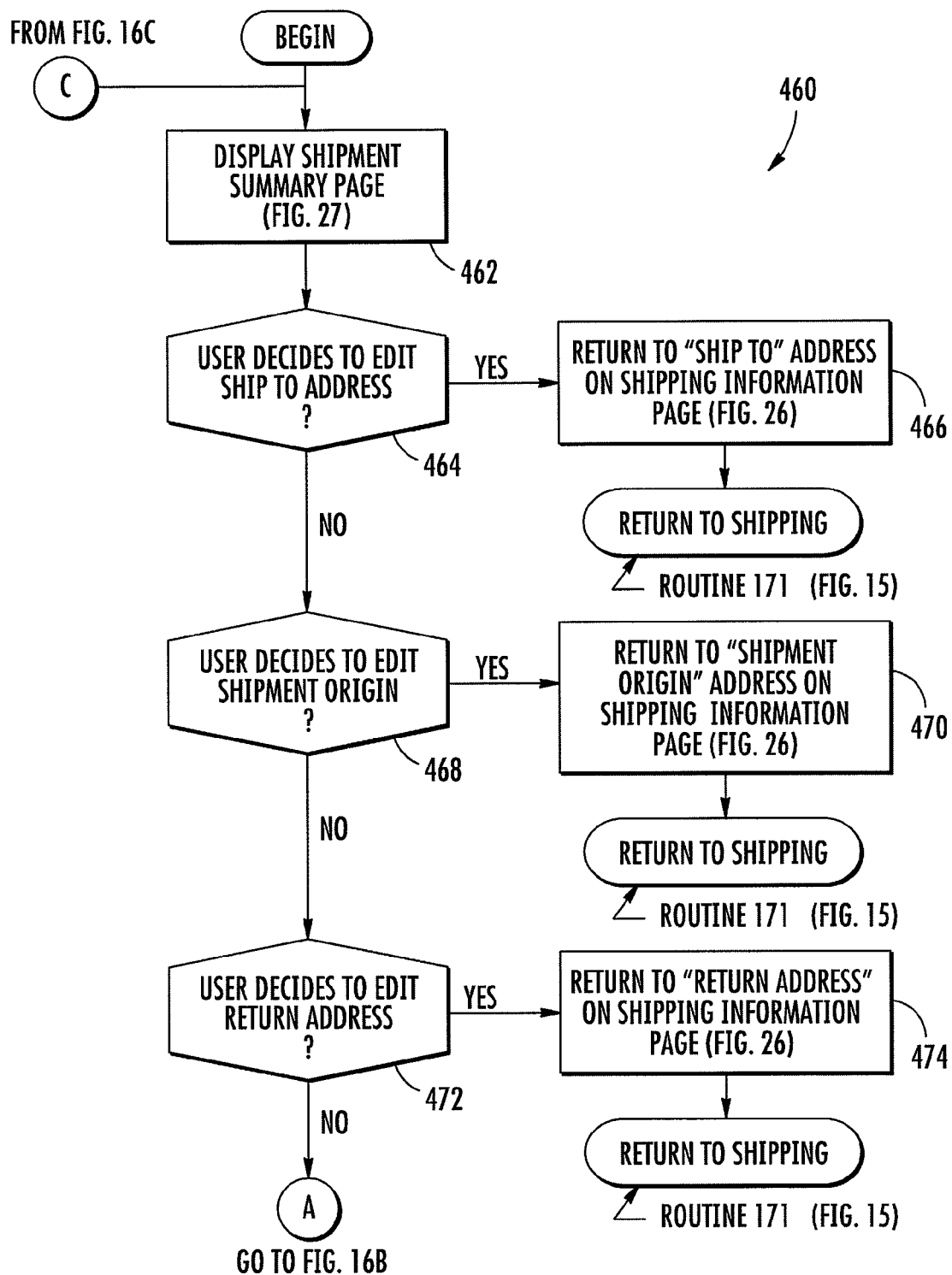
FIG. 16, consisting of FIGS. 16A-16C, is a flow chart of a SHIPMENT SUMMARY routine employed in a preferred embodiment of the present invention.
Figure 16B:
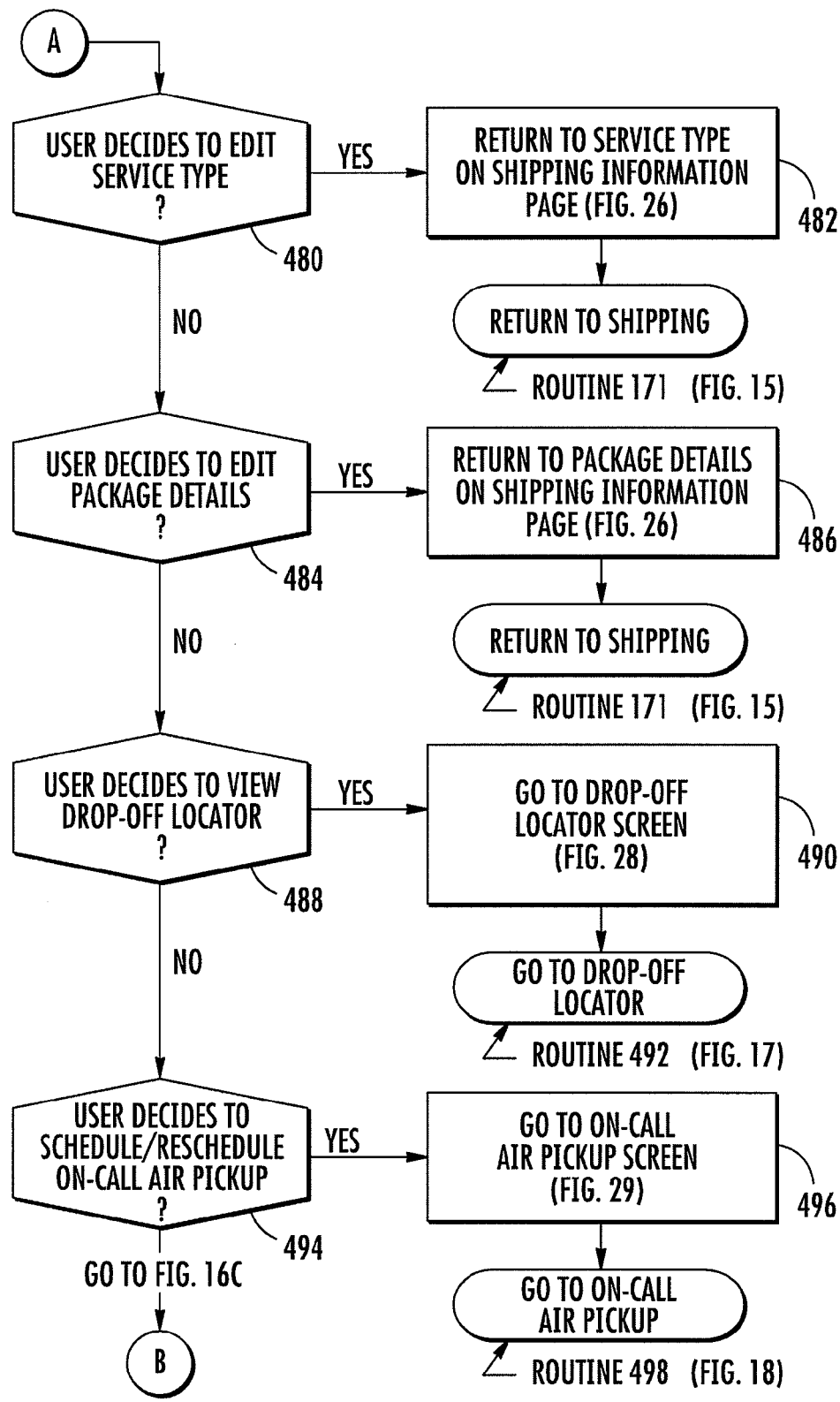
Figure 16C:
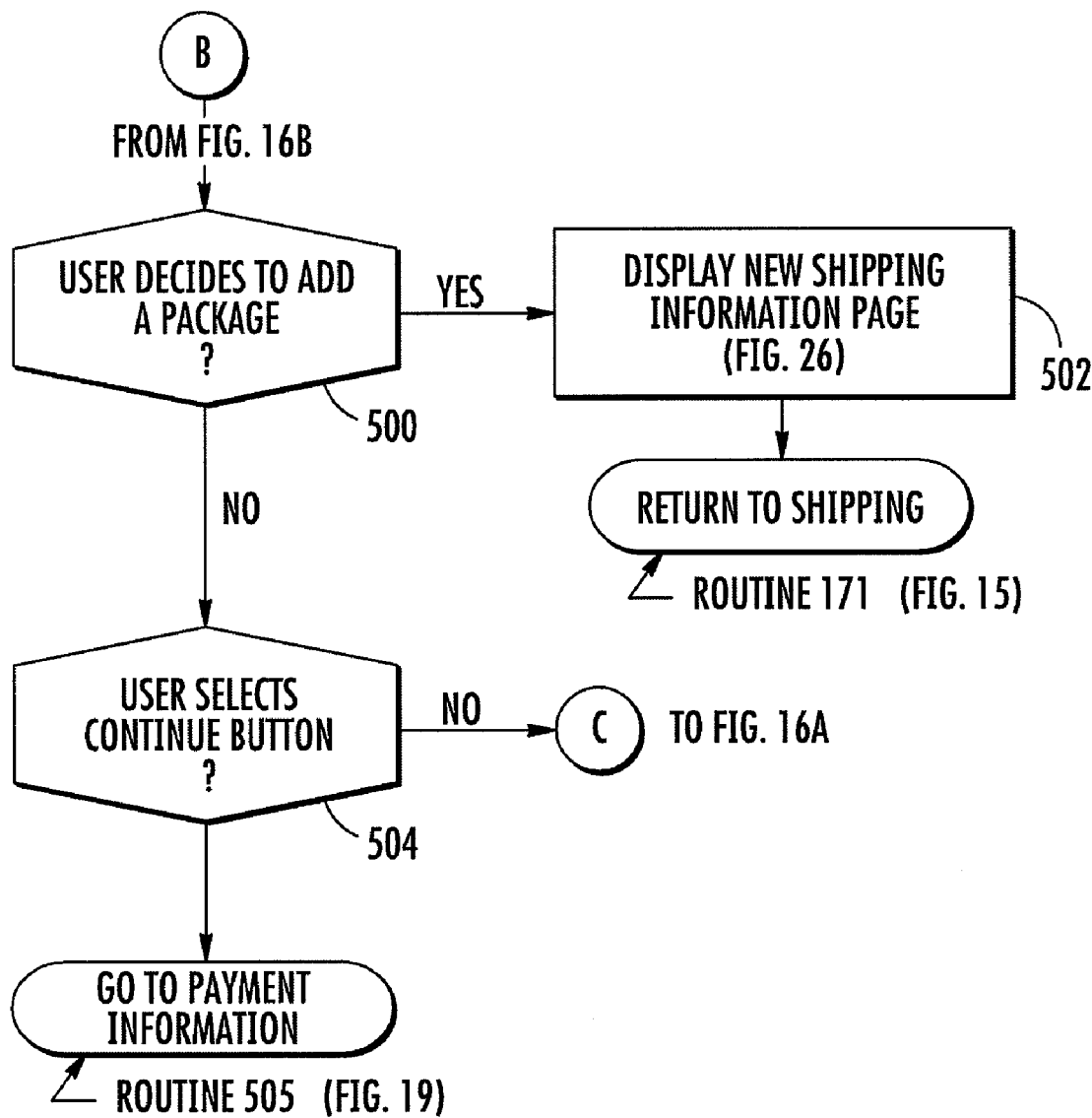

Turn now to FIG. 16 for a discussion of the SHIPMENT SUMMARY routine 460, which should be read in conjunction with the SHIPMENT SUMMARY page 724 shown in FIG. 27. Starting at step 462 the system displays the SHIPMENT SUMMARY page 724 and awaits user input. The SHIPMENT SUMMARY page contains information summarizing the current status of the shipment of packages in process by the customer, prior to closing out the shipment. This page allows the customer to edit or change information about the shipment, add a new package, select or change parameters about on call or demand pickup, or continue with the shipping process. The page includes a TOTAL CHARGES information display region 734 for display of the total charges for the shipment, as such total charges have been calculated by a Rating & Validation Engine (RAVE) during the validation process of FIG. 23.

At decision 464 the system tests whether the user has decided to edit the "ship to" address on the current order. This would be indicated by the user's selection of an "Edit" link 726 in FIG. 27. If affirmative, the process branches to step 466 where the system locates the "ship to" address information and fills it in on the SHIPPING INFORMATION page of FIG. 26, in preparation for display of the information in editable form for the customer. The routine then branches or returns to the SHIPPING routine, FIG. 15. Otherwise, the process proceeds to decision 468.

At decision 468, the system tests whether the user has decided to edit the shipment origin address on the current order. This would be indicated by the user's selection of an "Edit" link 728 in FIG. 27. If so, the process branches to step 470, where the system locates the shipment origin address information and fills it in on the SHIPPING INFORMATION page of FIG. 26, in preparation for display of the information in editable form for the customer. The routine then branches or returns to the SHIPPING routine, FIG. 15. Otherwise, the process proceeds to decision 472.

At decision 472 the system tests whether the user has decided to edit the return address on the current order. This would be indicated by the user's selection of an "Edit" link 732 in FIG. 27. If affirmative, the process branches to step 474 where the system locates the return address information and fills it in on the SHIPPING INFORMATION page of FIG. 26, in preparation for display of the information in editable form for the customer. The routine then branches or returns to the SHIPPING routine, FIG. 15. Otherwise, the process proceeds to decision 480.

At decision 480, the system tests whether the user has decided to edit the service type requested for the current order. This would be indicated by the user's selection of an "Edit" link 732 in FIG. 27. If affirmative, the process branches to step 482 where the system locates the selected service type information and fills it in on the SHIPPING INFORMATION page of FIG. 26, in preparation for display of the information in editable form for the customer. The routine then branches or returns to the SHIPPING routine, FIG. 15. Otherwise, the process proceeds to decision 484.

At decision 484 the system tests whether the user has decided to edit any package details for the current order. If so, the process branches to step 486, where the system locates the selected package detail information, e.g. package type, weight, dimensions, declared value, etc. and fills it in on the SHIPPING INFORMATION page of FIG. 26, in preparation for display of the information in editable form for the customer. The routine then branches or returns to the SHIPPING routine, FIG. 15. Otherwise, the process proceeds to decision 488.

At decision 488 the system tests whether the user has decided to view the drop off locator, perhaps in anticipation of dropping off the package for acquisition by the SSP, as opposed to on demand pickup. If affirmative, the process branches to step 490, where the system displays the DROP-OFF LOCATOR page, as shown in FIG. 28. The routine then branches to a DROP OFF routine, as described in connection with FIG. 17. Otherwise, the process proceeds to decision 494.

Figure 29:
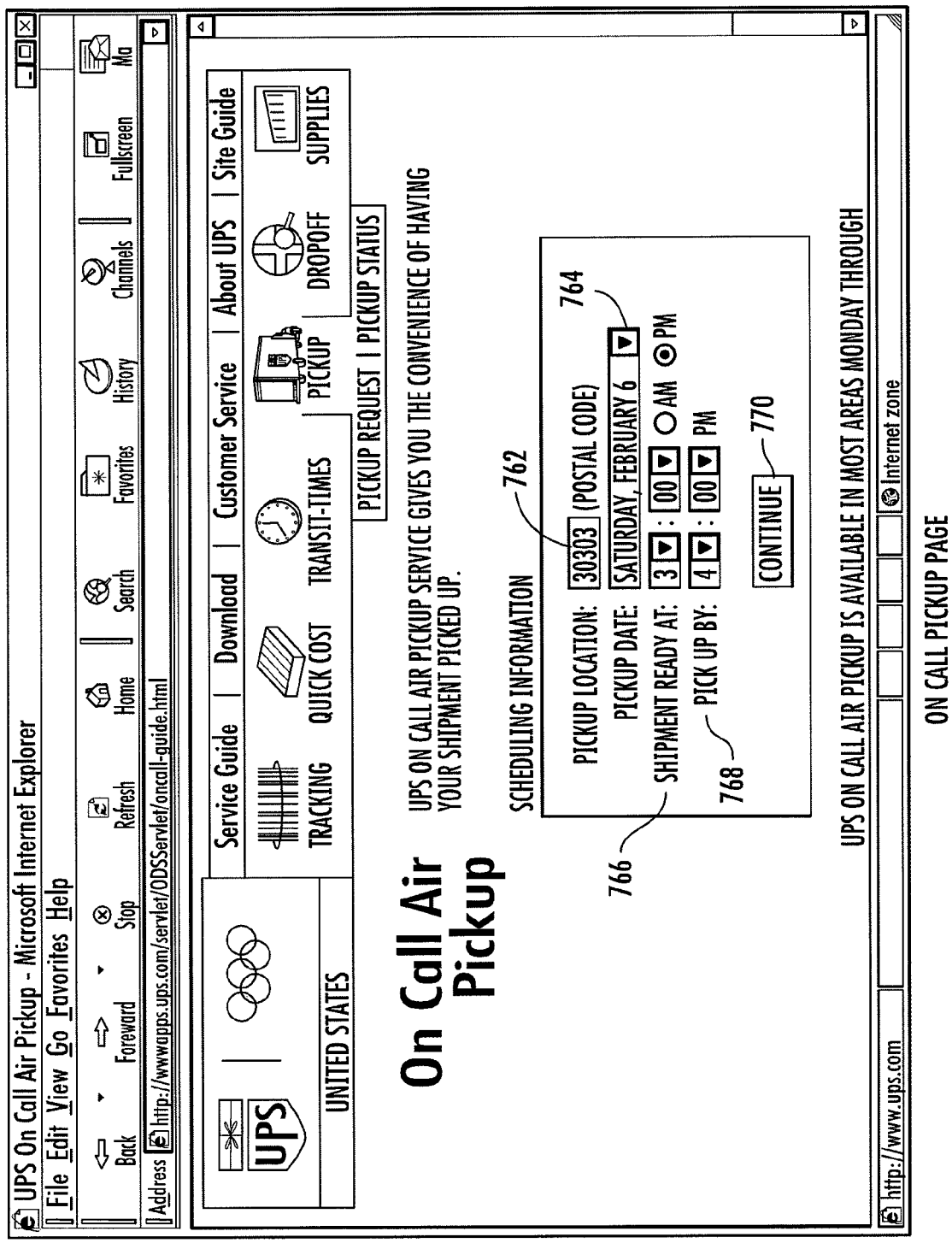
FIG. 29 is an exemplary screen display of an ON CALL AIR PICKUP page or screen as generated by a preferred embodiment of the present invention.

At decision 494 the system tests whether the user has decided to schedule, or perhaps reschedule, dates and times for on demand pickup. If affirmative, the process branches to step 496 where the system displays the ON CALL AIR PICKUP page, as shown in FIG. 29. The routine then branches to a PACKAGE PICKUP routine, as described in connection with FIG. 18. Otherwise, the process proceeds to decision 500.

At decision 500 the system tests whether the user has decided to add a new package to the current shipment by selecting an ADD A PACKAGE button 742 illustrated in FIG. 27. If affirmative, the process branches to step 502 where the system displays a new SHIPPING INFORMATION page as in FIG. 26, and branches to the SHIPPING routine FIG. 15. Otherwise, the process proceeds to decision 504.

At decision 504 the system tests whether the user has decided to complete the process by selecting the CONTINUE button 744 in FIG. 27. If affirmative, the process branches to the next stage in the process of package shipping and completion, namely, a PAYMENT INFORMATION routine FIG. 19.

DROP-OFF LOCATOR Routine

Figure 17:
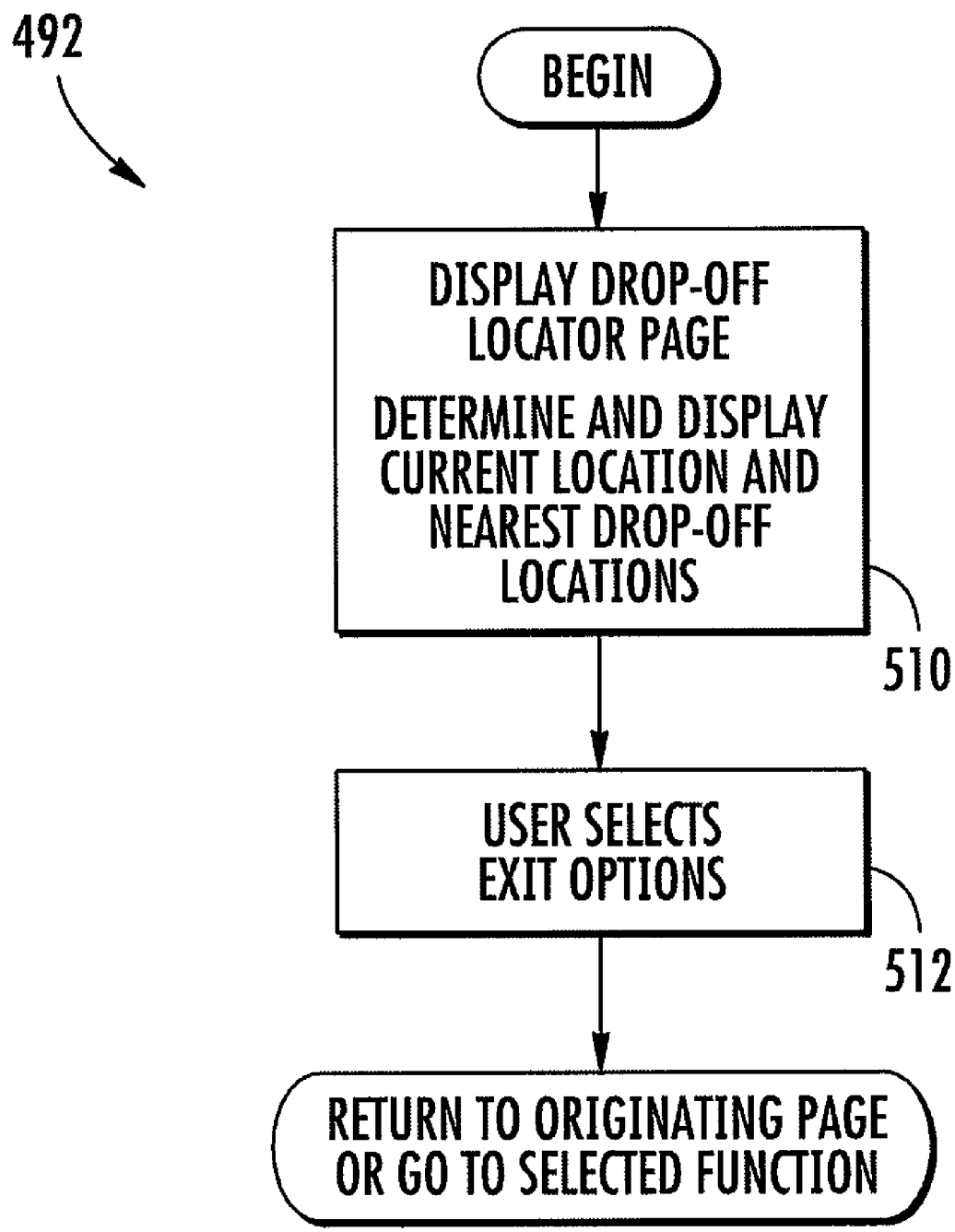
FIG. 17 is a flow chart of A DROP-OFF LOCATOR routine employed in a preferred embodiment of the present invention.

Turn now to FIG. 17 for a discussion of the DROP OFF LOCATOR routine 492, which should be read in conjunction with the DROP-OFF LOCATOR page 746 shown in FIG. 28. Starting at step 510 the system displays the DROP-OFF LOCATOR page 746 and awaits user input. The DROP-OFF LOCATOR page utilizes the customer's current origin address (or another address, which can be entered by the customer by invoking a command, not illustrated), and determines one or more nearby drop-off locations at which the customer can deposit the package or packages for acquisition by the shipping service provider. These nearby locations are preferably displayed on a map that shows the current customer location with a "YOU ARE HERE" label 748, with one or more nearby locations for drop-off, e.g. locations 750a, 750b, 750c, etc. These locations are also preferably listed in an address region 752 so that the user can determine the location's address, location type, times of operation, telephone number, and distance.

At subsequent step 512, the user may select an exit option, for example, the browser's known BACK button or a CONTINUE button 754 or another appropriate control button. The system then returns to an ORIGINATING page (if the BACK button is selected) or branches to a selected function.

PACKAGE PICKUP Routine

Figure 18:
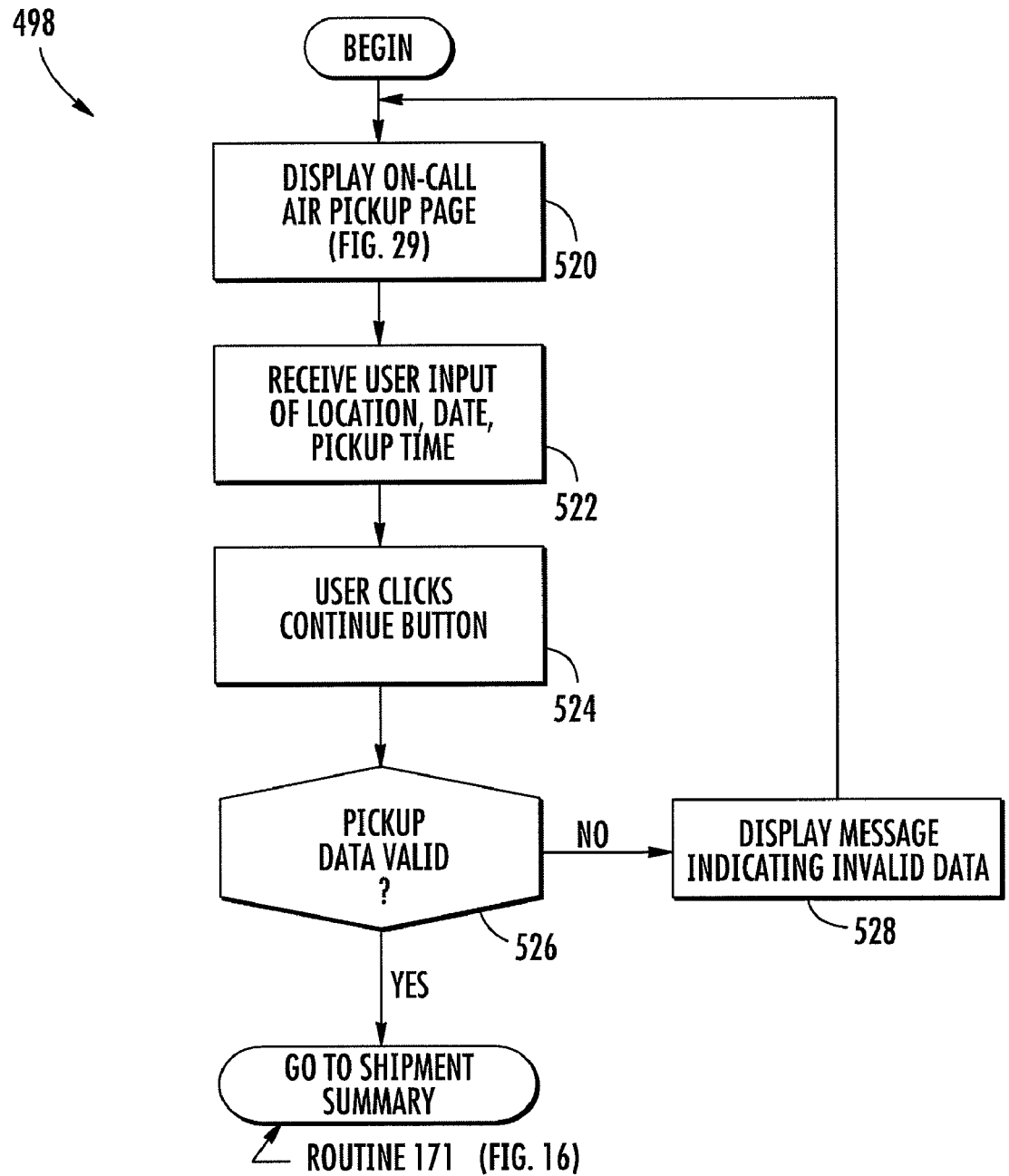
FIG. 18 is a flow chart of a PACKAGE PICKUP routine employed in a preferred embodiment of the present invention.

Turn now to FIG. 18 for a discussion of the PACKAGE PICKUP routine 498, which should be read in conjunction with FIG. 29 and which illustrates the ON CALL AIR PICKUP page 760. This routine effects a demand for pickup of a package, also called a request for On Demand Service (ODS).

In the disclosed preferred embodiment, an ODS request is, directed to ODS system 34 (FIG. 3), which is implemented with information stored in an ODS database 36. The ODS database immediately performs a look-up service for the area information and determines the service area and location time selected by the user. If the selected time and date for the pick-up is available, the ODS system validates the pick-up request and sends a confirming message back to an application server that initiated the ODS request. The confirmation is immediately forwarded to the user who continues with the shipment process.

However, if the time and date selected by the user is not available, the ODS responds by providing alternative pickup information, for example the nearest five optional times and dates available for pick-up. The user may then select from the alternative pick-up times. Once the user has confirmed the time and date available, the ODS system validates the pick-up information and rates the shipment with the RAVE function 64, as described below.

If the selected time is rapidly approaching and if there is an available driver close to the user, then the preferred system delivers a message to the vehicle driver via a Delivery Information Acquisition Device (DIAD) 40. The message delivered to the driver directs them to the user at the date, time, and location selected by the user for the ODS pick-up request. Alternatively, if after searching the ODS dispatch system it is determined that there are no readily available drivers close to the user at the time and date of the ODS request pick-up, the ODS request is delivered to a message center (not shown) where the ODS request is routed to the next available driver scheduled to be at or near the user at the requested time and date of pick-up.

Starting in FIG. 18 at step 520, the system displays the ON CALL AIR PICKUP page 760 (FIG. 29), which includes data fields for receiving user input of scheduling information, for example pickup location 762, pickup date 764, a shipment ready time 766, and a pick up by time 768. The user enters desired information in the fields at step 522 by data entry or use of drop-down menus. When the user is satisfied with the scheduling information entered, the user selects the CONTINUE button 770, which takes the routine to step 524. In response to the CONTINUE button, at decision 526 the system determines whether the entered information is valid, for example, by determining if the user's pickup location postal code entered into the pickup location field 762 is within the SSP's service area, or whether the dates and times entered into the corresponding fields are within the SSP's predetermined service dates and times.

If the system cannot validate the scheduling information, the process branches to step 528, where the system displays a message indicating that the scheduling data is invalid, and the routine branches back to step 520 for entry of other information. It will be understood that the user can exit from this page by other appropriate commands, e.g. the browser's BACK button, etc.

If at decision 526 the pickup data is deemed valid, the scheduling information is accepted by the system and the routine branches to the SHIPMENT SUMMARY routine 460, described in connection with FIG. 16 and FIG. 27. It will be understood that the user can proceed from there to add a package, or continue with the shipping process.

PAYMENT Routine

Figure 19A:
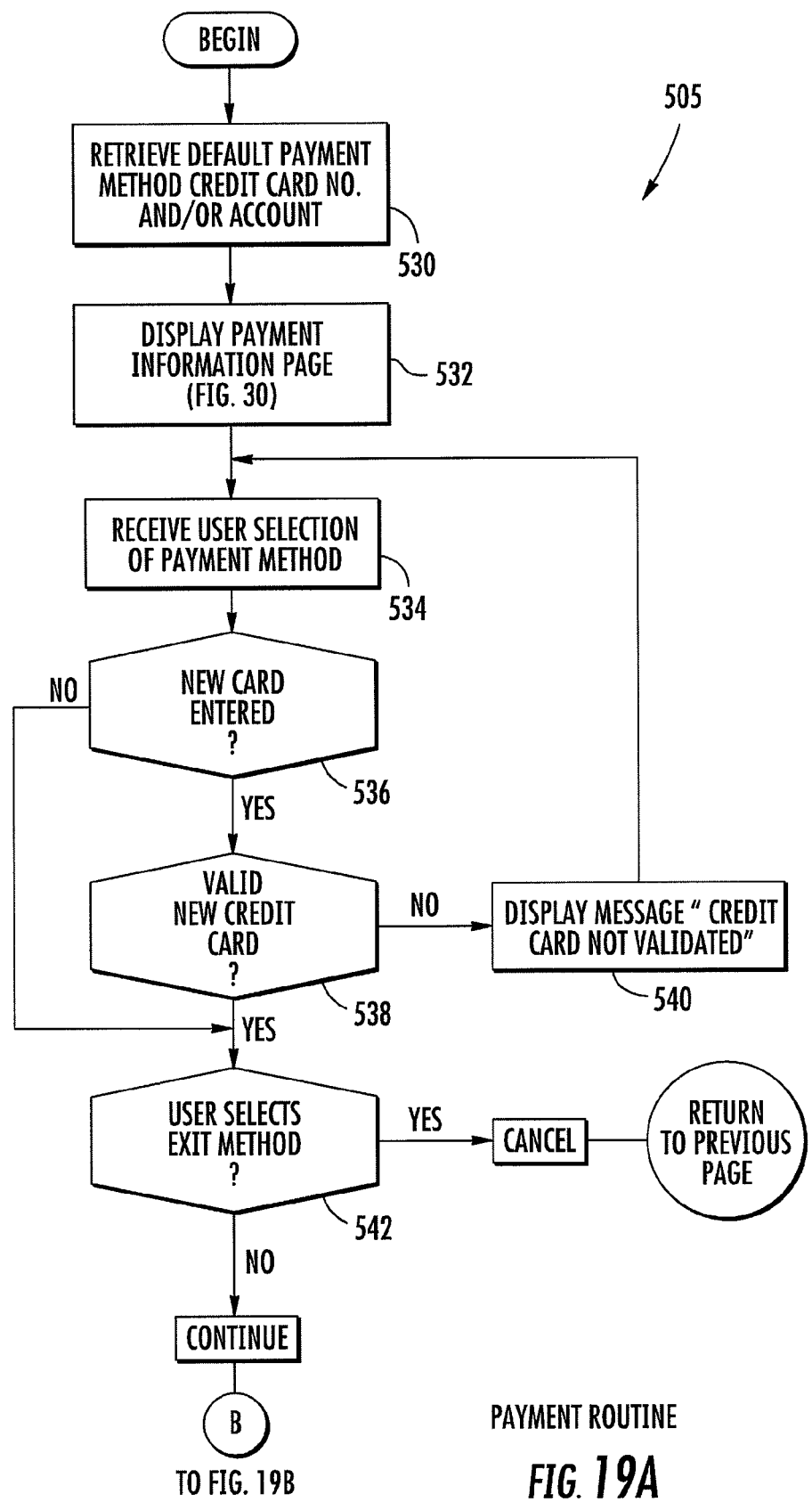
FIG. 19, consisting of FIGS. 19A and 19B, is a flow chart of a PAYMENT routine employed in a preferred embodiment of the present invention.
Figure 19B:
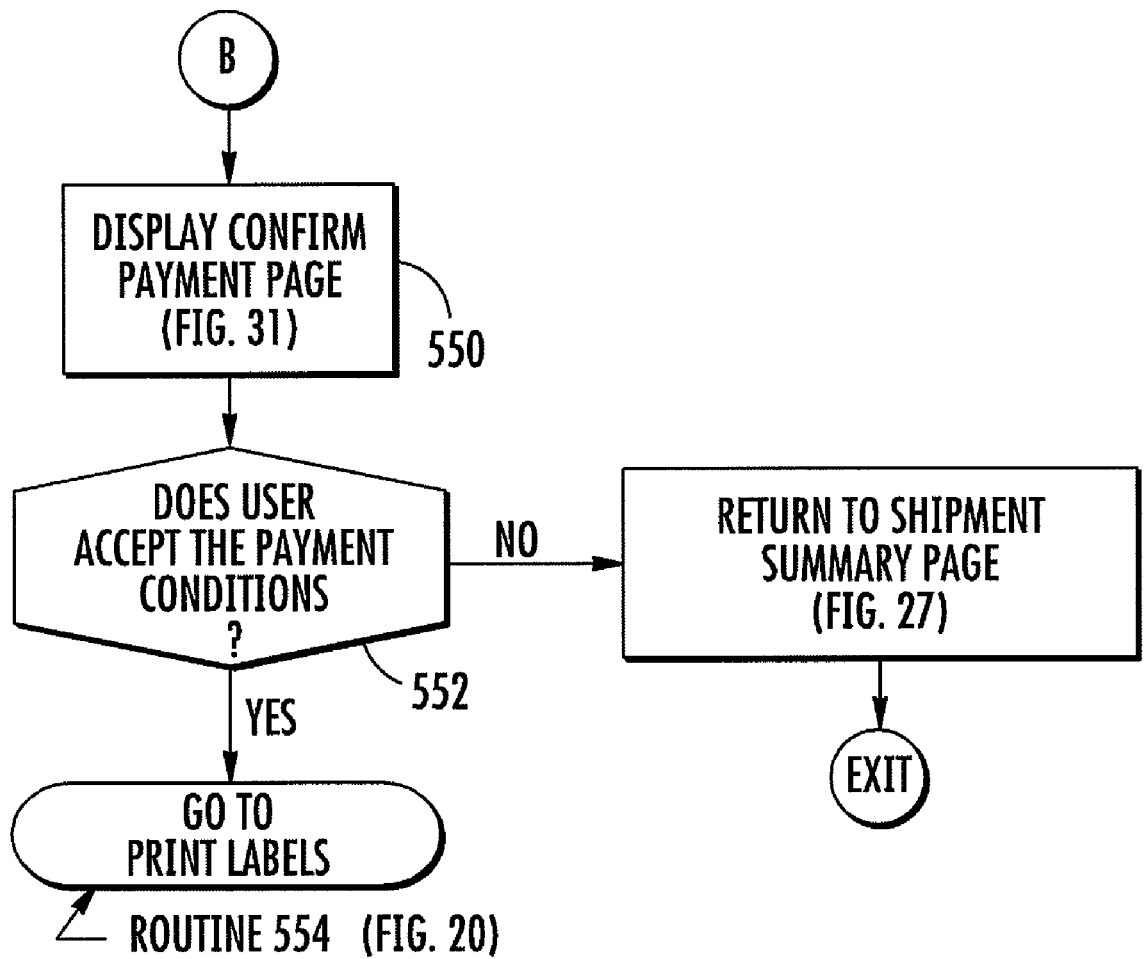
Figure 30:
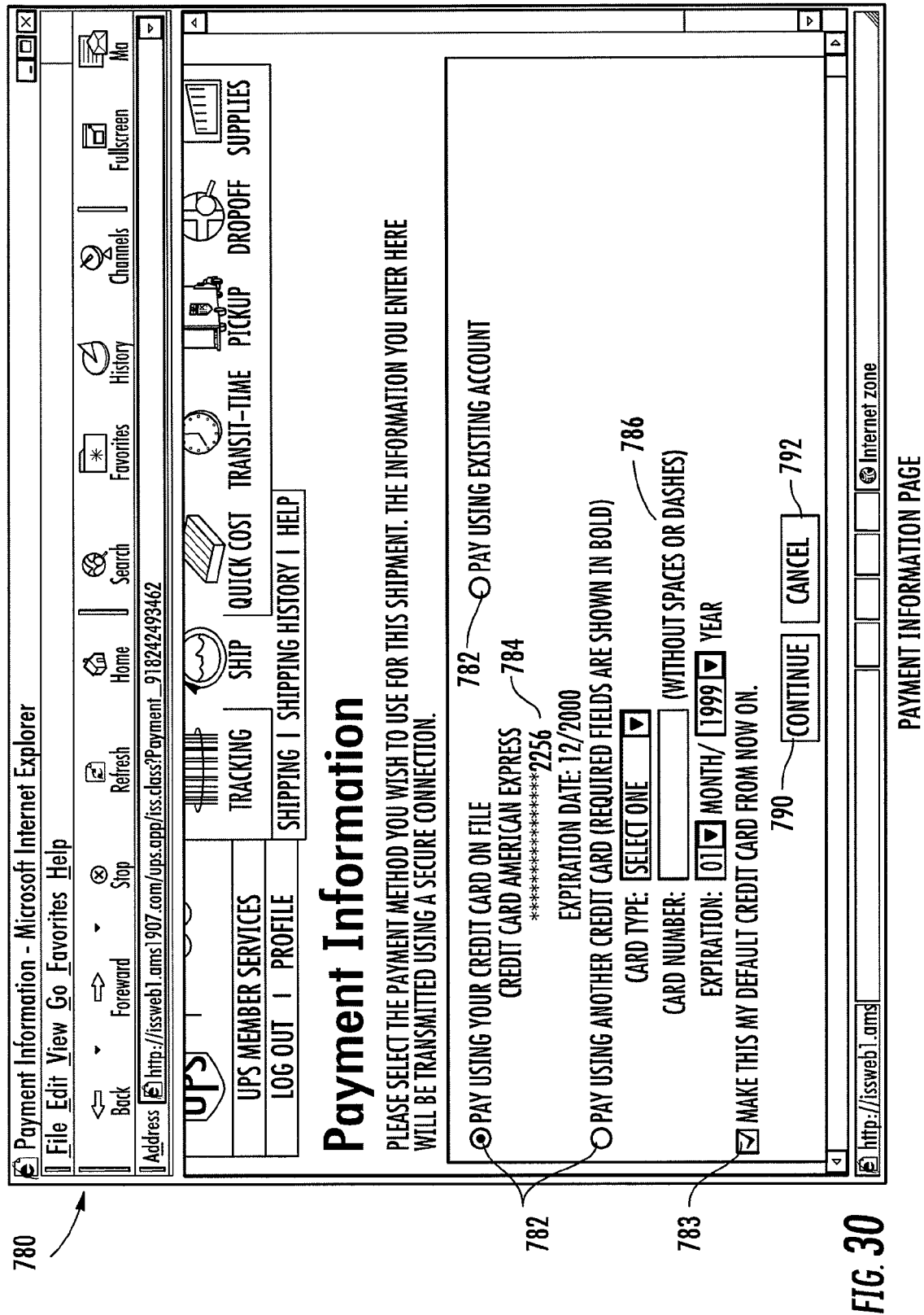
FIG. 30 is an exemplary screen display of a PAYMENT INFORMATION page or screen as generated by a preferred embodiment of the present invention.

Turn now to FIG. 19 for a discussion of the PAYMENT routine 505, which should be read in conjunction with FIG. 30 and FIG. 31, which illustrate a PAYMENT INFORMATION page 780 and a CONFIRM PAYMENT page 804, respectively.

Starting at step 530, the system retrieves default payment method credit card and any account number associated with the customer. At step 532 the system displays a PAYMENT INFORMATION page 780, which includes radio buttons, check boxes, and data fields for receiving payment information from the customer, and awaits user input. For example, in the disclosed embodiment the payment information data entry includes mutually exclusive radio buttons 782*a*, 782*b*, 782*c* for allowing user selection of a credit card on file, another credit card, and a user's existing account with the shipping service provider, respectively.

In the case of a credit card on file, the system utilizes the default credit card information provided by the customer during registration, which is stored in the customer's Internet Services Account Profile (ISAP) file. Selected information about the default credit card is displayed to the user in region 784.

At decision 536 the system tests whether the user has selected the "PAY USING ANOTHER CREDIT CARD" radio button 782*b*. If not, the routine branches to step 542 to await selection of an exit method. In the case of another credit card, data entry fields 786 for receiving entry of card type, card number, and expiration date are activated. A check box 788 is provided so that the user can make the credit card the new default credit card from now on. The system validates the provided new credit card information at step 538. If the new credit card information can be validated, the routine branches to step 542 to await selection of an exit method. If the information cannot be validated, at step 540 the system displays a message indicating the card is not validated or a message noting why the card is rejected, and returns control to step 534 to await selection of another payment method.

In the case of a payment using an existing SSP account, the system utilizes an account number, which is stored in the customer's ISAP.

Once appropriate payment information for the shipment is entered, at step 542 the user can select a CONTINUE button 790 or a CANCEL button 792. The CANCEL button causes the current operation to be aborted, and control may be returned to a previous page or handled otherwise, as the customer has elected not to proceed with the payment method selection.

If at step 542 the CONTINUE button is selected, the system further validates the provided payment information, and branches to step 550 if the payment information is validated.

At step 550, the system displays the CONFIRM PAYMENTS page 804, as shown in FIG. 31. This page contains various terms and conditions of the shipment by the SSP, which can be provided via links to other pages containing text (not shown) in the known manner or directly on the page Information about the selected payment method is presented in a display area 794 and payment amount is presented in a display area 796. This page also contains an "I ACCEPT" button 800 for receiving customer acceptance of the payment method, payment amount, and terms and conditions, as well as an "I DO NOT ACCEPT" button 802 for receiving customer rejection of the transaction. Also provided is a link 798 to Other Payment Methods, which allows the customer to change the payment method before continuing the transaction.

At decision 552, the system tests whether the user has selected the "I ACCEPT" button 800 or the "I DO NOT ACCEPT" button 802. In the event that the customer has selected the latter, the user is returned to the SHIPMENT SUMMARY page (FIG. 27) and the routine exits. In the event that the customer has selected the former, the process for shipping can continue, and the routine branches to a PRINT LABELS routine, described with reference to FIG. 20.

PRINT LABELS Routine

Figure 20:
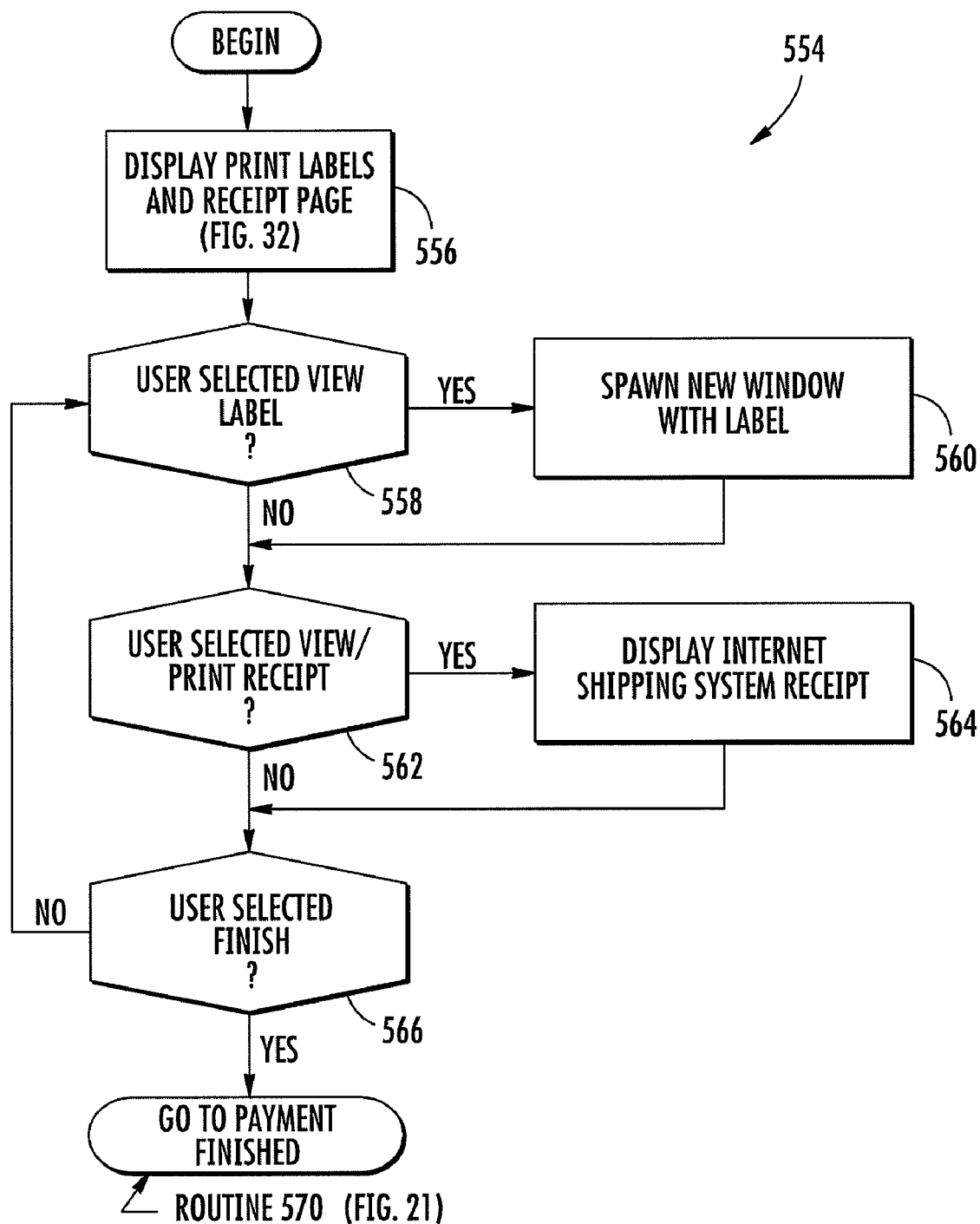
FIG. 20 is a flow chart of a PRINT LABELS/RECEIPT routine employed in a preferred embodiment of the present invention.

Turn now to FIG. 20 for a discussion of the print labels routine 554, which should be read in conjunction with FIG. 32 and FIG. 33, which illustrate a PRINT LABELS AND RECEIPT page 806, and a RECEIPT page 818, respectively.

Starting at step 556 the system displays the PRINT LABELS AND RECEIPT page 806 as shown in FIG. 32, and awaits user input. By selecting button 810, the PRINT LABELS AND RECEIPT page 806 provides information about how to print a label 25 on the customer's computer that, in accordance with aspects of the present invention, allows the user to view and print labels, allows the user to view and print a receipt, and allows the user to finish the current shipment.

At decision 558 the system tests whether the user has elected to view and print a label by selecting a LABEL 1 button 812. It will be appreciated at this juncture that the preferred system keeps track of the number of labels printed by the customer. Upon reaching this stage in the process, the disclosed system communicates predetermined printer indicia to the user's computer to permit the user to print a label. These labels are effectively "prepaid" and may be perceived to have actual cash value, as the customer's credit card or account has been charged for the shipping transaction. Therefore, appropriate security measures are taken so as to ensure that the number of labels printed by the customer is monitored, and that each label printed contains different indicia that allow the system to determine if there are multiple labels printed for a single prepaid transaction. In accordance with one aspect of the invention, each label viewed and printed by the customer will be different and contain different security indicia, so as to minimize the likelihood of inadvertent use of multiple labels for a single transaction or fraud.

Generally, the user reviews the label 25 for accuracy of the human readable codes, and if approved, selects the FILE/PRINT command from the browser tool bar or menu. In response, the ISS permits the user to print the label 25 at the printer 28 connected to the user's computer 20 (FIG. 1).

Further details of the label 25 are provided in the discussion associated with FIG. 37.

If the user has selected the LABEL 1 BUTTON 812, the routine branches to step 560 and a new browser window is "spawned" in the known manner, preformatted to landscape mode for printing, and containing a visible replica of the label that will be printed in response to the user selecting a PRINT button in the browser button bar or selecting the PRINT command from the known FILE menu, all in the known manner. By "spawning" a window, we mean generating and making active a new browser window in the known manner of present day Internet browsers, the window containing only the label information ready to print, typically without any controls or other commonly found Internet browser features. In this manner, the customer can easily invoke the PRINT command for the active window and obtain a properly formatted (preferably in landscape printing mode) PRINT label 25 such as shown in FIG. 37.

In the event that a label misprints, the customer can reselect the LABEL button 812 until a satisfactory label is obtained.

After the label is viewed and printed, or the label window closed in the known manner by the user's selecting on the known "CLOSE" box, control passes to decision 562. At decision 562 the system tests whether the user has selected to view/print a receipt by selecting a VIEW/PRINT RECEIPT button 814 shown in FIG. 32. If affirmative, the system displays an ISS Receipt 818 as shown in FIG. 33. The receipt 818 contains the usual information about the transaction such as addresses, shipment details, charges, package details, etc. for retention and record keeping purposes by the customer.

If at decision 562 the user has not selected the VIEW/PRINT RECEIPT button, control passes to decision 566. At decision 566 the system tests whether the user has selected a FINISH button 816 shown in FIG. 32, indicating that the user is satisfied that all labels for the current shipment have printed correctly. If not, control passes back to step 558 to receive further user input. If the FINISH button 816 was selected, the routine exits and control passes to a shipment finished routine, described next with reference to FIG. 21.

SHIPMENT FINISHED Routine

Figure 21:
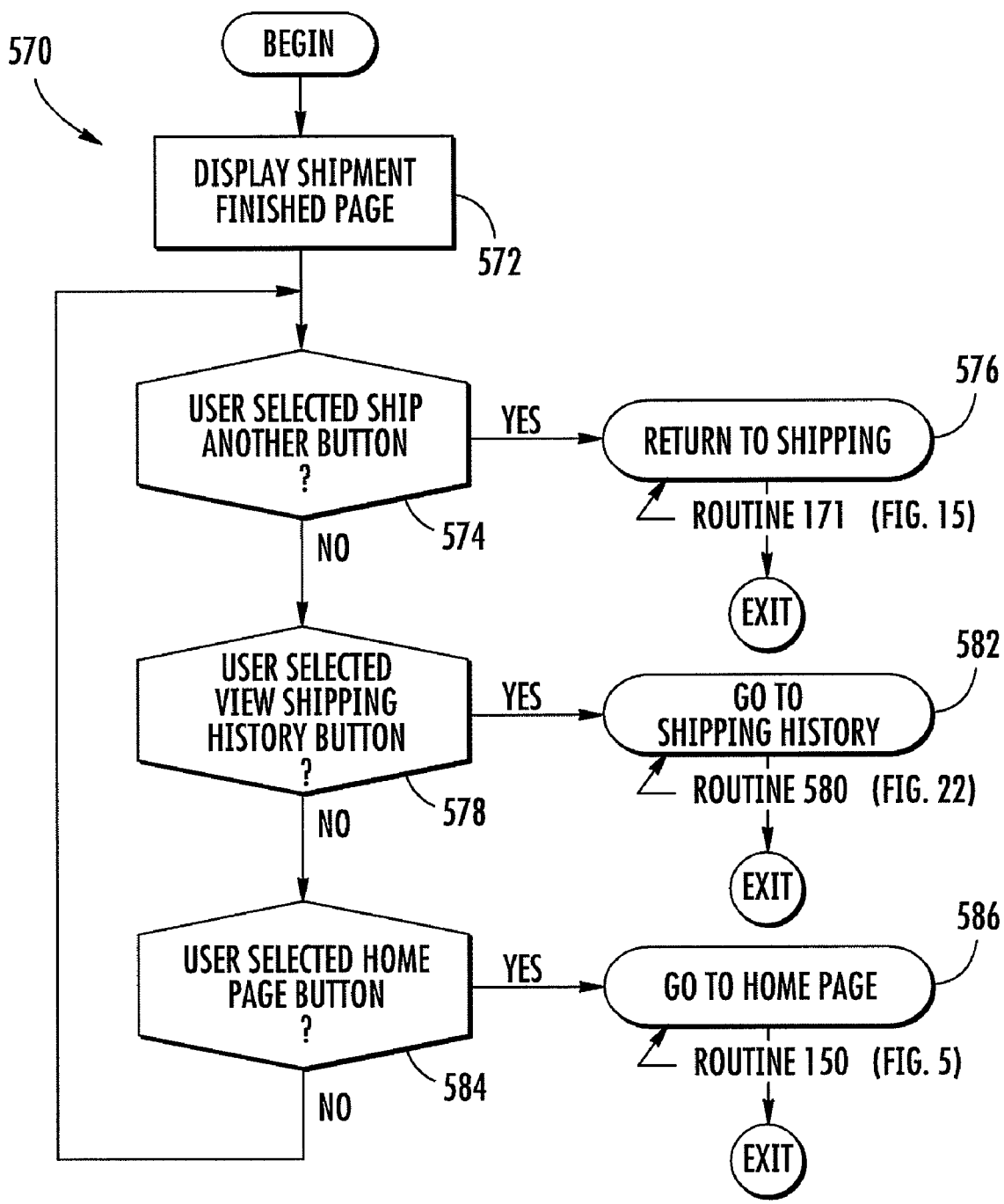
FIG. 21 is a flow chart of a SHIPMENT FINISHED routine employed in a preferred embodiment of the present invention.

Turn now to FIG. 21 for a discussion of the SHIPMENT FINISHED routine 570, which should be read in conjunction with FIG. 34, which illustrates a SHIPMENT FINISHED page 820.

Starting at step 572 the system displays a SHIPMENT FINISHED page 820, which contains control buttons SHIP ANOTHER 830, VIEW MY SHIPPING HISTORY 832, and GO TO THE HOME Page 834, and waits for user input.

At decision 574 the system tests whether the user has selected the SHIP ANOTHER button 830, indicating a desire on the part of the customer to ship another package during the current session of communication with the system. If affirmative, control passes to step 576 and the user is returned to the SHIPPING routine 171 illustrated in FIG. 15, and exits. Otherwise control passes to decision 578.

At decision 578 the system tests whether the user has selected the VIEW MY SHIPPING HISTORY button 832, indicating a desire on the part of the customer to cause the system to retrieve and display information pertaining to the customer's prior shipments and the status thereof. If affirmative, control passes to step 582 and the routine branches to the SHIPPING HISTORY routine described in connection with FIG. 22, and exits. Otherwise control passes to decision 584.

At decision 584 the system tests whether the user has selected the GO TO THE HOME PAGE button 834, indicating a desire on the part of the customer to return to the SSP's home page. If affirmative, control passes to step 586, and the routine branches to the HOME PAGE routine described with reference to FIG. 5, and exits. Otherwise control returns to decision 574 to await user input.

SHIPPING HISTORY Routine

Figure 22:
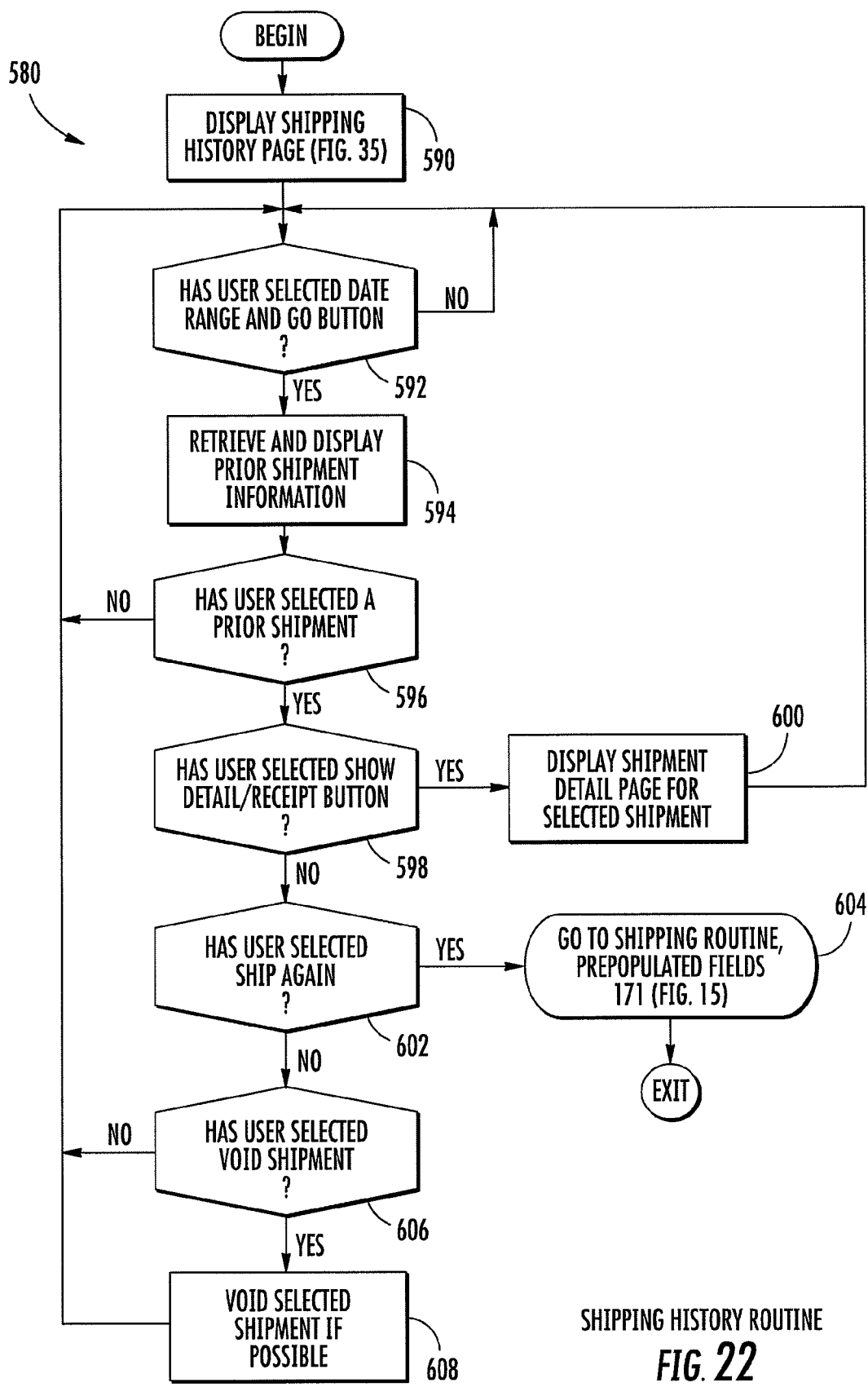
FIG. 22 is a flow chart of a SHIPPING HISTORY routine employed in a preferred embodiment of the present invention.
Figure 36B:
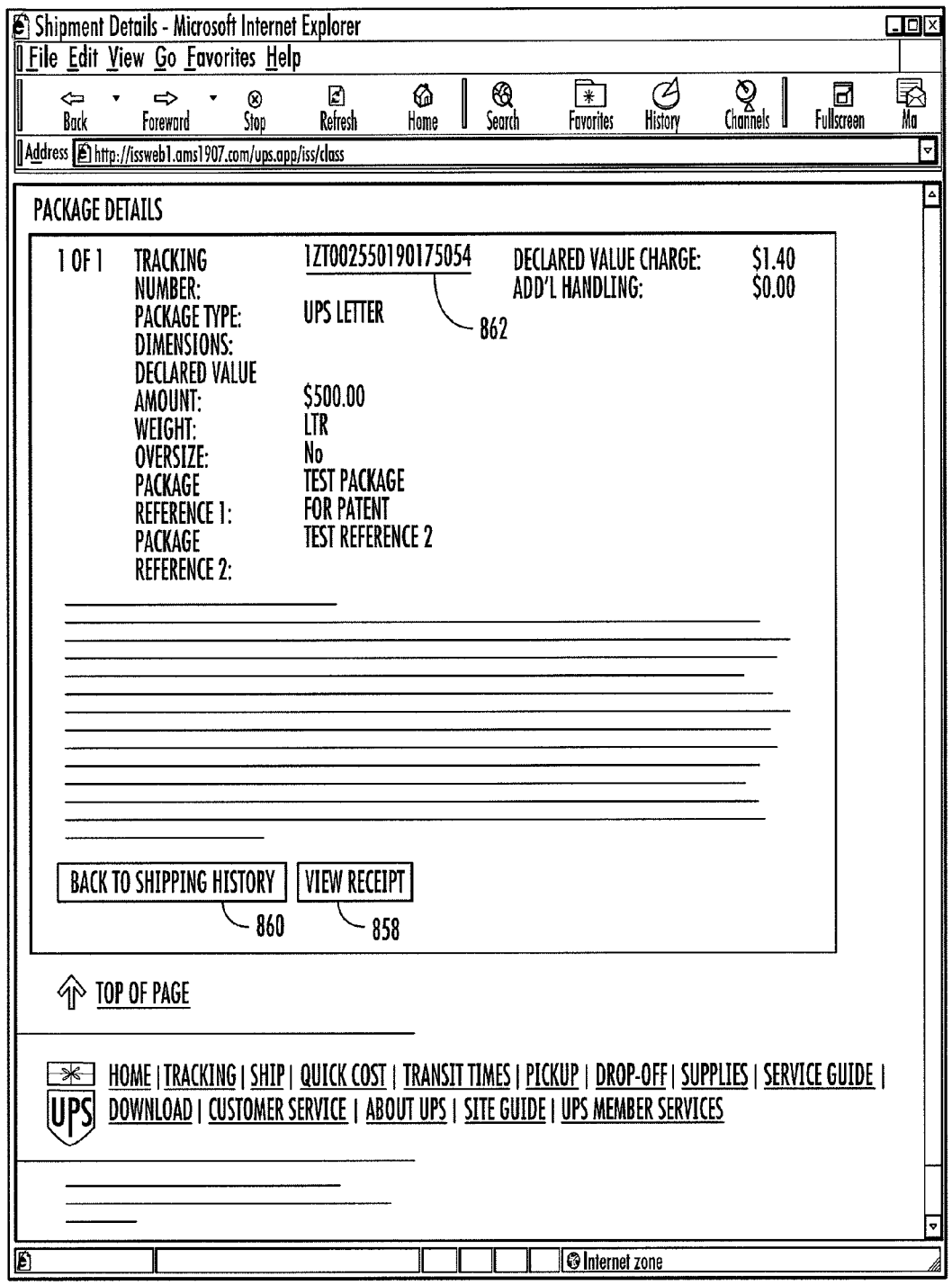
FIG. 36, consisting of FIGS. 36A and 36B, is an exemplary screen display of a SHIPMENT DETAILS page or screen as generated by a preferred embodiment of the present invention.

Turn now to FIG. 22 for a discussion of the SHIPPING HISTORY routine 580, which should be read in conjunction with FIG. 35, which illustrates a SHIPPING HISTORY page 836 and FIG. 36, which illustrates a SHIPMENT DETAILS page 856. The SHIPPING HISTORY page displays information in list form about one or more prior shipments by the customer, allows selection of a date range within which to obtain information about the prior shipments, allows the user to command the system to search for historical information within the selected date range, and allows the user to view shipment details about selected shipments in the list of one or more prior shipments. The SHIPMENT DETAILS page contains specific information about a selected historical shipment.

Starting at step 590 the system displays the SHIPPING HISTORY page 836 containing shipping history information and controls, and awaits user input. The preferred SHIPPING HISTORY page includes, for example, a data field 840 for entry of a date range within which the user desires to obtain historical information, a GO button 842 that commands the system to retrieve historical information about prior shipments within the selected date range, a display region 844 for display of information identifying one or more prior shipments by the customer, radio selection buttons 848 for allowing user selection of a prior shipment for display of shipment details, a SHOW DETAIL/RECEIPT button 850, a SHIP AGAIN button 852, and a VOID SHIPMENT button 854.

At decision 592 the system tests whether the user has selected a date range from the drop down menu 840 of available date ranges and has also selected the GO button 842. If not, the routine loops to continuously test, as no further operations are possible until a date range has been selected and the command has been issued to retrieve the shipping history information. If affirmative, control passes to step 594 and the system is operative to cause the mainframe computer associated with the SSP, which stores package level detail (PLD) information for a predetermined period of time, to retrieve the requested historical information. Preferably, this historical information is passed upwardly through the various components of the system to minimize retrieval latency, for example the information may be cached in an application server 78 or web front end server 50 (FIG. 2). The retrieved information is then displayed to the customer in a historical information display region 844 illustrated in FIG. 35. Control then passes to decision 596.

At decision 596 the system tests whether the user has selected a particular prior shipment with RADIO button 848. If not, control returns to step 592 to receive user input. If affirmative, control passes to decision 598.

At decision 598 the system tests whether the user has selected the SHOW DETAIL/RECEIPT button 850. If affirmative, control passes to step 600 where the system retrieves the shipment history information corresponding to the selected shipment. This information is displayed in the preferred embodiment in a separate SHIPMENT DETAILS page, for example page 856 shown in FIG. 36. The SHIP- MENT DETAILS page in the disclosed embodiment contains detailed information about a selected prior shipment. For example, addresses, shipment details, charges, tracking number, package details, reference numbers, and the like. The SHIPMENT DETAILS page preferably provides a button for viewing a receipt associated with the selected shipment via a VIEW RECEIPT button 858, and a button to return to the SHIPPING HISTORY page via BACK TO SHIPPING HISTORY button 860. These buttons operate to display receipt for the selected prior shipment or return to the SHIPPING HISTORY page, as appropriate.

Still referring to FIG. 22, if at decision 598 the user has not selected the SHOW DETAIL/RECEIPT button, control passes to decision 602. At step 602 the system tests whether the user has selected a SHIP AGAIN button 852, indicating a desire to use information from the selected prior shipment in connection with another shipment. If affirmative, control passes to step 604, and the routine exits by branching to the SHIPPING routine of FIG. 15. In this situation however, appropriate data fields of the SHIPPING INFORMATION page 660 in FIG. 26 are pre-populated with information from the selected prior shipment. The customer can then readily navigate to accept terms and condition, payment, etc. with minimal additional data entry, thereby shipping another package to an intended recipient quickly and easily.

If at decision 602 the user has not selected the SHIP AGAIN button, control passes to decision 606. At decision 606 the system tests whether the user has selected the VOID SHIPMENT button 854, indicating a desire to void the selected shipment, if possible. If the user did not select the void button, control passes back to step 592 to await appropriate user input. If affirmative, control passes to step 608 where the system assesses the status of the selected prior shipment and determines whether the shipment can be voided. The shipment may be voided, for example, if the package has not yet been acquired by the SSP. On the other hand, a shipment typically cannot be voided if the package is enroute to the intended recipient or has already been delivered. The shipping service provider can determine appropriate voiding policy as desired.

The preferred system provides for the ability to inquire about or cancel an ODS request. To void an ODS request, the request for cancellation should come before the cut-off time for an ODS request. An ODS order may also be voided when the order has not yet been picked up. If the shipment has been scanned or otherwise acquired by the SSP, then the order has been fulfilled and cannot be voided.

After voiding the selected shipment, if indicated as possible, control passes back to step 592 to await user input.

RATE & VALIDATE Routine

Figure 23:
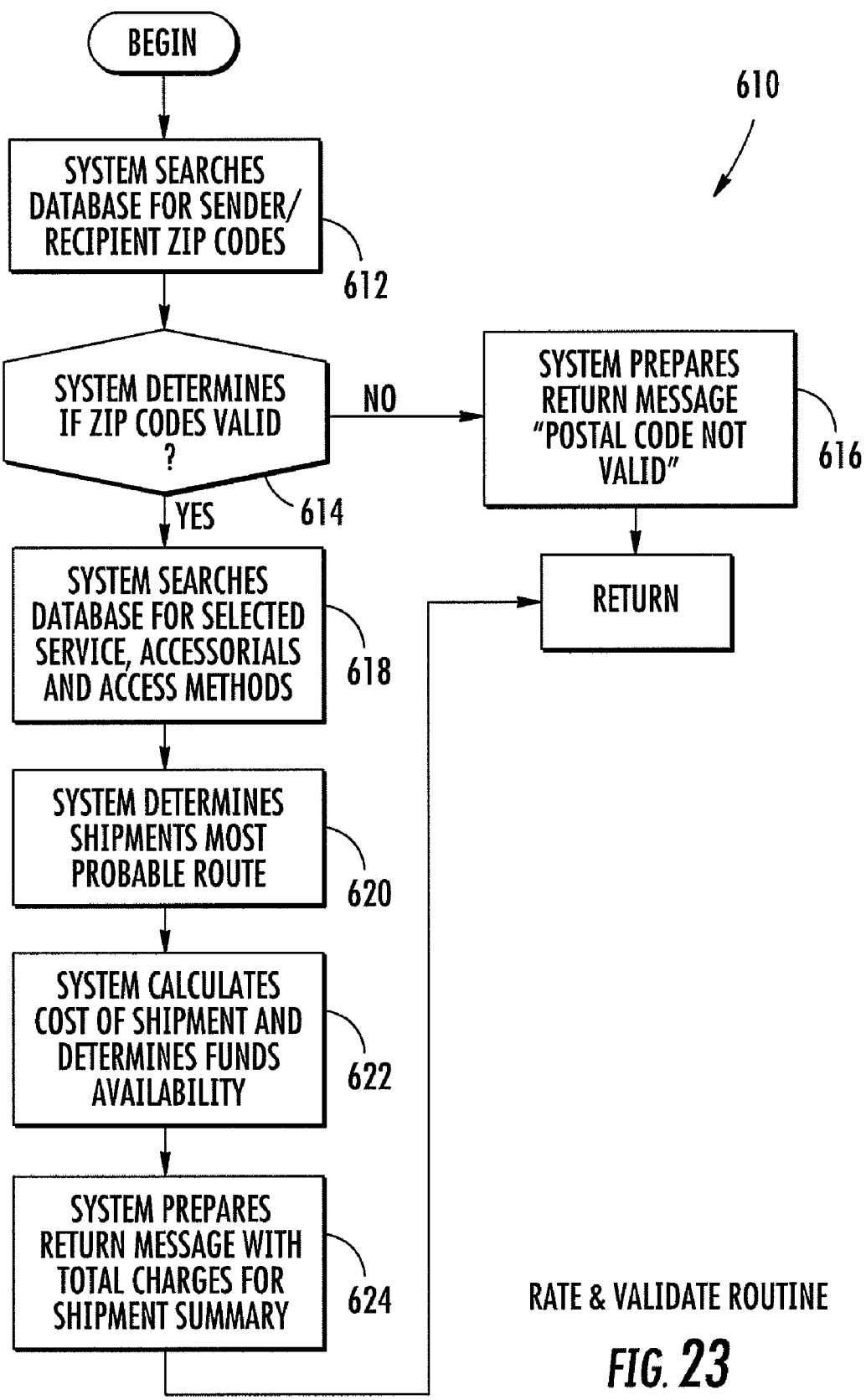
FIG. 23 is a flow chart of a RATE & VALIDATE routine employed in a preferred embodiment of the present invention.

Turn now to FIG. 23 for a discussion of the RATE & VALIDATE routine 610 that is operative to validate the postal codes. In other words, to determine if they are real and whether the SSP can deliver the indicated type of package with the selected type of delivery to such postal code, and to calculate the charges to be assessed for such delivery. The routine 610 is preferably executed by providing information including the sender's and recipient's postal codes, selected package shipment type, and selected shipment type. The routine 610 provides the Rating & Validation function 64 shown in FIG. 1.

To perform the rating and validating functions, the ISS includes a software component, a Rating and Validation Engine (RAVE) (not separately illustrated). The RAVE provides shipping and package cost option calculations, and also embodies the shipping service provider's business rules regarding package, shipment, service and accessories. The RAVE is typically updated whenever there are rate changes to the shipping service provider.

The user's credit card information is also preferably processed through the RAVE. This will ensure that the card is valid and has the necessary funds to cover the cost of the current shipment. The RAVE therefore preferably works in conjunction with a credit card clearing house. Validation will be directed to the dollar amount, credit card number, and expiration date. The validation process may alert the user if there is a problem with their account.

In a preferred embodiment of the present invention, security measures are put in place to deter multiple credit card attempts. This will deny access and shut-off the system to someone who attempts multiple invalid credit card numbers. To help prevent credit card fraud, the ISS preferably permits only a limited number of wrong expiration date entries per credit card number before blocking that card for a 24-hour period.

Starting now at step 612, the first step taken in routine 610 is to receive the postal codes of sender and recipient (for example U.S. postal zip codes), and search the system's database for these postal codes. At decision 614, the system determines whether the indicated zip codes are valid. If they are not, control passes to step 616 where the system prepares a return message indicating that the provided postal codes are not valid or cannot be served by the SSP with the selected type of package and type of delivery option. The routine then returns, passing the return message to the calling routine.

If the system determines that the postal codes are valid and that the selected types of package and service are possible, control passes to step 618. At this step the system searches a database for the selected service, accessories, and access methods. At step 620 the system determines the shipment's most probable delivery route. At step 622 the system calculates the cost of the shipment, utilizing the indicated package type and delivery options, and determines whether funds are available from the customer using the selected payment method. Typically, this entails access to the credit card authorization system 76 as shown in FIG. 2.

At step 622 the system prepares a return message containing the total charges for the shipment, for inclusion and display in the shipment summary, for example, in the display area for Total Charges 734 in FIG. 27. Upon completion of this step the return message is passed to the CALLING routine, and the RATE & VALIDATE routine 610 exits.

Shipping Label

Turn now to FIG. 37 for a discussion of features of the disclosed shipping label 25 that is printed by the customer utilizing print indicia provided to the customer's computer 20 system from the ISS 10.

A label 25 generated in accordance with a preferred embodiment of the present invention contains a number of information containing regions, some machine readable via bar code and/or Maxicode®, some human readable, and some security indicia. Information contained in the label is laid out to maximize use of space as well as machine readability. A Return Address region 870, which may be different from the Origin Address, appears in the upper left hand corner. Thus, a person traveling can specify an Origin Address for pricing and pick-up purposes, but use a home office for the return address.

Below the Return Address region appears a Ship To address region 872 and in the upper right hand corner appears a Package Count region 874 indicating how many packages are in the present shipment and the number of the present package within that shipment.

Below the Ship To address is a square block containing a Maxicode® symbol 876. A Maxicode® is a proprietary machine-readable dense code containing all the text of the label and optionally other package level detail (PLD) information concerning the customer, the contents, special handling, etc. Those skilled in the art will understand that at least one hundred characters of text can be stored in a Maxicode® and machine-read with a scanner.

To the right of the Maxicode® is a human readable Sort Code region 882, which identifies an Initial Sorting Hub 878 and a Sorting Belt Code 880 which identifies the sorting belt within the hub 42 to which the package is first routed.

A Final Destination postal code appears below the human readable codes 878, 880 in the form of a Code 128 or other popular barcode 882. The postal code may be reproduced in human readable form (not shown) if desired.

A horizontal box below the codes just described contains text 884 describing the level of the service and a large font alphanumeric Level of Service code 886. Immediately below is a 1Z code 888 which serves as a tracking number. The 1Z code itself comprises an alphanumeric 6-digit Customer Account Number 890, a Level of Service identifier 892, a non-sequential Reference Numeral 894, and a Check Sum digit 896.

The Customer Account Number 890 may contain a special character to designate a particular kind of payment, such as carrier account or a credit card only Internet account. Here for example, the letter "T" designates a credit card account. The tracking number may be encoded in a machine-readable barcode region 898. A unique 1Z number is generated for each label printed, for security purposes, as discussed.

In the lowermost section of the label, a billing identifier 900 states the type of billing. As shown, the "BILLING: PREPAID" identifier signals to the carrier's personnel to accept the package because payment has been validated. Also, in this section are one or more lines of User Text 902 that may be used to identify the customer's reference for customer internal accounting, filing, or the like. This box may also contain the version number of the ISS software that created the label, for technical support and help desk use.

In the lower left of the label block is a Logo region. According to one aspect of the invention, personnel of the shipping service provider may be instructed not to accept this type of label unless the Logo 904 and indicia indicative of payment such as the BILLING: PREPAID identifier 900 are both present. This combination of identifiers helps to detect fraudulent use of copies of shipping labels. It will therefore be appreciated that the various features of the label, working in combination, are security measures against fraudulent reuse of a label, or of copying of a label, or of printing multiple copies of a label.

As discussed in connection with the LABEL PRINTING routine, features of the label printing process assist in providing security for the label and guarding against fraud. For example, after data entry for a shipment, a label 25 is presented in a new ("spawned") browser window for user inspection and printing using the browser PRINT function. Also, to avoid label printing problems the ISS may query the user's computer 20 to determine the browser type used by the customer and provide an appropriate page setup.

Finally, the labels may be printed sideways within half of a standard 8½"×11" page which can then be folded and inserted into a transparent envelope attached to a package, or attached directly to the package.

As will be understood by those skilled in the art, the shipping label 25 is not limited to the format described above. The information included in the format described above may be rearranged, deleted, or added to create labels of different configurations. For example, the Shipped From block, Package Information block, Shipped To block, and Customer block may be arranged to the left of the label, while the Maxicode® block, Postal Barcode block, Tracking Number Barcode block and Routing Instructions block may be grouped to the right hand side. Again, these may be rearranged to suit the needs of the user or the shipping service provider.

An additional routing and instruction section on the label 25 (not shown) may provide for special instructions. This may include a required signature, earliest delivery times, verbal confirmation of delivery, COD, hazardous material, international billing options. Within the international billing options, the routing instructions sections may specify split billing, third-party billing, domestic U.S. billing options, etc.

A package information block (not shown) may include information regarding the package such as weight, count, the shipment number for thermal way bill, the shipment weight, and the shipment dimensional weight.

Although the present invention has been disclosed and described in terms of preferred embodiments, it is not intended that the invention be limited to such embodiments. Modifications within the spirit of the invention will be apparent to those skilled in the art. The scope of the present invention is to be limited only by the claims which follow.

What is claimed is:

1. A system for processing information associated with a package handled by a shipping service provider in connection with delivery of the package to an intended recipient, comprising:

a dispatch computer system configured to generate a dispatch order for same day pickup of the package from one of a plurality of locations in response to receipt and validation of a customer-entered order for pickup and shipping of the package to the intended recipient;

an order-receiving computer system configured to receive the customer-entered pickup and shipping order from an Internet accessible computer system and communicate said customer-entered pickup and shipping order to the dispatch computer system;

a package information processing computer system associated with the order-receiving computer system and configured to process pickup and shipping information entered by the customer via the Internet accessible computer system, including validating that the dispatch computer system is capable of initiating same day pickup of the package at the location;

a shipping alternative computer system configured to generate at least one alternative shipping option that is an alternative to same day pickup in response to a lack of validation of the customer-entered order and communicate the alternative shipping option to the Internet accessible computer system, wherein the order-receiving computer system, the package information processing computer system and the shipping alternative computer system are all configured to be accessible from a common application of the Internet accessible computer system; and a communication computer system configured to communicate said dispatch order to a selected service person, whereby the selected service person is instructed by display of the dispatch order on a communications receiving device to pick up the package at the location for delivery via the shipping service provider to the intended recipient.

2. The system of claim 1, wherein validating by the package information processing computer system is configured to determine that the location is within a pickup service area.

3. The system of claim 1, wherein the pickup location is selected by the customer.

4. The system of claim 1, wherein the pickup location is at a drop box.

5. The system of claim 1, further comprising a package shipment status information computer system configured to receive status information corresponding to the status of shipment of the package and for providing the status information for access by the customer.

6. The system of claim 5, wherein the status information comprises tracking information corresponding to the package.

7. The system of claim 1, wherein the pickup and shipping information includes a pickup time and wherein the package information processing computer system is configured to validate that the pickup time is within predetermined service times.

8. A system for pick up of a package by a shipping service provider for delivery of the package to an intended recipient, comprising:
an Internet accessible computer system configured to allow a customer to enter an order to pick up the package on a same day as the order is entered and ship the package to an intended recipient; a dispatch computer system configured to in response to receipt of said customer-entered order, validate that a selected service person is capable of picking up the package on the same day and generate a dispatch order for pickup of the package by the selected service person from one of a plurality of locations in response to successful validation;
a shipping alternative computer system configured to generate at least one alternative shipping option in response to a lack of validation of the customer-entered order and communicate the alternative shipping option to the Internet accessible computer system;
an order-receiving computer system configured to receive the customer-entered pickup and shipping order from said Internet accessible computer system and communicate said customer-entered pickup and shipping order to the dispatch computer system,
wherein the dispatch computer system, the shipping alternative computer system, and the order-receiving computer system are all configured to be accessible from a common application of the Internet accessible computer system;
a communication computer system configured to communicate said dispatch order to the selected service person; and
a communications receiving device used by the selected service person and configured to receive the dispatch order,
whereby the selected service person is instructed by display of the dispatch order on the communications receiving device to pick up the package at the location for delivery via the shipping service provider to the intended recipient.

9. The system of claim 8, wherein the pickup location is at a place selected by the customer.

10. The system of claim 8, wherein the pickup location is at a drop box.

11. The system of claim 8, wherein the dispatch computer system comprises a dispatch center responsive to receipt of said customer-entered order for determining whether the pickup location associated with said customer-entered order is within a predetermined service area for demand pickup by the selected service person.

12. The system of claim 11, wherein dispatch computer system is configured to validate that pickup service is available for the order by reference to a zip code associated with the customer.

13. The system of claim 8, wherein the dispatch computer system is configured to determine whether the pickup location associated with said customer-entered order is within a predetermined service area for demand pickup by the selected service person and, in response to a determination that the pickup location is not within the predetermined service area, provide information to the customer about locations for package drop-off.

14. The system of claim 8, wherein the order-receiving computer system is configured to accept information from a label during scanning of the label at on call pickup or when processed at a drop box.

15. The system of claim 8, further comprising a payment computer system associated with the order-receiving computer system configured to receive payment information from the customer and processing a customer payment for shipment of the package.

16. The system of claim 8, wherein the order-receiving computer system is configured to provide a shipping information interface via an Internet site, the shipping information interface being accessible by the customer's Internet accessible computer system and including shipment order information fields for customer entry of shipment order information associated with shipment of the package.

17. The system of claim 16, wherein the shipment order information fields include a "request package pickup" field that is capable of being selected by the customer to cause the order-receiving computer system to generate the customer-entered pickup order, or deselect the request package pickup field, whereby a customer can select on call pickup or alternatively select to deliver the package to a drop box.

18. The system of claim 16, wherein the shipment order information fields include a "ship to" address field that is capable of being filled in by the customer with information indicative of an address of the intended recipient.

19. The system of claim 18, wherein the order-receiving computer system is configured to process the ship to address field and determine whether an address of a package recipient is a valid address, and further configured to provide an indication of address invalidity in the event that the address of the package recipient is invalid.

20. The system of claim 8, further comprising a delivery information acquisition device (DIAD) for scanning a label on the package to acquire information about the package.

21. The system of claim 8, wherein the communication computer system for communicating said dispatch order is selected from the group comprising: an e-mail message delivery system, a cellular telephone system, a pager system, a wireless personal communication system (PCS), an ARDIS network, Bluetooth devices, or other proprietary data communications system.

22. The system of claim 8, further comprising a package shipment status information computer system configured to receive status information corresponding to the status of shipment of the package by the customer and provide the status information for access by the customer.

23. The system of claim 22, wherein the status information system provides status information to the customer via the Internet accessible computer system.

24. The system of claim 22, wherein the status information comprises the shipping history of a predetermined number of prior package shipments by the customer.

25. The system of claim 22, wherein the status information comprises package tracking information.

26. The system of claim 8, wherein the order-receiving computer system comprises an Internet world wide web (WWW) server.

27. The system of claim 26, wherein the WWW server is configured to generate a web interface for interaction by the customer's Internet accessible computer system.

28. The system of claim 8, wherein the order-receiving computer system is configured to provide a request package pickup interface via an Internet site, the request package pickup interface being accessible by the customer's Internet accessible computer system and including package pickup information fields for customer entry of package pickup information associated with pickup and shipment of the package.

29. The system of claim 8, wherein the order-receiving computer system is configured to provide a shipment summary interface via the Internet site, the shipment summary interface being accessible by the customer's Internet accessible computer system and including editable shipment summary information fields associated with an order to ship a package.

30. The system of claim 29, wherein the shipment summary interface is configured to display service options for selection by the customer selected from the group comprising: changing information associated with shipment of the package, adding another package to the shipment, selecting to view a drop-off locator, and selecting service for delivery of the package sooner.

31. The system of claim 8, wherein the order-receiving computer system is configured to provide a payment interface via the Internet site, the payment interface being accessible by the customer's Internet accessible computer system and including selectable payment options associated with an order to ship a package.

32. The system of claim 31, wherein the order-receiving computer system is configured to provide a print labels interface via the Internet site, the print labels interface being accessible by the customer's Internet accessible computer system and including instructions for printing a label for association with the package.

33. The system of claim 8, wherein the order-receiving computer system is configured to provide a shipping history interface via the Internet site, the shipping history interface being accessible by the customer's Internet accessible computer system and including shipping history information fields for allowing customer selection of shipping history display options.

34. The system of claim 33, wherein the order-receiving computer system is configured to display shipping history information to the customer in response to selection of a shipping history display option.

35. The system of claim 33, wherein the shipping history display options include a track shipment option, and wherein the order-receiving computer system is configured to display shipment tracking information associated with a selected prior order by the customer in response to selection of the track shipment option.

36. The system of claim 33, wherein the shipping history display options include a "shipment details" option, wherein the order-receiving computer system is configured to display information associated with at least one prior order by the customer, and wherein the order-receiving computer system is configured to display detailed information associated with a selected prior order of the customer in response to selection of the shipment details option in association with selection of a particular prior order.

37. The system of claim 8, further comprising a customer profile information computer system associated with the order-receiving computer system, the customer profile information computer system storing preference information associated with the customer.

38. A method for delivery of a package by a shipping service provider to an intended recipient, comprising the steps of:
receiving an order entered by a customer at an Internet accessible computer system to pickup on a same day as the order is entered and ship the package to an intended recipient;
communicating the pickup and shipping order to an order-receiving computer system;
at the order-receiving computer system, processing the pickup and shipping order to validate information associated with the order, including validating that a dispatch computer system is capable of initiating the order on the same day;
in response to successful validation of information associated with the pickup and shipping order, communicating the pickup and shipping order to the dispatch computer system;
in response to an unsuccessful validation of information associated with the pickup and shipping order, generating at least one alternative shipping option;
at the dispatch computer system, generating a dispatch order for pick up of the package at one of a plurality of locations;
communicating the dispatch order to a selected service person;
receiving the dispatch order at a communications receiving device associated with the selected service person; and
in response to receipt of the dispatch order, picking up the package at the location for delivery to the intended recipient;
wherein receiving the customer-entered order and generating at least one alternative shipping option in response to unsuccessful validation are all accessible through a common application of the Internet accessible computer system.

39. The method of claim 38, wherein the pickup location is a place selected by the customer.

40. The method of claim 38, wherein the pickup location is at a drop box.

41. The method of claim 38, wherein validating that the dispatch computer system is capable of fulfilling the order includes:
determining whether the pickup location associated with the order is within a predetermined service area for demand pickup by a selected service person and,
in response to a determination that the pickup location is within the predetermined service area, generating the dispatch order for communication to the selected service person.

42. The method of claim 41, further comprising the step of:
in response to a determination that the pickup location is not within the predetermined service area, providing information to the customer via the Internet accessible computer system about locations for package drop-off.

43. The method of claim 41, further comprising the step of validating that pickup service is available for the order by reference to a zip code associated with the customer.

44. The method of claim 38, further comprising the steps of:
  receiving status information from a package delivery computer system corresponding to the status of shipment of the package by the customer, and
  providing the status information to the customer.

45. The method of claim 44, wherein the status information comprises the shipping history of a predetermined number of prior package shipments by the customer.

46. The method of claim 38, further comprising the steps of:
  receiving payment information from the customer, and
  processing a customer payment for shipment of the package.

47. The method of claim 44, wherein the status information comprises package tracking information.

48. The method of claim 44, wherein the status information is provided to the customer via the Internet accessible computer system.

49. The method of claim 38, further comprising the step of:
  providing a shipping information interface via an Internet site, the shipping information interface being accessible by the customer's Internet accessible computer system and including shipment order information fields for customer entry of shipment order information associated with shipment of the package.

50. The method of claim 49, wherein the shipment order information fields include a "request package pickup" field that is capable of being selected by the customer to cause the order-receiving computer system to generate the customer-entered pickup and shipping order, or deselect the request package pickup field,
  whereby a customer can select on call pickup or alternatively select pickup of the package at a drop box.

51. The method of claim 49, wherein the shipment order information fields include a "ship to" address field that is capable of being filled in by the customer with information indicative of an address of the intended recipient.

52. The method of claim 51, further comprising the steps of:
  processing the ship to address field to validate the ship to address,
  determining whether an address of a package recipient is a valid address, and
  providing an indication of address invalidity in the event that the address of the package recipient is invalid.

53. The method of claim 38, further comprising the step of:
  providing a shipment summary interface via the Internet site, the shipment summary interface being accessible by the customer's Internet accessible computer system and including editable shipment summary, information fields associated with an order to ship a package.

54. The method of claim 53, wherein the shipment summary interface is configured to display service options for selection by the customer selected from the group comprising: changing information associated with shipment of the package, adding another package to the shipment, selecting to view a drop-off locator, and selecting service for delivery of the package sooner.

55. The method of claim 38, further comprising the step of:
  providing a payment interface via the Internet site, the payment interface being accessible by the customer's Internet accessible computer system and including selectable payment options associated with an order to ship a package.

56. The method of claim 55, wherein the payment options are selected from the group comprising: payment from a customer's existing account with the shipping service provider, payment via credit card on file with the shipping service provider, and payment via other credit card.

57. The method of claim 38, further comprising the step of:
  providing a shipping history interface via the Internet site, the shipping history interface being accessible by the customer's Internet accessible computer system and including shipping history information fields for allowing customer selection of shipping history display options.

58. The method of claim 57, wherein the shipping history display options include a "shipment details" option, and further comprising the steps of:
  displaying information associated with at least one prior order by the customer, and
  displaying detailed information associated with a selected prior order of the customer in response to selection of the shipment details option in association with selection of a particular prior order.

59. The method of claim 57, further comprising the steps of:
  displaying shipping history information to the customer in response to selection of a shipping history display option.

60. The method of claim 57, wherein the shipping history display options include a track shipment option, and further comprising the step of displaying shipment tracking information associated with a selected prior order by the customer in response to selection of the track shipment option.

61. The method of claim 38, further comprising the step of acquiring information about the package by scanning a label on the package with a delivery information acquisition device (DIAD).

62. The method of claim 38, wherein the step of communicating the dispatch order is carried out by communicating a message via a technology selected from the group comprising: an e-mail message, a cellular telephone system, a pager system, a wireless personal communication system (PCS), an ARDIS network, Bluetooth devices, or other proprietary data communications system.

63. The method of claim 38, wherein the order-receiving computer system comprises an Internet world wide web (WWW) server.

64. The method of claim 63, wherein the WWW server is configured to generate a web interface for interaction by the customer's Internet accessible computer system.

65. The method of claim 38, further comprising the step of:
  providing a request package pickup interface via an Internet site, the request package pickup interface being accessible by the customer's Internet accessible computer system and including package pickup information fields for customer entry of package pickup information associated with shipment of the package.

66. The method of claim 38, further comprising the step of storing preference information associated with the customer in a customer profile information computer system.

67. A method for processing information associated with a package handled by a shipping service provider in connection with delivery of the package to an intended recipient, comprising:
  receiving a customer-entered order from an Internet accessible computer system, said customer-entered order requesting same day pick up and shipping of the package to the intended recipient;

validating that a dispatch computer system is capable of initiating the customer-entered same day pickup and shipping order and one of communicating the customer-entered pickup and shipping order to the dispatch computer system in response to a successful validation; and generating at least one alternative shipping option in response to unsuccessful validation, wherein receiving the customer-entered order for same day pickup and shipping and generating at least one alternative shipping option in response to unsuccessful validation are all accessible through a common application on the Internet accessible computer system;

at the dispatch computer system, generating a dispatch order for pick up of the package from one of a plurality of pickup locations; and communicating the dispatch order to a selected service person by displaying the dispatch order on a communications receiving device to the selected service person to pick up the package for delivery via the shipping service provider to the intended recipient.

68. The system of claim 67, wherein validating includes validating that the pickup location is within a pickup service area.

69. The system of claim 67, wherein the customer entered order requests pick up at a pickup time and wherein validating includes validating that the pickup time is within predetermined service times.

70. The method of claim 67, wherein the pickup location is selected by the customer.

71. The method of claim 67, wherein the pickup location is at a drop box.

72. The method of claim 67, further comprising the step of storing status information corresponding to the status of shipment of the package and providing the status information for access by the customer.

73. The method of claim 72, wherein the status information comprises tracking information corresponding to the package.

* * * * *

UNITED STATES PATENT AND TRADEMARK OFFICE
CERTIFICATE OF CORRECTION

PATENT NO.        : 7,844,481 B2                                          Page 1 of 1
APPLICATION NO.   : 10/832111
DATED             : November 30, 2010
INVENTOR(S)       : Hilbush et al.

It is certified that error appears in the above-identified patent and that said Letters Patent is hereby corrected as shown below:

Column 15
Line 18, "DLAD" should read --DIAD--

Signed and Sealed this
Twenty-eighth Day of February, 2012

David J. Kappos
*Director of the United States Patent and Trademark Office*